(12) United States Patent
Watarai et al.

(10) Patent No.: US 9,511,819 B1
(45) Date of Patent: Dec. 6, 2016

(54) BICYCLE REAR SPROCKET ASSEMBLY

(71) Applicant: SHIMANO INC., Sakai (JP)

(72) Inventors: Etsuyoshi Watarai, Sakai (JP); Tooru Iwai, Sakai (JP); Tetsu Nonoshita, Sakai (JP); Toyoshi Yoshida, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/720,949

(22) Filed: May 25, 2015

(51) Int. Cl.
| F16H 55/12 | (2006.01) |
| F16H 55/30 | (2006.01) |
| B62M 9/10 | (2006.01) |
| F16H 55/06 | (2006.01) |

(52) U.S. Cl.
CPC .............. B62M 9/10 (2013.01); F16H 55/06 (2013.01); F16H 55/30 (2013.01)

(58) Field of Classification Search
CPC ........... B62M 9/10; B62M 9/105; B62M 9/12; F16H 55/30; B60B 27/026
USPC .......................................... 474/160
See application file for complete search history.

(56) References Cited

U.S. PATENT DOCUMENTS

| 782,262 | A | * | 2/1905 | Morse | B23Q 5/00 474/157 |
| 4,380,445 | A | * | 4/1983 | Shimano | B62M 9/105 474/144 |
| 4,472,163 | A | * | 9/1984 | Bottini | B62M 9/10 192/64 |
| 4,642,075 | A | * | 2/1987 | Nagashima | F16H 55/30 474/158 |
| 5,194,051 | A | * | 3/1993 | Nagano | B62M 9/10 474/160 |
| 5,213,550 | A | * | 5/1993 | Wu | F16H 55/12 474/160 |
| 5,503,600 | A | * | 4/1996 | Berecz | F16H 55/30 474/160 |
| 5,935,034 | A | * | 8/1999 | Campagnolo | B62M 9/10 474/160 |
| 6,024,662 | A | * | 2/2000 | Fujimoto | B62M 3/003 280/261 |
| 6,176,798 | B1 | * | 1/2001 | Nakamura | B62M 9/10 474/160 |
| 6,382,381 | B1 | * | 5/2002 | Okajima | B60B 1/0215 192/64 |
| 6,428,437 | B1 | * | 8/2002 | Schlanger | B62M 9/10 474/160 |

(Continued)

Primary Examiner — Henry Liu
(74) Attorney, Agent, or Firm — Mori & Ward, LLP

(57) ABSTRACT

A bicycle rear sprocket assembly comprises a plurality of sprocket members and a supporting member. The plurality of sprocket members have a rotational center axis. The plurality of sprocket members are arranged in an axial direction parallel to the rotational center axis. The plurality of sprocket members each include a sprocket body and a plurality of sprocket teeth. The plurality of sprocket teeth extend radially outwardly from the sprocket body with respect to the rotational center axis. The supporting member is a separate member from the plurality of sprocket members. The supporting member includes a supporting portion and a hub engagement portion. The supporting portion is configured to support the plurality of sprocket members. The sprocket body of each of the plurality of sprocket members is attached to the supporting portion of the supporting member without using a separate metallic fastening member.

29 Claims, 44 Drawing Sheets

(56) References Cited

U.S. PATENT DOCUMENTS

| | | | |
|---|---|---|---|
| 6,866,604 B2* | 3/2005 | Kamada | B60B 27/026 474/152 |
| 7,118,505 B2* | 10/2006 | Lee | B62M 9/105 474/152 |
| 7,128,672 B2* | 10/2006 | Chattin | B62M 9/10 474/141 |
| 7,131,656 B2* | 11/2006 | Valle | B62M 9/10 280/260 |
| 7,258,638 B2* | 8/2007 | Valle | B62M 9/105 474/152 |
| 7,344,463 B2* | 3/2008 | Reiter | B62M 9/10 474/160 |
| 7,351,171 B2* | 4/2008 | Kanehisa | B60B 27/026 301/111.02 |
| 7,503,864 B2* | 3/2009 | Nonoshita | B62M 9/105 474/160 |
| 7,854,673 B2* | 12/2010 | Oseto | B62M 9/10 403/353 |
| 7,871,347 B2* | 1/2011 | Kamada | B62M 9/10 474/152 |
| 7,931,553 B2* | 4/2011 | Tokuyama | B62M 9/10 474/144 |
| 7,959,529 B2* | 6/2011 | Braedt | B62M 9/10 474/152 |
| 8,057,338 B2* | 11/2011 | Kamada | B62M 9/10 474/152 |
| 8,100,795 B2* | 1/2012 | Reiter | B62M 9/10 474/160 |
| 8,197,371 B2* | 6/2012 | D'Aluisio | B62M 9/12 301/110.5 |
| 8,342,994 B2* | 1/2013 | Braedt | B62M 9/12 474/164 |
| 8,663,044 B2* | 3/2014 | Lin | B62M 9/10 474/160 |
| 8,696,503 B2* | 4/2014 | Oishi | B62M 9/10 474/160 |
| 8,764,594 B2* | 7/2014 | Dal Pra' | F16H 55/30 474/160 |
| 8,905,878 B2* | 12/2014 | Loy | B62M 9/10 474/160 |
| 8,911,314 B2* | 12/2014 | Braedt | B62M 9/10 474/160 |
| 8,968,130 B2* | 3/2015 | Liao | B62M 9/10 474/160 |
| 2001/0039224 A1* | 11/2001 | Lim | F16D 41/30 474/160 |
| 2003/0064844 A1* | 4/2003 | Lin | B62M 9/10 474/160 |
| 2004/0121867 A1* | 6/2004 | Reiter | B62M 9/10 474/160 |
| 2005/0090349 A1* | 4/2005 | Lee | B62M 9/105 474/160 |
| 2006/0094550 A1* | 5/2006 | Tetsuka | B62M 3/00 474/160 |
| 2006/0128512 A1* | 6/2006 | Tetsuka | B62M 3/00 474/160 |
| 2006/0172840 A1* | 8/2006 | Kamada | B62M 9/10 474/152 |
| 2006/0205549 A1* | 9/2006 | Nonoshita | B62M 9/105 474/160 |
| 2006/0258499 A1* | 11/2006 | Kamada | B62M 9/12 474/160 |
| 2007/0054770 A1* | 3/2007 | Valle | B62M 9/10 474/160 |
| 2007/0129193 A1* | 6/2007 | Nonoshita | B62M 9/10 474/160 |
| 2008/0004143 A1* | 1/2008 | Kanehisa | B62M 9/10 474/160 |
| 2008/0161146 A1* | 7/2008 | Shiraishi | B62M 9/12 474/160 |
| 2008/0188336 A1* | 8/2008 | Tokuyama | B62M 9/10 474/160 |
| 2009/0042679 A1* | 2/2009 | Valle | B62M 9/10 474/152 |
| 2009/0215565 A1* | 8/2009 | Braedt | B62M 9/12 474/160 |
| 2009/0215566 A1* | 8/2009 | Braedt | B62M 9/10 474/160 |
| 2010/0009794 A1* | 1/2010 | Chiang | B62M 9/10 474/160 |
| 2011/0092327 A1* | 4/2011 | Oishi | B62M 9/10 474/160 |
| 2012/0220402 A1* | 8/2012 | D'Aluisio | B62M 9/12 474/160 |
| 2012/0225745 A1* | 9/2012 | Oishi | B62M 9/10 474/160 |
| 2012/0309572 A1 | 12/2012 | Braedt | |

* cited by examiner

BICYCLE REAR SPROCKET ASSEMBLY

BACKGROUND OF THE INVENTION

Field of the Invention

The present invention relates to a bicycle rear sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle rear sprocket assembly.

SUMMARY OF THE INVENTION

In accordance with a first aspect of the present invention, a bicycle rear sprocket assembly comprises a plurality of sprocket members and a supporting member. The plurality of sprocket members have a rotational center axis. The plurality of sprocket members are arranged in an axial direction parallel to the rotational center axis. The plurality of sprocket members each include a sprocket body and a plurality of sprocket teeth. The plurality of sprocket teeth extend radially outwardly from the sprocket body with respect to the rotational center axis. The supporting member is a separate member from the plurality of sprocket members. The supporting member includes a supporting portion and a hub engagement portion. The supporting portion is configured to support the plurality of sprocket members. The sprocket body of each of the plurality of sprocket members is attached to the supporting portion of the supporting member without using a separate metallic fastening member. The hub engagement portion is configured to engage with a bicycle hub assembly.

With the bicycle rear sprocket assembly in accordance with the first aspect, the sprocket body of each of the plurality of sprocket members is attached to the supporting portion of the supporting member without using a separate metallic fastening member. Accordingly, it is possible to save weight of the bicycle rear sprocket assembly with maintaining the necessary strength of the bicycle rear sprocket assembly.

In accordance with a second aspect of the present invention, the bicycle rear sprocket assembly according to the first aspect is configured so that the supporting member further includes an intermediate portion extending between the supporting portion and the hub engagement portion in a radial direction with respect to the rotational center axis.

With the bicycle rear sprocket assembly in accordance with the second aspect, the intermediate portion can maintain or improve the strength of the supporting member.

In accordance with a third aspect of the present invention, the bicycle rear sprocket assembly according to the first or second aspect is configured so that the sprocket body of each of the plurality of sprocket members is attached to the supporting portion via at least one of adhesive and diffusion bonding.

With the bicycle rear sprocket assembly in accordance with the third aspect, it is possible to maintain the necessary strength of the bicycle rear sprocket assembly without using the separate metallic fastening member.

In accordance with a fourth aspect of the present invention, the bicycle rear sprocket assembly according to any one of the first to third aspects is configured so that the supporting portion includes a plurality of spacers. The plurality of spacers are respectively provided between adjacent two of the plurality of sprocket members in the axial direction.

With the bicycle rear sprocket assembly in accordance with the fourth aspect, the plurality of spacers allow the plurality of sprocket members to be easily positioned in the axial direction.

In accordance with a fifth aspect of the present invention, the bicycle rear sprocket assembly according to the fourth aspect is configured so that the plurality of spacers are respectively attached to the adjacent two of the sprocket bodies of the plurality of sprocket members.

With the bicycle rear sprocket assembly in accordance with the fifth aspect, the plurality of spacers allow the plurality of sprocket members to be easily positioned in the axial direction.

In accordance with a sixth aspect of the present invention, the bicycle rear sprocket assembly according to the fifth aspect is configured so that the plurality of spacers are respectively attached to the adjacent two of the sprocket bodies of the plurality of sprocket members via at least one of adhesive and diffusion bonding.

With the bicycle rear sprocket assembly in accordance with the sixth aspect, it is possible to maintain the necessary strength of the bicycle rear sprocket assembly without using the separate metallic fastening member.

In accordance with a seventh aspect of the present invention, the bicycle rear sprocket assembly according to the fourth or fifth aspect is configured so that the supporting portion includes radially-supporting surfaces facing radially outwardly with respect to the rotational center axis. The sprocket bodies of the plurality of sprocket members are respectively mounted on the radially-supporting surfaces.

With the bicycle rear sprocket assembly in accordance with the seventh aspect, the radially-supporting surfaces can make it easier to radially position the plurality of sprocket members relative to the supporting portion.

In accordance with an eighth aspect of the present invention, the bicycle rear sprocket assembly according to the seventh aspect is configured so that the sprocket bodies of the plurality of sprocket members are respectively attached to the radially-supporting surfaces.

With the bicycle rear sprocket assembly in accordance with the eighth aspect, it is possible to maintain the necessary strength of the bicycle rear sprocket assembly without using the separate metallic fastening member.

In accordance with a ninth aspect of the present invention, the bicycle rear sprocket assembly according to the eighth aspect is configured so that the supporting portion includes a plurality of spacers. The plurality of spacers are respectively provided between adjacent two of the plurality of sprocket members.

With the bicycle rear sprocket assembly in accordance with the ninth aspect, the plurality of spacers allow the plurality of sprocket members to be easily positioned in the axial direction.

In accordance with a tenth aspect of the present invention, the bicycle rear sprocket assembly according to the ninth aspect is configured so that the plurality of spacers are respectively attached to the adjacent two of the sprocket bodies of the plurality of sprocket members. The plurality of spacers are respectively attached to the radially-supporting surfaces.

With the bicycle rear sprocket assembly in accordance with the tenth aspect, it is possible to maintain the necessary strength of the bicycle rear sprocket assembly without using the separate metallic fastening member.

In accordance with an eleventh aspect of the present invention, the bicycle rear sprocket assembly according to any one of the first to tenth aspects is configured so that the supporting portion includes radially-supporting surfaces and first restricting parts. The radially-supporting surfaces face radially outwardly with respect to the rotational center axis. The first restricting parts are provided on the radially-supporting surfaces. The sprocket bodies of the plurality of sprocket members are respectively mounted on the radially-supporting surfaces. Each of the sprocket bodies of the plurality of sprocket members includes a second restricting part. The first restricting parts of the supporting portion are configured to respectively engage with the second restricting parts of the sprocket bodies to restrict the sprocket bodies from rotating relative to the supporting portion about the rotational center axis.

With the bicycle rear sprocket assembly in accordance with the eleventh aspect, the first restricting parts and the second restricting parts can improve the strength of the engagement between the supporting portion and the sprocket members in the circumferential direction.

In accordance with a twelfth aspect of the present invention, the bicycle rear sprocket assembly according to any one of the first to eleventh aspects is configured so that the supporting portion includes a plurality of spacer. The plurality of spacers are respectively provided between adjacent two of the sprocket bodies of the plurality of sprocket members. At least one of the plurality of spacers includes a third restricting part. At least one of the sprocket bodies of the plurality of sprocket members includes a fourth restricting part. The third restricting part of the at least one of the plurality of spacers is configured to respectively engage with the fourth restricting part of the at least one of the sprocket bodies to restrict the at least one of the sprocket bodies from rotating relative to the plurality of spacers about the rotational center axis.

With the bicycle rear sprocket assembly in accordance with the twelfth aspect, the third restricting parts and the fourth restricting parts can improve the strength of the engagement between the spacers and the sprocket members in the circumferential direction.

In accordance with a thirteenth aspect of the present invention, the bicycle rear sprocket assembly according to any one of the first to twelfth aspects is configured so that the supporting portion includes radially-supporting surfaces, fifth restricting parts, and a plurality of spacers. The radially-supporting surfaces face radially outwardly with respect to the rotational center axis. The fifth restricting parts are provided on the radially-supporting surfaces. The plurality of spacers are mounted on the radially-supporting surfaces. The plurality of spacers are respectively provided between adjacent two of the sprocket bodies of the plurality of sprocket members. Each of the plurality of spacers includes a sixth restricting part. The fifth restricting parts are configured to respectively engage with the sixth restricting parts of the plurality of spacers to restrict the plurality of spacers from rotating relative to the radially-supporting surfaces about the rotational center axis.

With the bicycle rear sprocket assembly in accordance with the thirteenth aspect, the fifth restricting parts and the sixth restricting parts can improve the strength of the engagement between the supporting portion and the spacers in the circumferential direction.

In accordance with a fourteenth aspect of the present invention, the bicycle rear sprocket assembly according to any one of the first to thirteenth aspects is configured so that the supporting portion includes a plurality of supporting parts spaced apart from each other at circumferential intervals in a circumferential direction with respect to the rotational center axis. The plurality of supporting parts respectively have maximum circumferential lengths defined in the circumferential direction. Each of the maximum circumferential lengths of the plurality of supporting parts is shorter than or equal to the circumferential intervals.

With the bicycle rear sprocket assembly in accordance with the fourteenth aspect, it is possible to save the weight of the bicycle rear sprocket assembly with maintaining the necessary strength of the bicycle rear sprocket assembly.

In accordance with a fifteenth aspect of the present invention, the bicycle rear sprocket assembly according to any one of the first to thirteenth aspects is configured so that the supporting portion includes a plurality of supporting parts spaced apart from each other at circumferential intervals in a circumferential direction with respect to the rotational center axis. The plurality of supporting parts have maximum circumferential lengths defined in the circumferential direction. Each of the maximum circumferential lengths of the plurality of supporting parts is longer than the circumferential intervals.

With the bicycle rear sprocket assembly in accordance with the fifteenth aspect, it is possible to maintaining the necessary strength of the bicycle rear sprocket assembly while saving the weight of the bicycle rear sprocket assembly.

In accordance with a sixteenth aspect of the present invention, the bicycle rear sprocket assembly according to any one of the first to fifteenth aspects is configured so that the intermediate portion includes reinforcing parts extending between the supporting portion and the hub engagement portion in the radial direction with respect to the rotational center axis. The reinforcing parts are spaced apart from each other in a circumferential direction with respect to the rotational center axis.

With the bicycle rear sprocket assembly in accordance with the sixteenth aspect, the reinforcing parts can improve the strength of the supporting member.

In accordance with a seventeenth aspect of the present invention, the bicycle rear sprocket assembly according to any one of the first to sixteenth aspects is configured so that the plurality of sprocket members are made of a first material including at least one of an iron alloy, a titanium alloy and an aluminum alloy.

With the bicycle rear sprocket assembly in accordance with the seventeenth aspect, it is possible to save weight of the plurality of sprocket members by using at least one of the iron alloy, the titanium alloy and the aluminum alloy.

In accordance with an eighteenth aspect of the present invention, the bicycle rear sprocket assembly according to any one of the first to seventeenth aspects is configured so that the supporting member is made of a second material including one of an aluminum alloy and a non-metallic material.

With the bicycle rear sprocket assembly in accordance with the first aspect, it is possible to save the weight of the supporting member by using a light material such as one of the aluminum alloy and the non-metallic material.

In accordance with a nineteenth aspect of the present invention, the bicycle rear sprocket assembly according to the eighteenth aspect is configured so that the non-metallic material includes a fiber-reinforced plastic.

With the bicycle rear sprocket assembly in accordance with the nineteenth aspect, it is to save the weight of the supporting member with maintaining the necessary strength of the bicycle rear sprocket assembly.

In accordance with a twentieth aspect of the present invention, the bicycle rear sprocket assembly according to any one of the first to nineteenth aspects is configured so that the plurality of sprocket members are made of a first material. The supporting member is made of a second material different from the first material.

With the bicycle rear sprocket assembly in accordance with the twentieth aspect, since the supporting member is made of the second material different from the first material of the plurality of sprocket members, it is possible to expand the design possibility of the bicycle rear sprocket assembly.

In accordance with a twenty-first aspect of the present invention, the bicycle rear sprocket assembly according to the twentieth aspect is configured so that the first material has a first relative density. The second material has a second relative density smaller than the first relative density.

With the bicycle rear sprocket assembly in accordance with the twenty-first aspect, since the second material has the second relative density smaller than the first relative density, it is possible to save the weight of the supporting member.

In accordance with a twenty-second aspect of the present invention, a bicycle rear sprocket assembly comprises a plurality of sprocket members and a supporting member. The plurality of sprocket members have a rotational center axis. The plurality of sprocket members are arranged in an axial direction parallel to the rotational center axis. The plurality of sprocket members each include a sprocket body and a plurality of sprocket teeth. The plurality of sprocket teeth extend radially outwardly from the sprocket body with respect to the rotational center axis. The supporting member has a small diameter end and a large diameter end opposite to the small diameter end in the axial direction. The supporting member includes a hub supported portion and a supporting portion. The hub supported portion is configured to be supported on a bicycle hub assembly. The hub supported portion includes a bearing supported section and a torque transmission section. The bearing supported section is closer to the small diameter end than the large diameter end in the axial direction and is configured to be supported by a bearing unit. The torque transmission section is closer to the large diameter end than the small diameter end in the axial direction. The torque transmission section is configured to transmit a torque from the plurality of sprocket members to the bicycle hub assembly. The supporting portion is provided radially outward of the hub supported portion with respect to the rotational center axis and is configured to support the plurality of sprocket members.

With the bicycle rear sprocket assembly in accordance with the twenty-second aspect, the hub supported portion includes the bearing supported section and the torque transmission section. The bearing supported section is closer to the small diameter end than the large diameter end in the axial direction. The torque transmission section is closer to the large diameter end than the small diameter end in the axial direction. Accordingly, it is possible to simplify the structure of the supporting member of the bicycle rear sprocket assembly.

In accordance with a twenty-third aspect of the present invention, the bicycle rear sprocket assembly according to the twenty-second aspect is configured so that the hub supported portion includes an additional bearing supported section configured to be supported by an additional bearing unit.

With the bicycle rear sprocket assembly in accordance with the twenty-third aspect, the additional bearing supported section makes the hub supported portion more stable relative to the rotational center axis.

In accordance with a twenty-fourth aspect of the present invention, the bicycle rear sprocket assembly according to the twenty-third aspect is configured so that the additional bearing supported section is positioned between the small diameter end and the large diameter end.

With the bicycle rear sprocket assembly in accordance with the twenty-fourth aspect, it is possible to make a middle section of the hub supported portion more stable relative to the rotational center axis.

In accordance with a twenty-fifth aspect of the present invention, the bicycle rear sprocket assembly according to the twenty-third or twenty-fourth aspect is configured so that the additional bearing supported section is closer to the large diameter end than the small diameter end in the axial direction.

With the bicycle rear sprocket assembly in accordance with the twenty-fifth aspect, the additional bearing supported part can make the larger diameter end more stable relative to the rotational center axis.

In accordance with a twenty-sixth aspect of the present invention, the bicycle rear sprocket assembly according to any one of the twenty-second to twenty-fifth aspects is configured so that the supporting member further includes an intermediate portion extending between the supporting portion and the hub supported portion in a radial direction with respect to the rotational center axis. The intermediate portion includes an opening.

With the bicycle rear sprocket assembly in accordance with the twenty-sixth aspect, the opening can reduce the weight of the supporting portions.

In accordance with a twenty-seventh aspect of the present invention, the bicycle rear sprocket assembly according to the twenty-sixth aspect is configured so that the intermediate portion includes reinforcing parts extending between the supporting portion and the hub engagement portion in the radial direction with respect to the rotational center axis. The reinforcing parts are spaced apart from each other in a circumferential direction with respect to the rotational center axis. At least one of the reinforcing parts includes the opening.

With the bicycle rear sprocket assembly in accordance with the twenty-seventh aspect, the reinforcing parts can improve the strength of the supporting member while the opening can reduce the weight of the supporting portions.

In accordance with a twenty-eighth aspect of the present invention, the bicycle rear sprocket assembly according to any one of the twenty-second to twenty-seventh aspects is configured so that the intermediate portion extends between the small diameter end and the large diameter end in the axial direction.

With the bicycle rear sprocket assembly in accordance with the twenty-eighth aspect, it is possible to improve the strength of the supporting member between the smaller diameter end and the larger diameter end.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
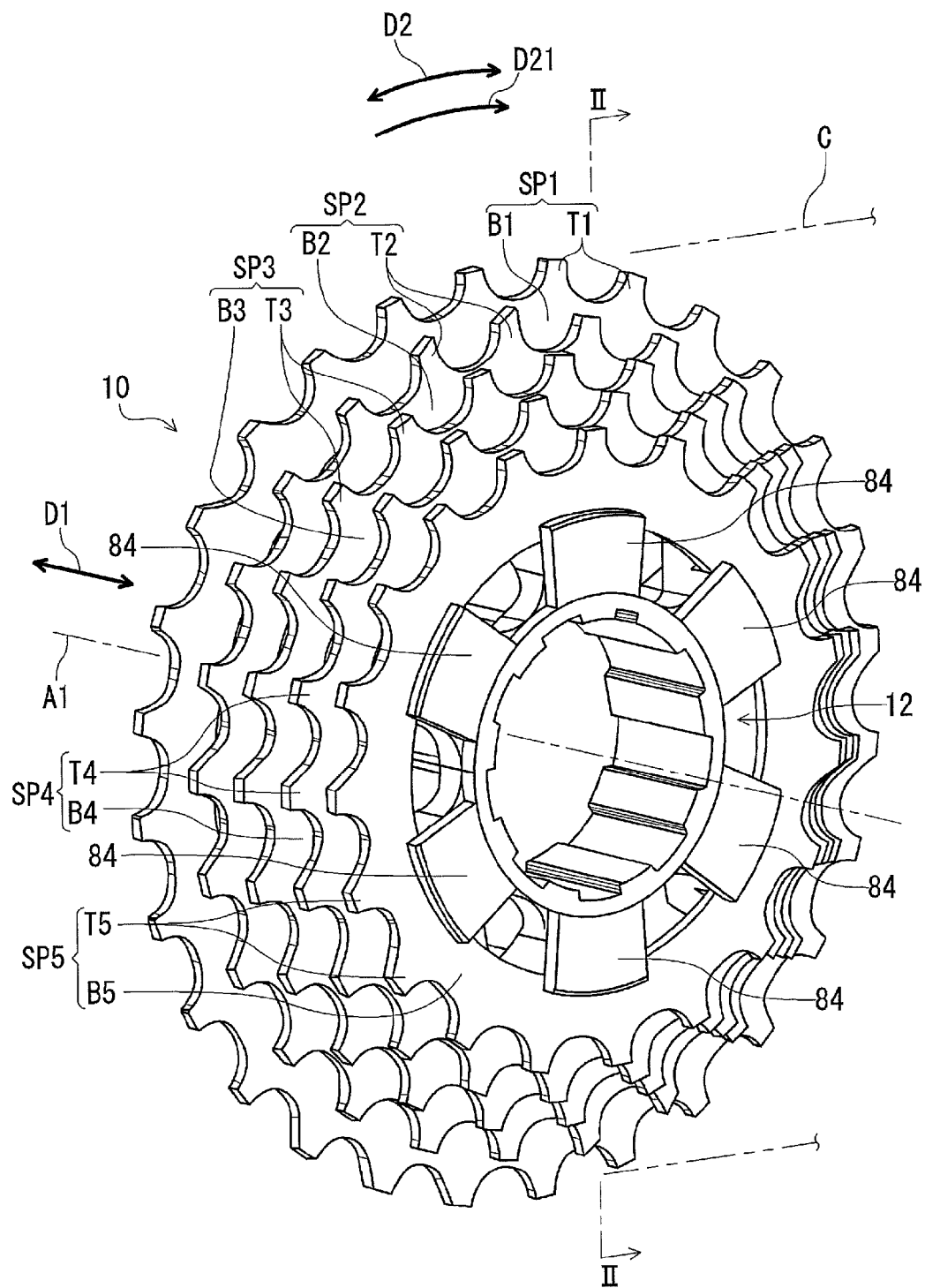
FIG. 1 is a perspective view of a bicycle rear sprocket assembly in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle rear sprocket assembly 10 in accordance with a first embodiment comprises a plurality of sprocket members SP1 to SP5 and a supporting member 12. The plurality of sprocket members SP1 to SP5 have a rotational center axis A1. The plurality of sprocket members SP1 to SP5 are arranged in an axial direction D1 parallel to the rotational center axis A1. In the illustrated embodiment, the sprocket member SP1 corresponds to low gear. A total number of the sprocket members SP1 to SP5 are not limited to the illustrated embodiment.

The bicycle rear sprocket assembly 10 is configured to engage with a bicycle chain C. The bicycle rear sprocket assembly 10 is configured to be rotated about the rotational center axis A1 in a driving rotational direction D21 during pedaling. The driving rotational direction D21 is defined along a circumferential direction D2 of the bicycle rear sprocket assembly 10.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle rear sprocket assembly 10, should be interpreted relative to the bicycle equipped with the bicycle rear sprocket assembly 10 as used in an upright riding position on a horizontal surface.

As seen in FIG. 1, the plurality of sprocket members SP1 to SP5 each includes a sprocket body and a plurality of sprocket teeth. In the illustrated embodiment, the sprocket member SP1 includes a sprocket body B1 and a plurality of sprocket teeth T1. The sprocket member SP2 includes a sprocket body B2 and a plurality of sprocket teeth T2. The sprocket member SP3 includes a sprocket body B3 and a plurality of sprocket teeth T3. The sprocket member SP4 includes a sprocket body B4 and a plurality of sprocket teeth T4. The sprocket member SP5 includes a sprocket body B5 and a plurality of sprocket teeth T5.

The plurality of sprocket teeth T1 extend radially outwardly from the sprocket body B1 with respect to the rotational center axis A1. The plurality of sprocket teeth T2 extend radially outwardly from the sprocket body B2 with respect to the rotational center axis A1. The plurality of sprocket teeth T3 extend radially outwardly from the sprocket body B3 with respect to the rotational center axis A1. The plurality of sprocket teeth T4 extend radially outwardly from the sprocket body B4 with respect to the rotational center axis A1. The plurality of sprocket teeth T5 extend radially outwardly from the sprocket body B5 with respect to the rotational center axis A1.

Figure 2:
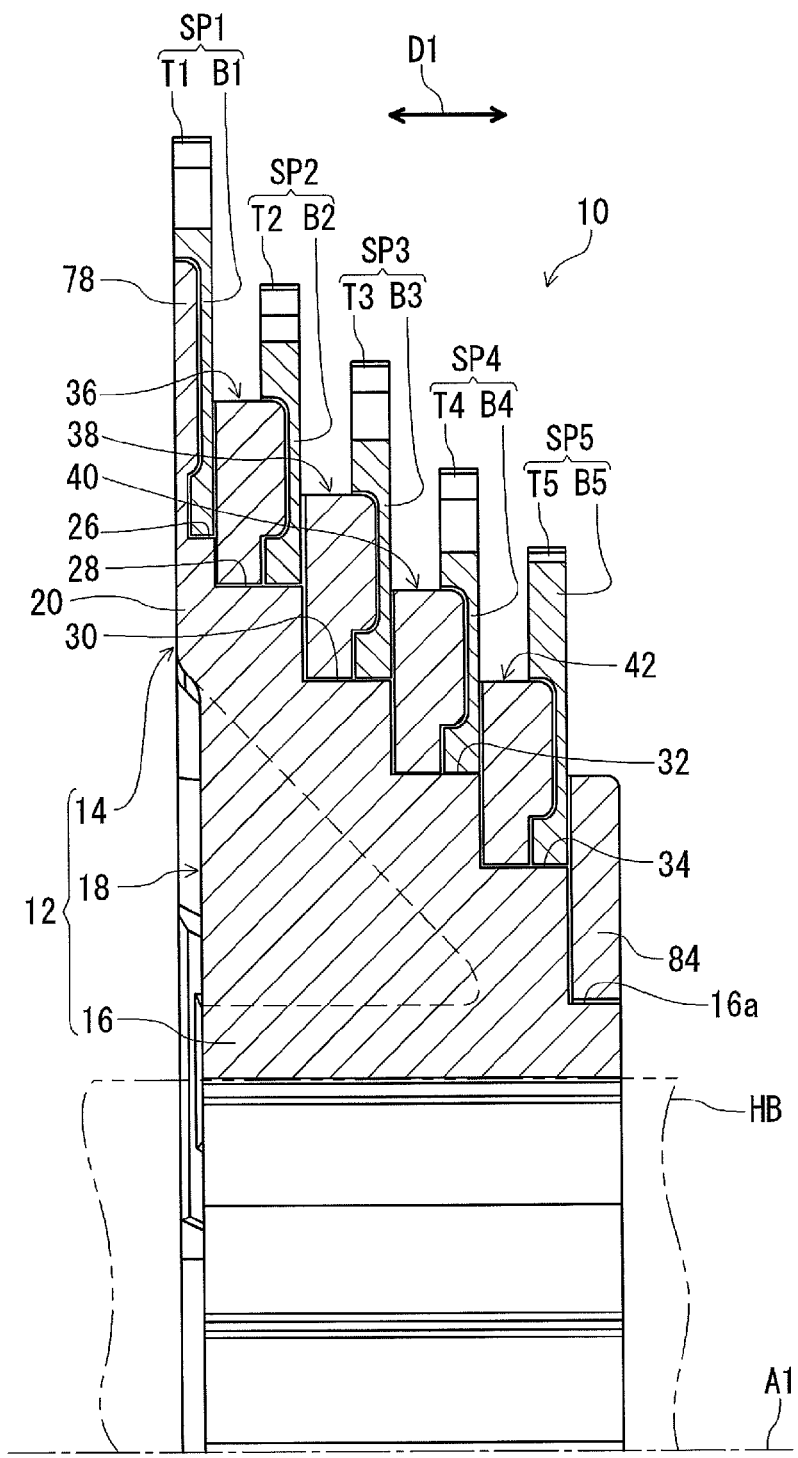
FIG. 2 is a partial cross-sectional view of the bicycle rear sprocket assembly taken along line II-II of FIG. 1.

As seen in FIG. 2, the supporting member 12 is a separate member from the plurality of sprocket members SP1 to SP5. The supporting member 12 includes a supporting portion 14 and a hub engagement portion 16. The supporting portion 14 is configured to support the plurality of sprocket members SP1 to SP5. The hub engagement portion 16 is configured to engage with a bicycle hub assembly HB. Specifically, the hub engagement portion 16 is configured to be splined to a sprocket support body (not shown) of the bicycle hub assembly HB.

The plurality of sprocket members SP1 to SP5 are made of a first material. The supporting member 12 is made of a second material different from the first material. Since the supporting member 12 is made of the second material different from the first material of the plurality of sprocket members SP1 to SP5, it is possible to expand the design possibility of the bicycle rear sprocket assembly 10.

The plurality of sprocket members SP1 to SP5 are made of the first material including at least one of an iron alloy, a titanium alloy and an aluminum alloy. In the illustrated embodiment, the plurality of sprocket members SP1 to SP5 are made of an iron alloy. However, the plurality of sprocket members SP1 to SP5 are made of the material selected from a group consisting of an iron alloy, a titanium alloy and an aluminum alloy if needed and/or desired. It is possible to save weight of the plurality of sprocket members SP1 to SP5 by using at least one of the iron alloy, the titanium alloy and the aluminum alloy.

The supporting member 12 is made of the second material including one of an aluminum alloy and a non-metallic material. While the plurality of sprocket members SP1 to SP5 is made of the aluminum alloy in the illustrated embodiment, the plurality of sprocket members SP1 to SP5 is made of the non-metallic material if needed and/or desired. In a state where the plurality of sprocket members SP1 to SP5 is made of the non-metallic material, the non-metallic material includes a fiber-reinforced plastic. Since the supporting member 12 is made of a light material such as the aluminum alloy and the non-metallic material, it is possible to save the weight of the supporting member 12.

The first material has a first relative density. The second material has a second relative density smaller than the first relative density. For example, the first relative density and the second relative density are defined based on a density of water. Since the second material has the second relative density smaller than the first relative density, it is possible to save the weight of the supporting member 12. This can reduce the weight of the bicycle rear sprocket assembly 10.

As seen in FIGS. 1 and 2, the sprocket body B1, B2, B3, B4, or B5 of each of the plurality of sprocket members SP1 to SP5 is attached to the supporting portion 14 of the supporting member 12 without using a separate metallic fastening member such as a rivet and a bolt. Specifically, as seen in FIG. 2, the sprocket body B1, B2, B3, B4, or B5 of each of the plurality of sprocket members SP1 to SP5 is attached to the supporting portion 14 via at least one of adhesive and diffusion bonding. In the illustrated embodiment, the sprocket body B1, B2, B3, B4, or B5 of each of the plurality of sprocket members SP1 to SP5 is attached to the supporting portion 14 via adhesive. However, the sprocket body B1, B2, B3, B4, or B5 of each of the plurality of sprocket members SP1 to SP5 can be attached to the supporting portion 14 via diffusion bonding. Since the sprocket body B1, B2, B3, B4, or B5 of each of the plurality of sprocket members SP1 to SP5 is attached to the supporting portion 14 via at least one of adhesive and diffusion bonding, it is possible to maintain the necessary strength of the bicycle rear sprocket assembly 10 without using the separate metallic fastening member.

As seen in FIG. 2, the supporting member 12 further includes an intermediate portion 18 extending between the supporting portion 14 and the hub engagement portion 16 in a radial direction with respect to the rotational center axis A1. The intermediate portion 18 can maintain or improve the strength of the supporting member 12.

Figure 3:
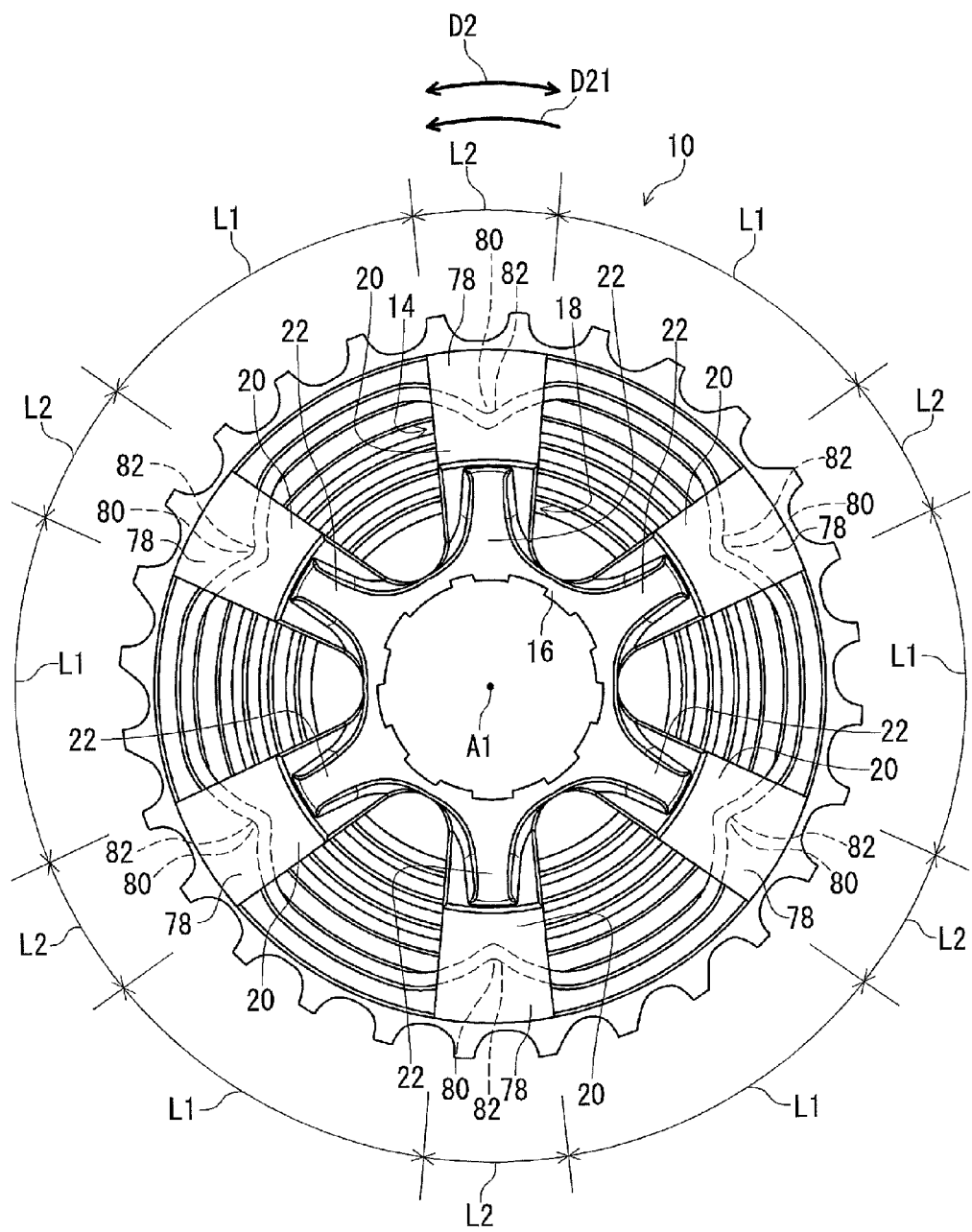
FIG. 3 is an elevational view of the bicycle rear sprocket assembly illustrated in FIG. 1.

As seen in FIG. 3, the supporting portion 14 includes a plurality of supporting parts 20 spaced apart from each other at circumferential intervals L1 in the circumferential direction D2 with respect to the rotational center axis A1. In the illustrated embodiment, the plurality of supporting parts 20 respectively have maximum circumferential lengths L2 defined in the circumferential direction D2. Each of the maximum circumferential lengths L2 of the plurality of supporting parts 20 is shorter than or equal to the circumferential intervals L1. Accordingly, it is possible to save the weight of the bicycle rear sprocket assembly 10 with maintaining the necessary strength of the bicycle rear sprocket assembly 10. In the illustrated embodiment, each of the maximum circumferential lengths of the plurality of supporting parts 20 is shorter than the circumferential intervals.

Figure 4:
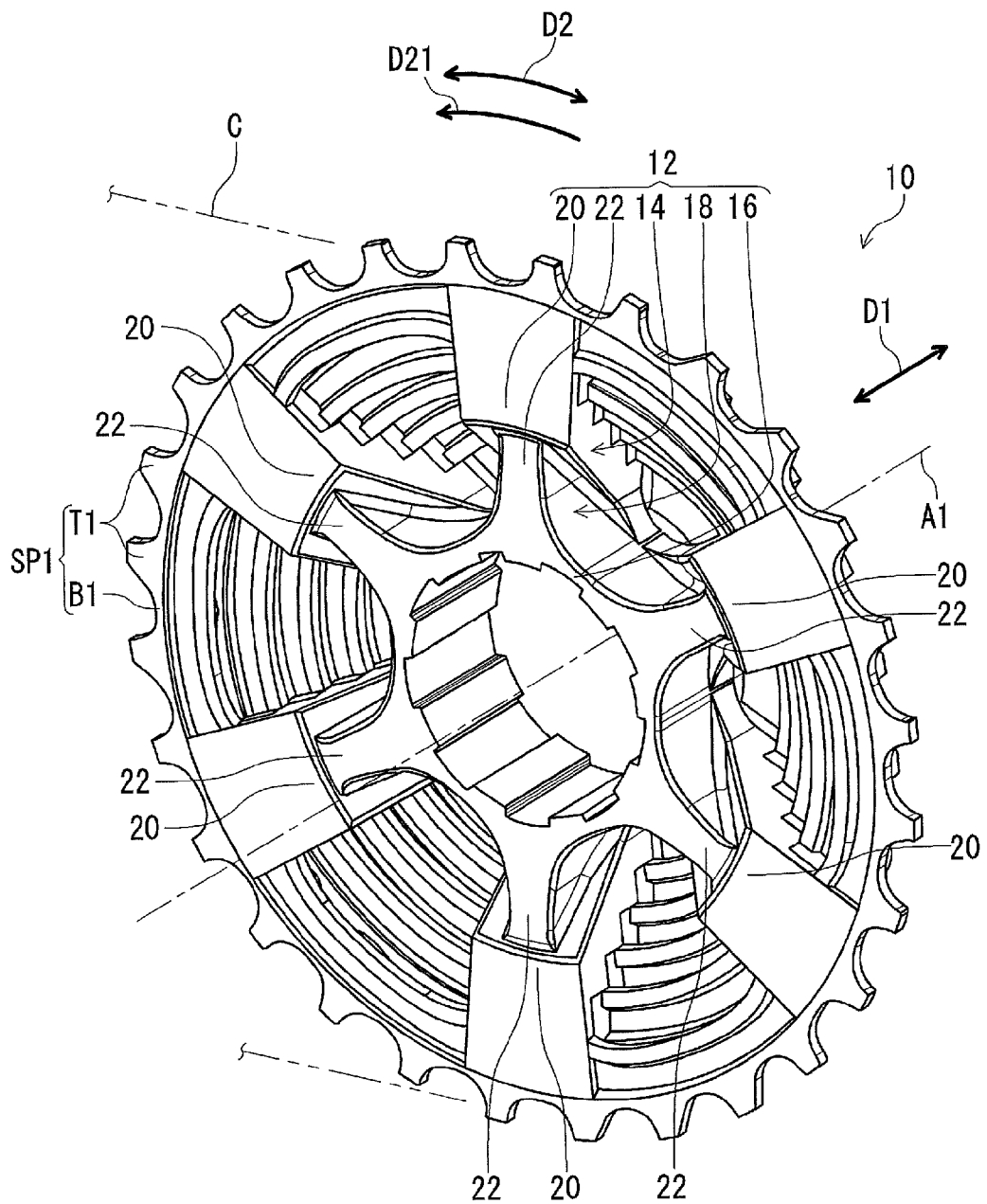
FIG. 4 is a perspective view of the bicycle rear sprocket assembly illustrated in FIG. 1.

As seen in FIGS. 3 and 4, the intermediate portion 18 includes reinforcing parts 22 extending between the supporting portion 14 and the hub engagement portion 16 in the radial direction with respect to the rotational center axis A1. The reinforcing parts 22 are spaced apart from each other in the circumferential direction D2 with respect to the rotational center axis A1. The reinforcing parts 22 can improve the strength of the supporting member 12. In the illustrated embodiment, each of the reinforcing parts 22 has a width smaller than each of the maximum circumferential lengths L2 of the plurality of supporting parts 20.

Figure 5:
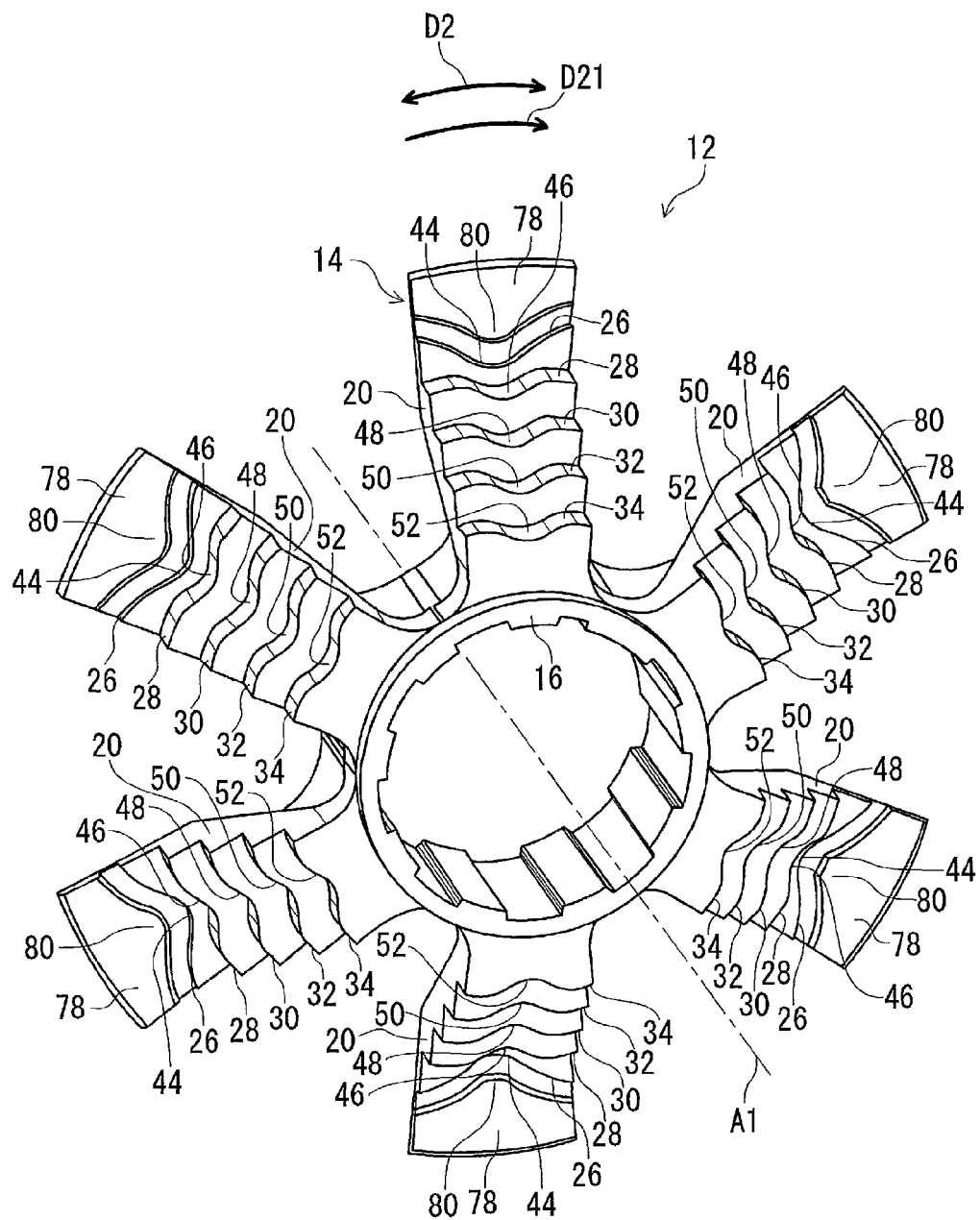
FIG. 5 is a perspective view of a supporting member of the bicycle rear sprocket assembly illustrated in FIG. 1.

As seen in FIGS. 2 and 5, the supporting portion 14 includes radially-supporting surfaces 26, 28, 30, 32, and 34 facing radially outwardly with respect to the rotational center axis A1. As seen in FIG. 2, the sprocket bodies B1 to B5 of the plurality of sprocket members SP1 to SP5 are respectively provided on the radially-supporting surfaces 26, 28, 30, 32, and 34. In the illustrated embodiment, as seen in FIG. 5, each of the supporting parts 20 includes the radially-supporting surfaces 26, 28, 30, 32, and 34. The radially-supporting surfaces 26, 28, 30, 32, and 34 can make it easier to radially position the plurality of sprocket members SP1 to SP5 relative to the supporting portion 14.

As seen in FIG. 2, the sprocket bodies B1 to B5 of the plurality of sprocket members SP1 to SP5 are respectively attached to the radially-supporting surfaces 26, 28, 30, 32, and 34. Specifically, the sprocket bodies B1 to B5 of the plurality of sprocket members SP1 to SP5 are respectively attached to the radially-supporting surfaces 26, 28, 30, 32, and 34 via at least one of adhesive and diffusion bonding. In the illustrated embodiment, the sprocket bodies B1 to B5 of the plurality of sprocket members SP1 to SP5 are respectively attached to the radially-supporting surfaces 26, 28, 30, 32, and 34 via adhesive. However, the sprocket bodies B1 to B5 of the plurality of sprocket members SP1 to SP5 can be respectively attached to the radially-supporting surfaces 26, 28, 30, 32, and 34 via diffusion bonding. Since the sprocket bodies B1 to B5 of the plurality of sprocket members SP1 to SP5 are respectively attached to the radially-supporting surfaces 26, 28, 30, 32, and 34, it is possible to maintain the necessary strength of the bicycle rear sprocket assembly 10 without the separate metallic fastening member.

As seen in FIG. 2, the supporting portion 14 includes a plurality of spacers 36, 38, 40, and 42. The plurality of spacers 36, 38, 40, and 42 are respectively provided between adjacent two of the plurality of sprocket members SP1 to SP5 in the axial direction D1. In the illustrated embodiment, the plurality of spacers 36, 38, 40, and 42 are respectively provided on the radially-supporting surfaces 28, 30, 32, and 34. The plurality of spacers 36, 38, 40, and 42 allow the plurality of sprocket members SP1 to SP5 to be easily positioned in the axial direction D1.

Figure 6:
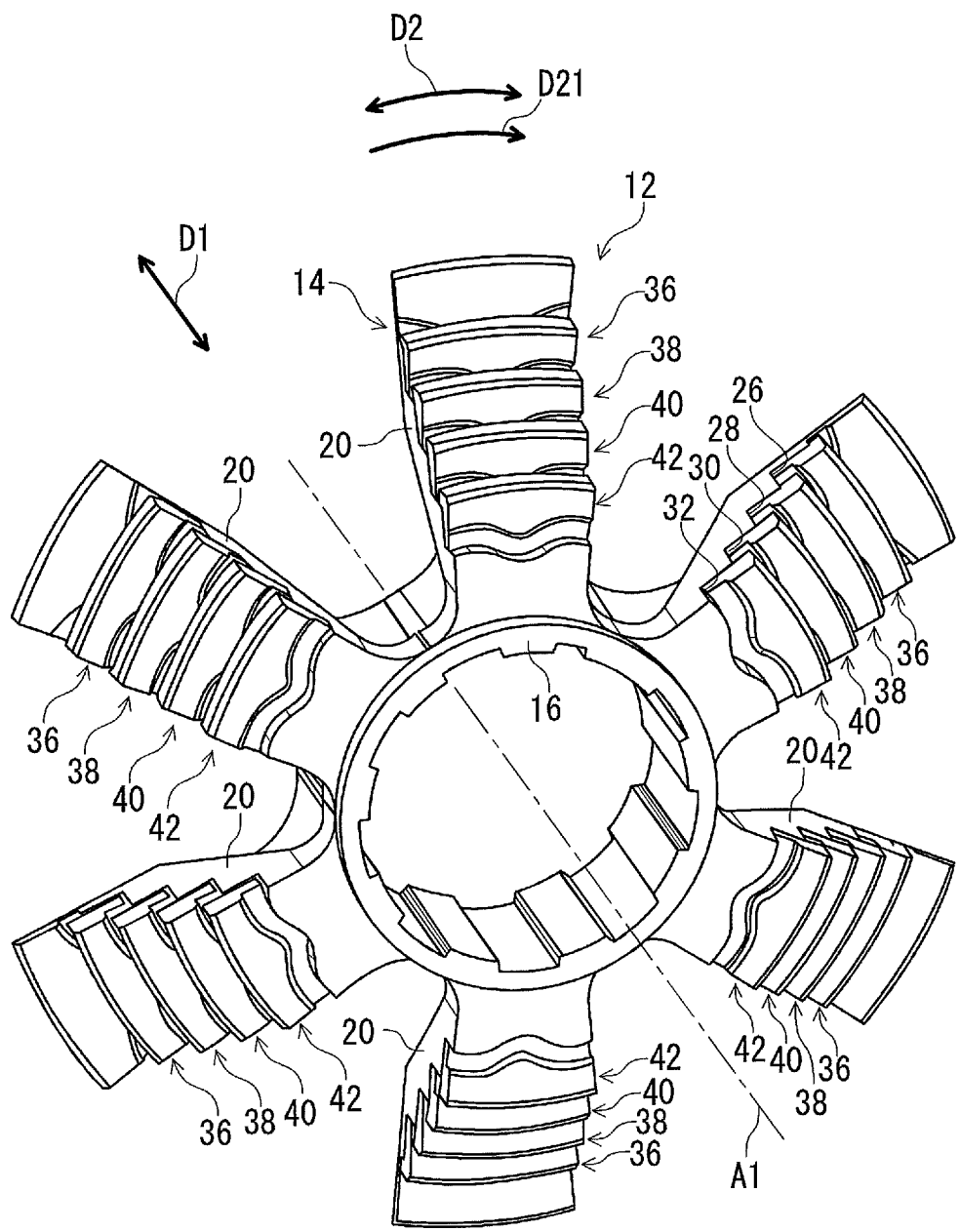
FIG. 6 is a perspective view of the supporting member and spacers of the bicycle rear sprocket assembly illustrated in FIG. 1.

As seen in FIG. 6, the spacers 36 are respectively mounted to the supporting parts 20 and are respectively provided on the radially-supporting surfaces 26. The spacers 36 are respectively attached to the radially-supporting surfaces 26. The spacers 38 are respectively mounted to the supporting parts 20 and are respectively provided on the radially-supporting surfaces 28. The spacers 38 are respectively attached to the radially-supporting surfaces 28. The spacers 40 are respectively mounted to the supporting parts 20 and are respectively provided on the radially-supporting surfaces 30. The spacers 40 are respectively attached to the radially-supporting surfaces 30. The spacers 42 are respectively mounted to the supporting parts 20 and are respectively provided on the radially-supporting surfaces 32. The spacers 42 are respectively attached to the radially-supporting surfaces 32. While the spacers 36, 38, 40, and 42 have substantially the same shape as each other in the illustrated embodiment, at least one of the spacers 36, 38, 40, and 42 may have different shapes from another spacer if needed and/or desired.

As seen in FIG. 2, in the illustrated embodiment, the plurality of spacers 36, 38, 40, and 42 are respectively attached to the adjacent two of the sprocket bodies B1 to B5 of the plurality of sprocket members SP1 to SP5. Specifically, the spacers 36 are attached to the sprocket bodies B1 and B2. The spacers 38 are attached to the sprocket bodies B2 and B3. The spacers 40 are attached to the sprocket bodies B3 and B4. The spacers 42 are attached to the sprocket bodies B4 and B5.

The plurality of spacers 36, 38, 40, and 42 are respectively attached to the adjacent two of the sprocket bodies B1 to B5 of the plurality of sprocket members SP1 to SP5 via at least one of adhesive and diffusion bonding. In the illustrated embodiment, the plurality of spacers 36, 38, 40, and 42 are respectively attached to the adjacent two of the sprocket bodies B1 to B5 of the plurality of sprocket members SP1 to SP5 via adhesive. Specifically, the spacers 36 are attached to the sprocket bodies B1 and B2 via adhesive. The spacers 38 are attached to the sprocket bodies B2 and B3 via adhesive. The spacers 40 are attached to the sprocket bodies B3 and B4 via adhesive. The spacers 42 are attached to the sprocket bodies B4 and B5 via adhesive. However, the plurality of spacers 36, 38, 40, and 42 can be respectively attached to the adjacent two of the sprocket bodies B1 to B5 of the plurality of sprocket members SP1 to SP5 via diffusion bonding. Since the plurality of spacers 36, 38, 40, and 42 are respectively attached to the adjacent two of the sprocket bodies B1 to B5 of the plurality of sprocket members SP1 to SP5 via at least one of adhesive and diffusion bonding, it is possible to maintain the necessary strength of the bicycle rear sprocket assembly 10 without the separate metallic fastening member.

As seen in FIG. 5, the supporting portion 14 includes first restricting parts 44, 46, 48, 50, and 52. The first restricting parts 44, 46, 48, and 50 are provided on the radially-supporting surfaces 26, 28, 30, 32, and 34. Specifically, the first restricting parts 44, 46, 48, 50, and 52 are respectively provided to the supporting parts 20. The first restricting parts 44 are respectively provided on the radially-supporting surfaces 26. The first restricting parts 46 are respectively provided on the radially-supporting surfaces 28. The first restricting parts 48 are respectively provided on the radially-supporting surfaces 30. The first restricting parts 50 are respectively provided on the radially-supporting surfaces 32. The first restricting parts 52 are respectively provided on the radially-supporting surfaces 34. In the illustrated embodiment, each of the first restricting parts 44, 46, 48, 50, and 52 has a concave shape which is radially inwardly recessed.

As seen in FIGS. 7 to 11, each of the sprocket bodies B1 to B5 of the plurality of sprocket members SP1 to SP5 includes a second restricting part. The first restricting parts 44, 46, 48, 50, and 52 of the supporting portion 14 are configured to respectively engage with the second restricting parts of the sprocket bodies B1 to B5 to restrict the sprocket bodies B1 to B5 from rotating relative to the supporting portion 14 about the rotational center axis A1.

Figure 7:
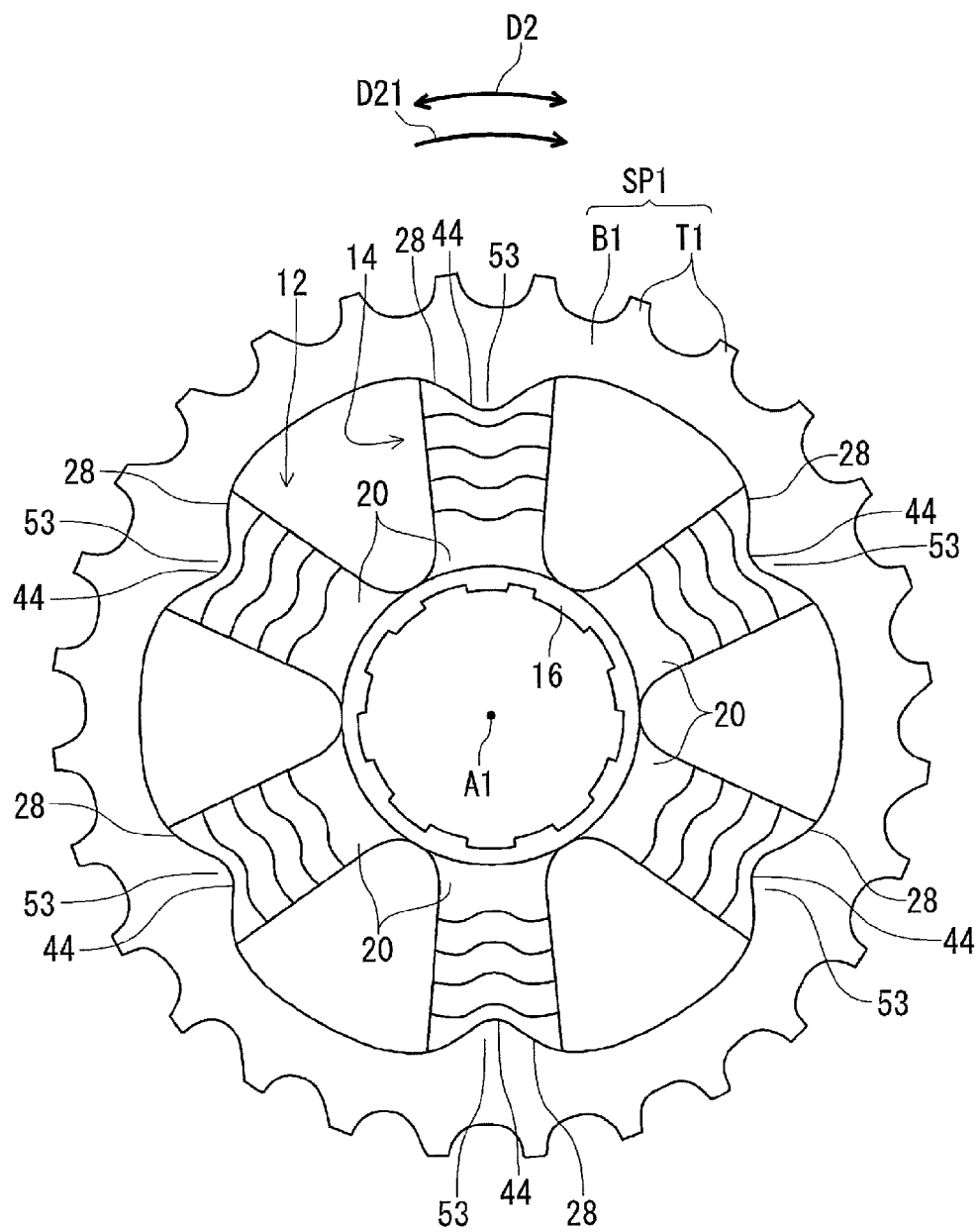
FIG. 7 is an elevational view of the supporting member and a sprocket of the bicycle rear sprocket assembly illustrated in FIG. 1.

Specifically, as seen in FIG. 7, the sprocket body B1 includes second restricting parts 53 spaced apart from each other in the circumferential direction D2. In the illustrated embodiment, the second restricting parts 53 have a convex shape radially inwardly extending. The first restricting parts 44 are configured to respectively engage with the second restricting parts 53 to restrict the sprocket body B1 from rotating relative to the supporting portion 14 about the rotational center axis A1. While the sprocket body B1 includes the second restricting parts 53 in the illustrated embodiment, a total number of the second restricting parts 53 is not limited to the illustrated embodiment.

Figure 8:
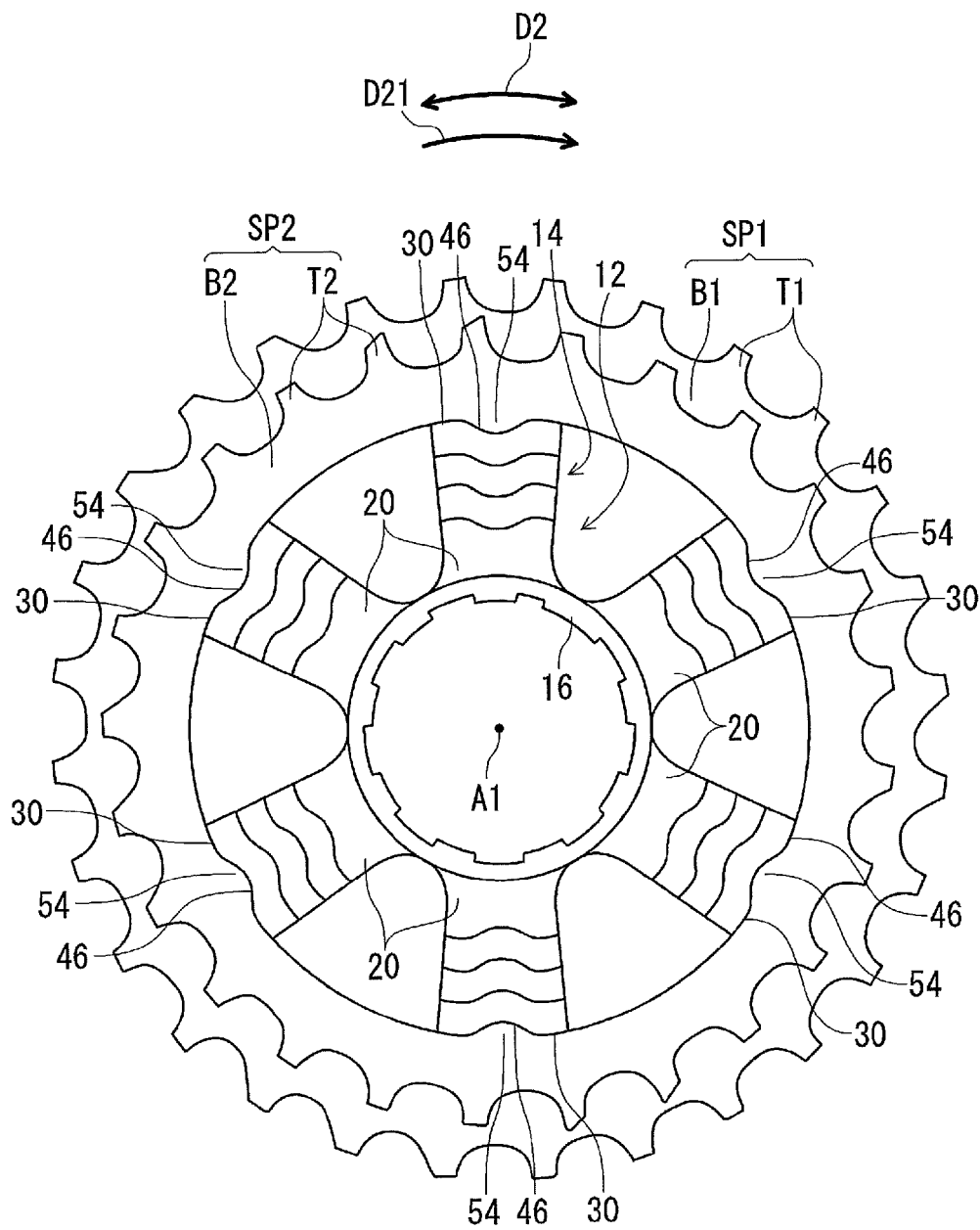
FIG. 8 is an elevational view of the supporting member and sprockets of the bicycle rear sprocket assembly illustrated in FIG. 1.

As seen in FIG. 8, the sprocket body B2 includes second restricting parts 54 spaced apart from each other in the circumferential direction D2. In the illustrated embodiment, the second restricting parts 54 have a convex shape radially inwardly extending. The first restricting parts 46 are configured to respectively engage with the second restricting parts 54 to restrict the sprocket body B2 from rotating relative to the supporting portion 14 about the rotational center axis A1. While the sprocket body B2 includes the second restricting parts 54 in the illustrated embodiment, a total number of the second restricting parts 54 is not limited to the illustrated embodiment.

Figure 9:
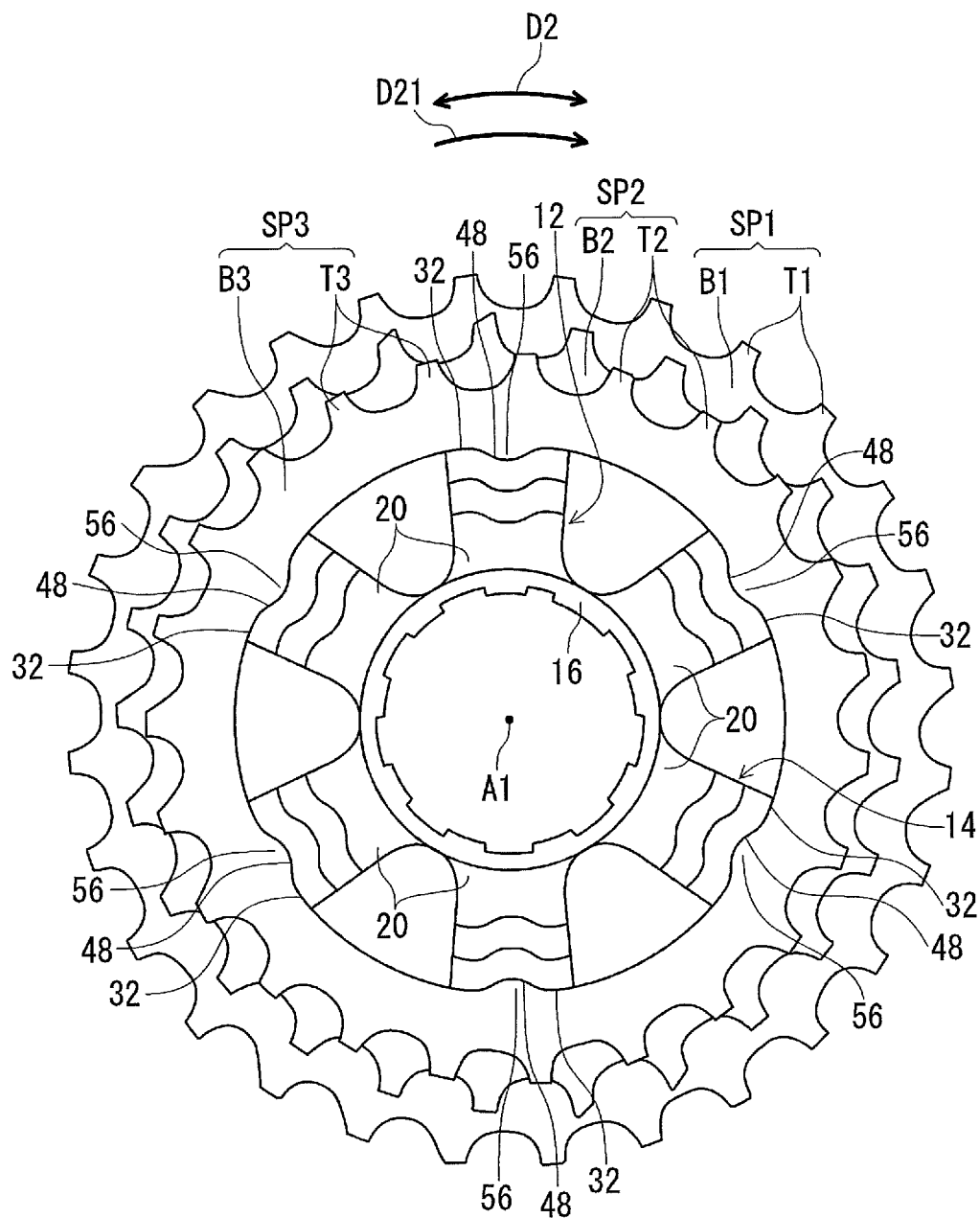
FIG. 9 is an elevational view of the supporting member and sprockets of the bicycle rear sprocket assembly illustrated in FIG. 1.

As seen in FIG. 9, the sprocket body B3 includes second restricting parts 56 spaced apart from each other in the circumferential direction D2. In the illustrated embodiment, the second restricting parts 56 have a convex shape radially inwardly extending. The first restricting parts 48 are configured to respectively engage with the second restricting parts 56 to restrict the sprocket body B3 from rotating relative to the supporting portion 14 about the rotational center axis A1. While the sprocket body B3 includes the second restricting parts 56 in the illustrated embodiment, a total number of the second restricting parts 56 is not limited to the illustrated embodiment.

Figure 10:
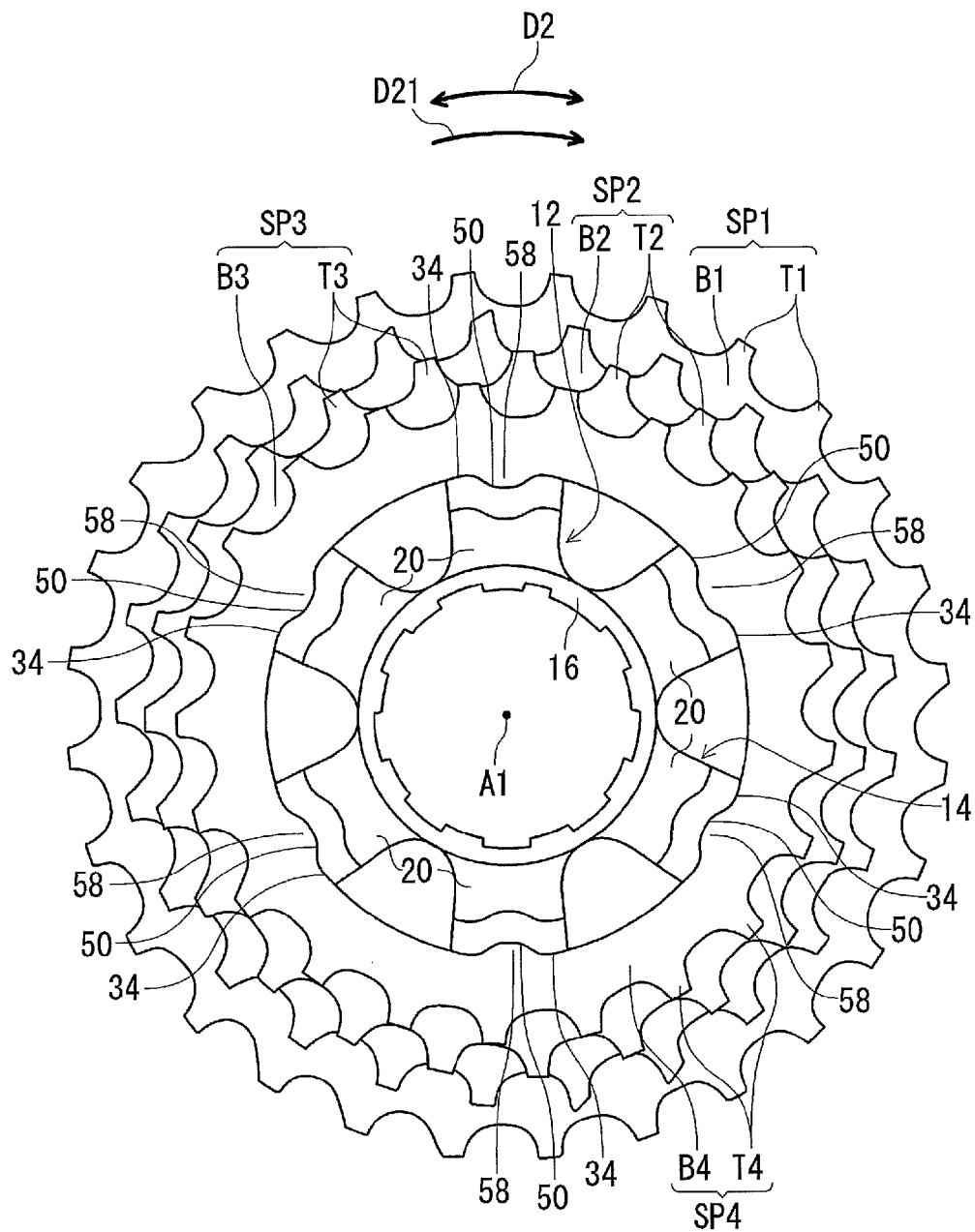
FIG. 10 is an elevational view of the supporting member and sprockets of the bicycle rear sprocket assembly illustrated in FIG. 1.

As seen in FIG. 10, the sprocket body B4 includes second restricting parts 58 spaced apart from each other in the circumferential direction D2. In the illustrated embodiment, the second restricting parts 58 have a convex shape radially inwardly extending. The first restricting parts 50 are configured to respectively engage with the second restricting parts 58 to restrict the sprocket body B4 from rotating relative to the supporting portion 14 about the rotational center axis A1. While the sprocket body B4 includes the second restricting parts 58 in the illustrated embodiment, a total number of the second restricting parts 58 is not limited to the illustrated embodiment.

Figure 11:
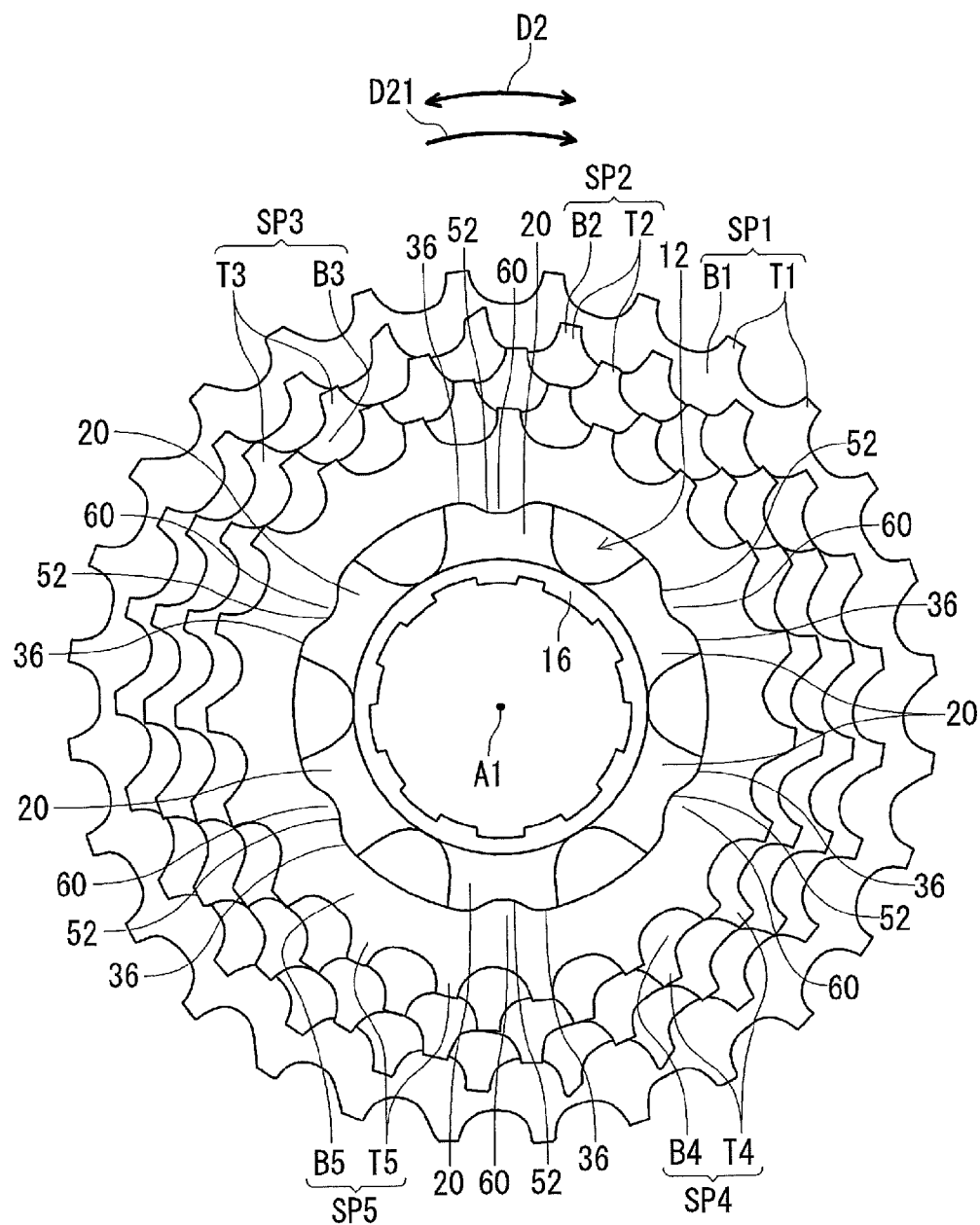
FIG. 11 is an elevational view of the supporting member and sprockets of the bicycle rear sprocket assembly illustrated in FIG. 1.

As seen in FIG. 11, the sprocket body B5 includes second restricting parts 60 spaced apart from each other in the circumferential direction D2. In the illustrated embodiment, the second restricting parts 60 have a convex shape radially inwardly extending. The first restricting parts 52 are configured to respectively engage with the second restricting parts 60 to restrict the sprocket body B5 from rotating relative to the supporting portion 14 about the rotational center axis A1. While the sprocket body B5 includes the second restricting parts 60 in the illustrated embodiment, a total number of the second restricting parts 60 is not limited to the illustrated embodiment.

The first restricting parts 44, 46, 48, 50 and 52 and the second restricting parts 53, 54, 56, 58 and 60 can improve the strength of the engagement between the supporting portion 14 and the sprocket members SP1 to SP5 in the circumferential direction D2. While the first restricting parts have a concave shape and the second restricting parts have a convex shape in the illustrated embodiment, the first restricting parts may have a convex shape and the second restricting parts may have a concave shape. Further, the first restricting parts and the second restricting parts may have a different shape from the illustrated embodiment as long as the first restricting parts are configured to respectively engage with the second restricting parts to restrict the sprocket bodies B1 to B5 from rotating relative to the supporting portion 14 about the rotational center axis A1.

Figure 12:
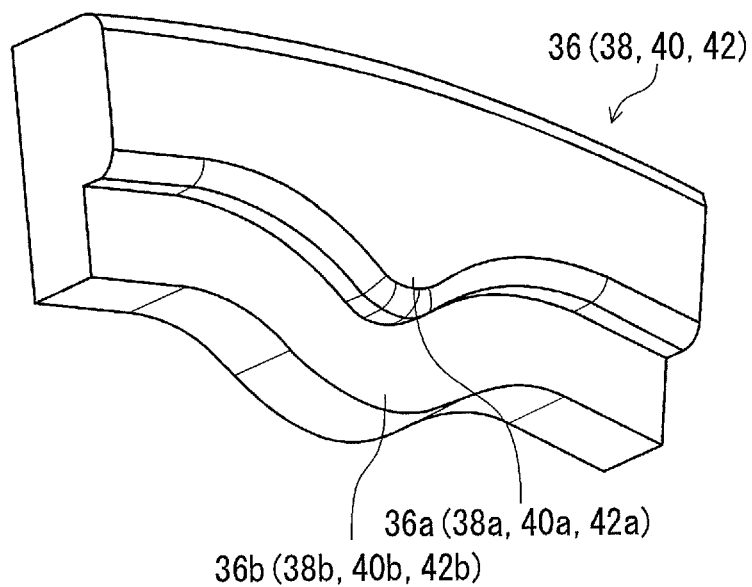
FIG. 12 is a perspective view of one of the spacers illustrated in FIG. 6.

As seen in FIG. 12, at least one of the plurality of spacers 36, 38, 40, and 42 includes a third restricting part. In the illustrated embodiment, each of the spacers 36 includes a third restricting part 36a. Each of the spacers 38 includes a third restricting part 38a. Each of the spacers 40 includes a third restricting part 40a. Each of the spacers 42 includes a third restricting part 42a. While each of the third restricting parts 36a, 38a, 40a, and 42a has a convex shape radially inwardly extending in the illustrated embodiment, the shapes of the third restricting parts 36a, 38a, 40a, and 42a are not limited to the illustrated embodiment.

Figure 13:
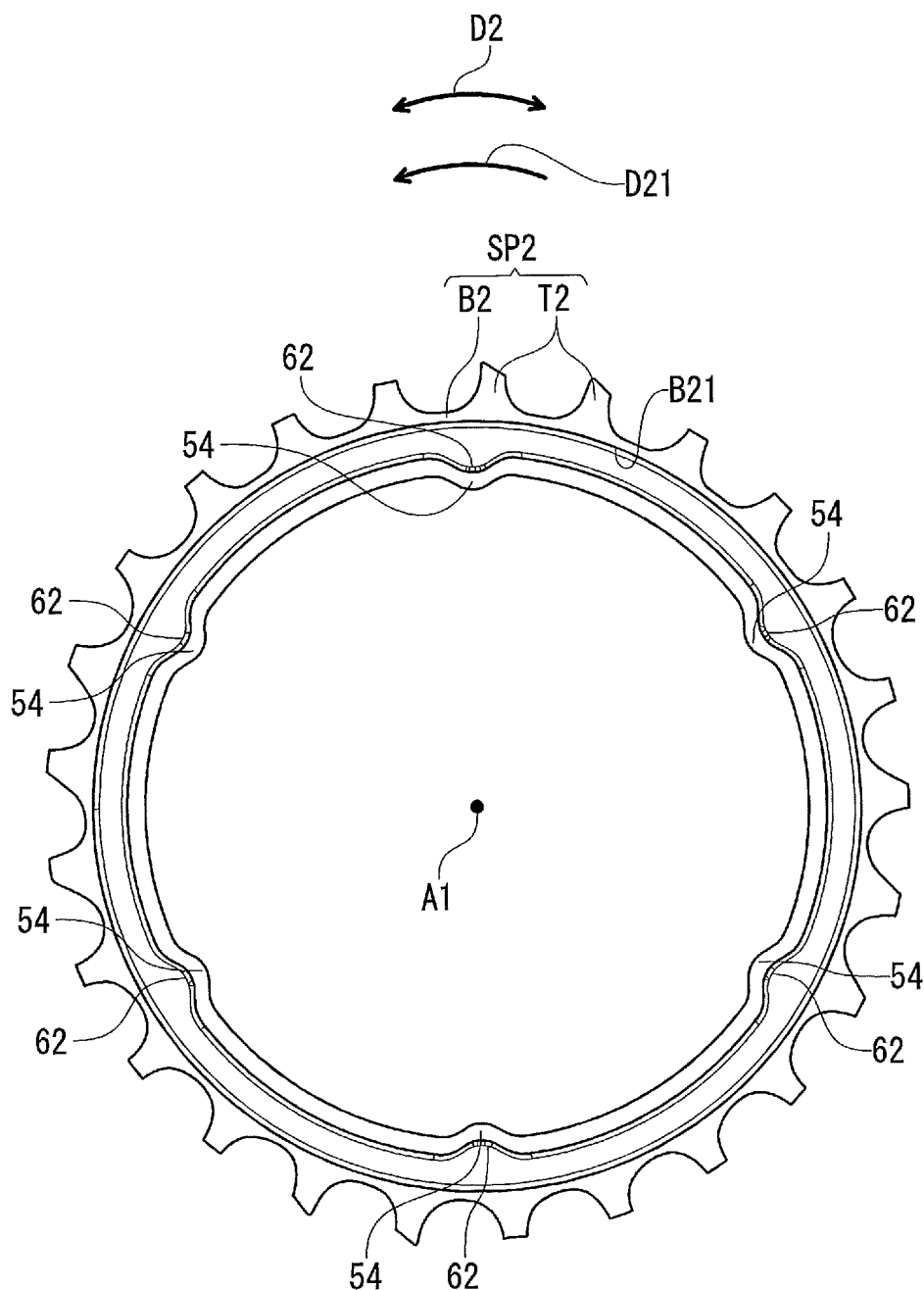
FIG. 13 is an elevational view of a sprocket of the bicycle rear sprocket assembly illustrated in FIG. 1.

As seen in FIGS. 13 to 16, at least one of the sprocket bodies B1 to B5 of the plurality of sprocket members SP1 to SP5 includes a fourth restricting part. In the illustrated embodiment, as seen in FIG. 13, the sprocket body B2 includes fourth restricting parts 62. In the illustrated embodiment, each of the fourth restricting parts 62 has a concave shape which is radially inwardly recessed. Specifically, the sprocket body B2 includes an annular groove B21. The annular groove B21 includes the fourth restricting parts 62. The fourth restricting parts 62 are provided at circumferential positions respectively corresponding to circumferential positions of the second restricting parts 54 in the circumferential direction D2. The fourth restricting parts 62 are respectively provided radially outward of the second restricting parts 54.

Figure 14:
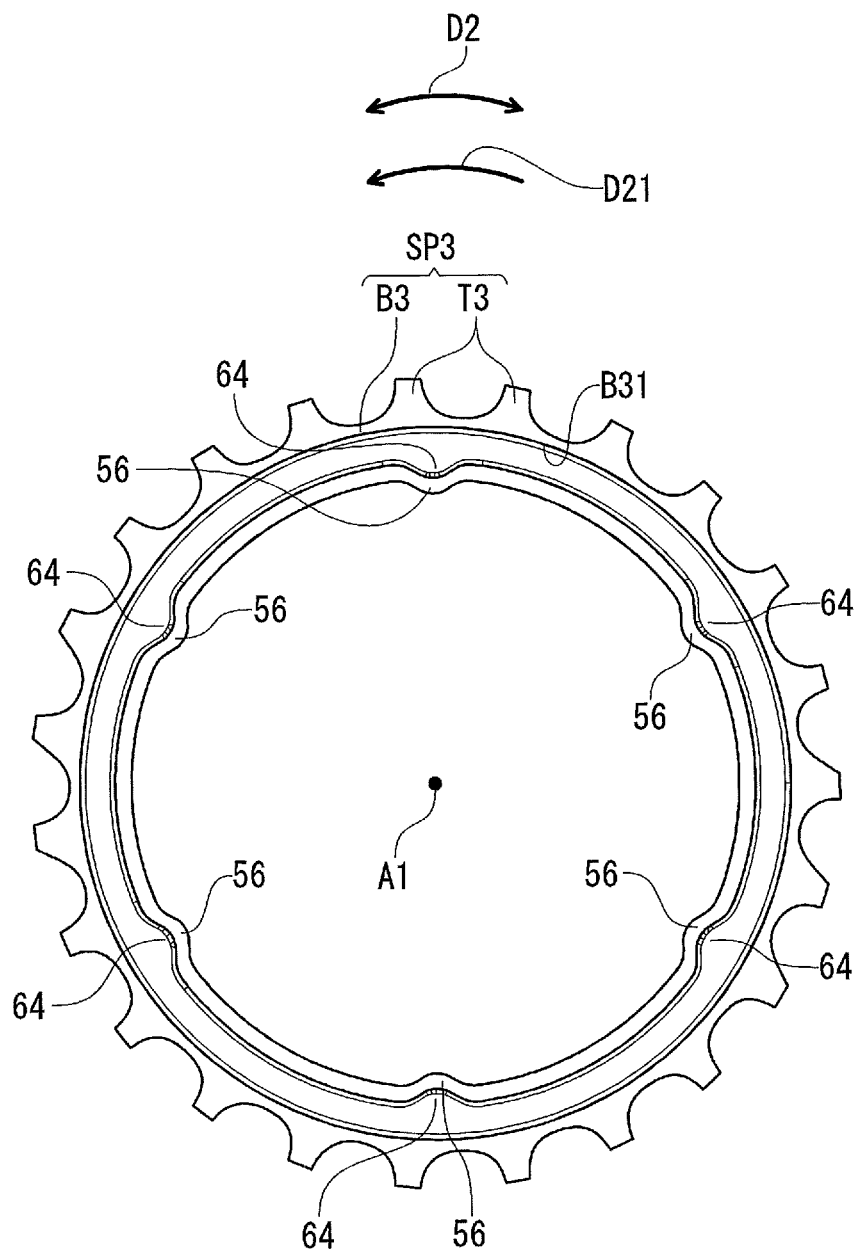
FIG. 14 is an elevational view of a sprocket of the bicycle rear sprocket assembly illustrated in FIG. 1.

As seen in FIG. 14, the sprocket body B3 includes fourth restricting parts 64. In the illustrated embodiment, each of the fourth restricting parts 64 has a concave shape which is radially inwardly recessed. Specifically, the sprocket body B3 includes an annular groove B31. The annular groove B31 includes the fourth restricting parts 64. The fourth restricting parts 64 are provided at circumferential positions respectively corresponding to circumferential positions of the second restricting parts 56 in the circumferential direction D2. The fourth restricting parts 64 are provided radially outward of the second restricting parts 56.

Figure 15:
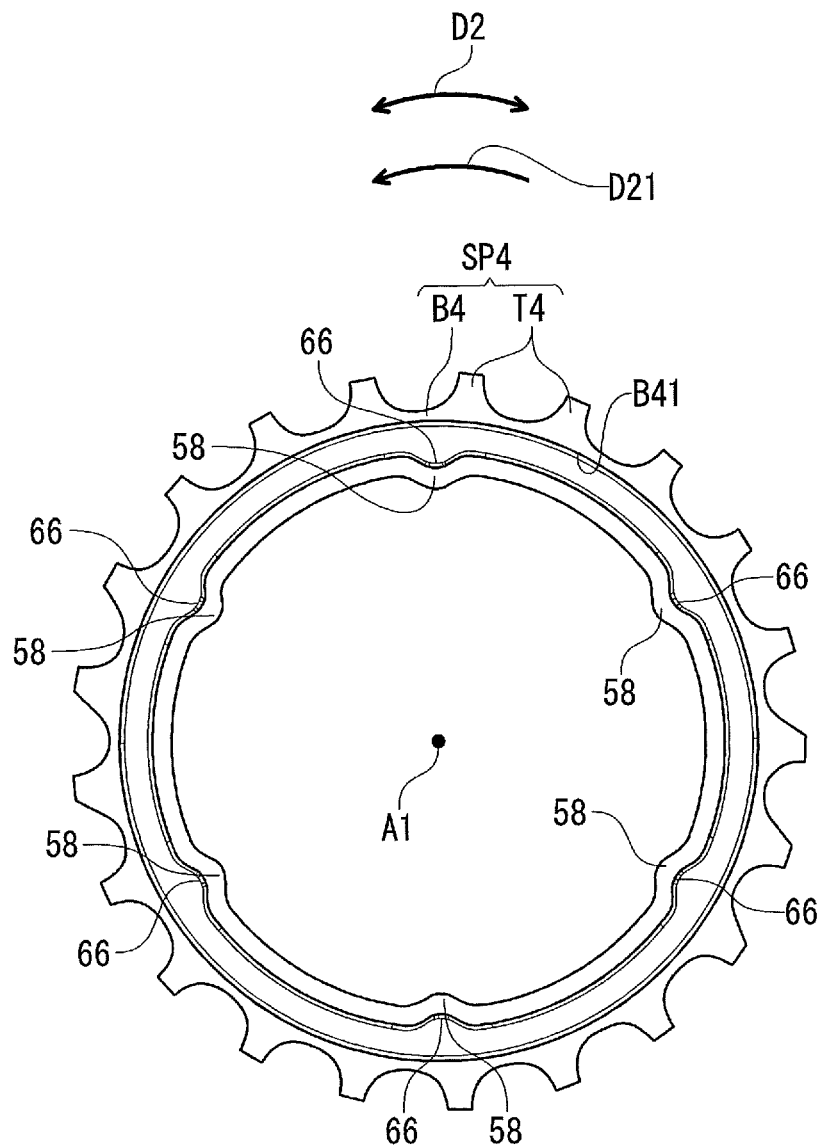
FIG. 15 is an elevational view of a sprocket of the bicycle rear sprocket assembly illustrated in FIG. 1.

As seen in FIG. 15, the sprocket body B4 includes fourth restricting parts 66. In the illustrated embodiment, each of the fourth restricting parts 66 has a concave shape which is radially inwardly recessed. Specifically, the sprocket body B4 includes an annular groove B41. The annular groove B41 includes the fourth restricting parts 66. The fourth restricting parts 66 are provided at circumferential positions respectively corresponding to circumferential positions of the second restricting parts 58 in the circumferential direction D2. The fourth restricting parts 66 are provided radially outward of the second restricting parts 58.

Figure 16:
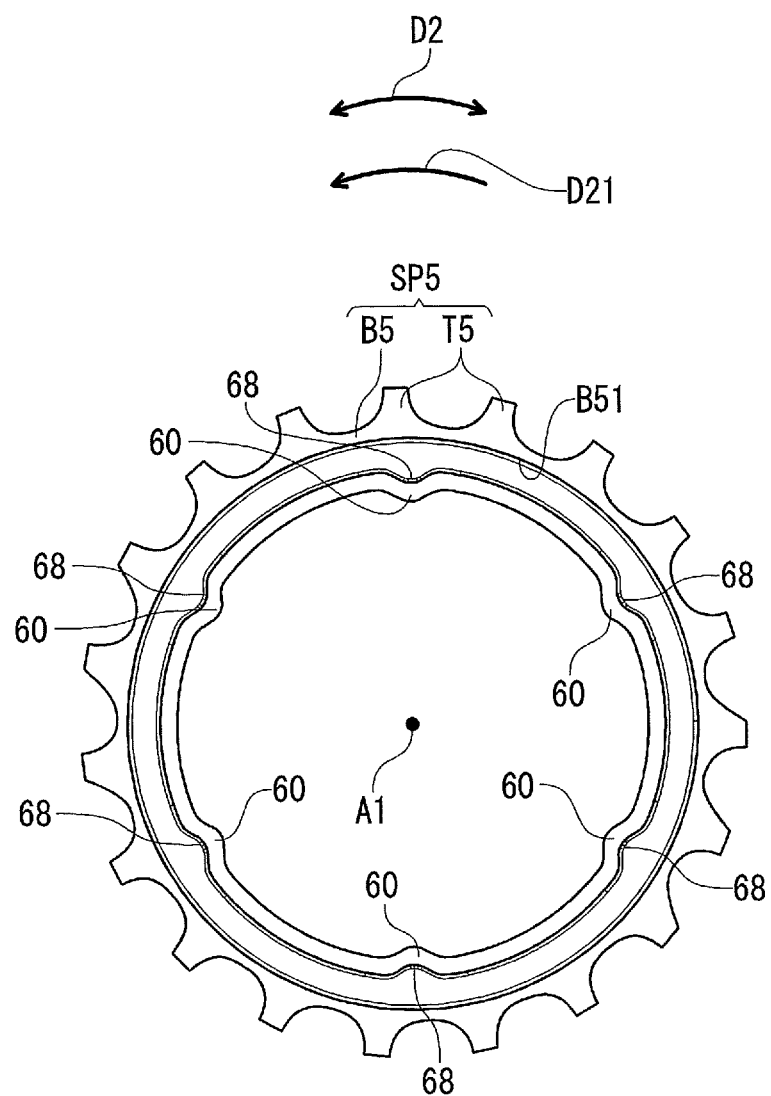
FIG. 16 is an elevational view of a sprocket of the bicycle rear sprocket assembly illustrated in FIG. 1.

As seen in FIG. 16, the sprocket body B5 includes fourth restricting parts 68. In the illustrated embodiment, each of the fourth restricting parts 68 has a concave shape which is radially inwardly recessed. Specifically, the sprocket body B5 includes an annular groove B51. The annular groove B51 includes the fourth restricting parts 68. The fourth restricting parts 68 are provided at circumferential positions respectively corresponding to circumferential positions of the second restricting parts 60 in the circumferential direction D2. The fourth restricting parts 68 are provided radially outward of the second restricting parts 60.

As seen in FIGS. 17 to 20, the third restricting part of the at least one of the plurality of spacers 36, 38, 40, and 42 is configured to respectively engage with the fourth restricting part of the at least one of the sprocket bodies B1 to B5 to restrict the at least one of the sprocket bodies B1 to B5 from rotating relative to the plurality of spacers 36, 38, 40, and 42 about the rotational center axis A1.

Figure 17:
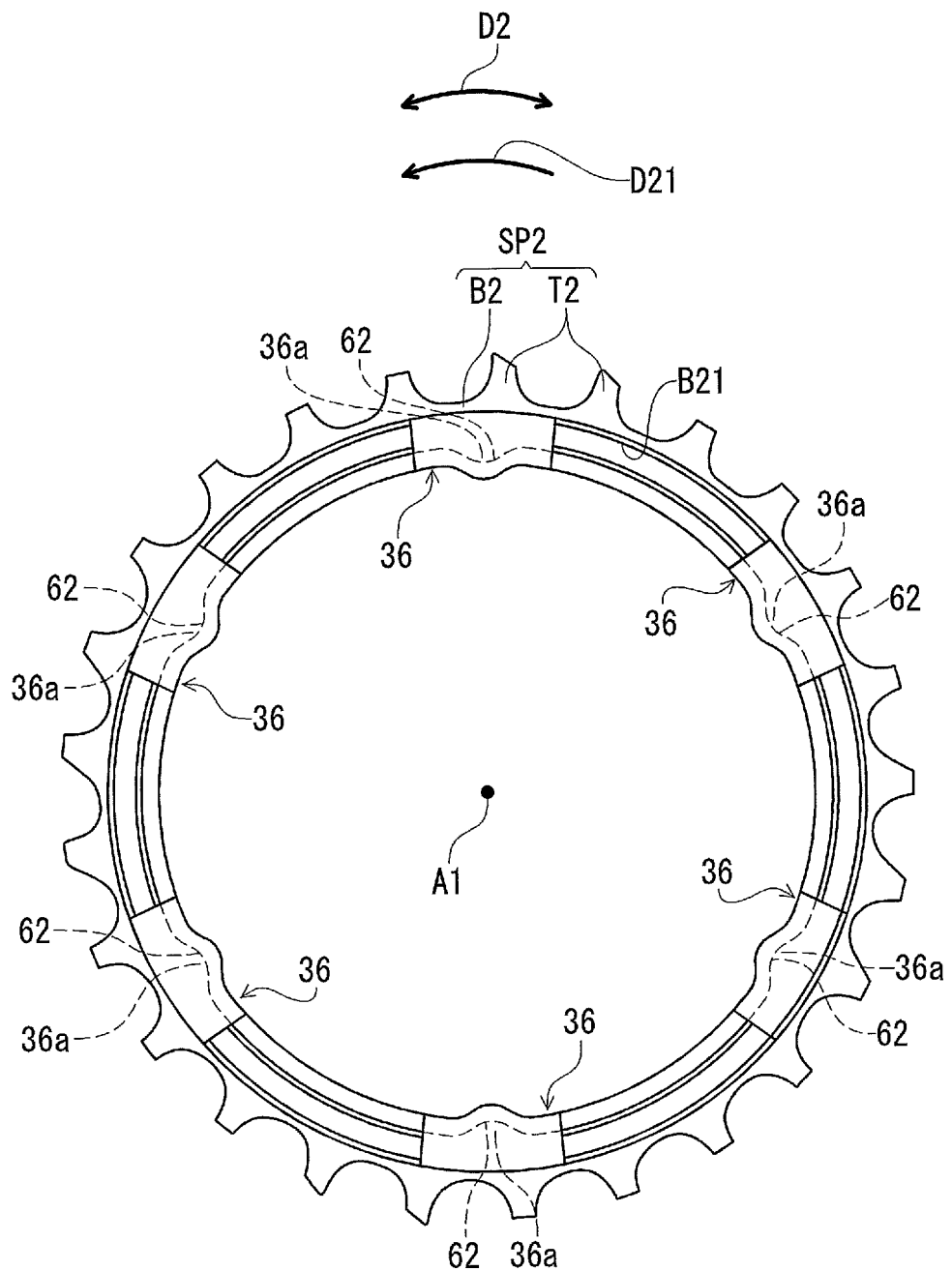
FIG. 17 is an elevational view of the sprocket illustrated in FIG. 13 with the spacers.

As seen in FIG. 17, the third restricting part 36a of the spacer 36 is configured to respectively engage with the fourth restricting part 62 of the sprocket body B2 to restrict the sprocket body B2 from rotating relative to the spacer 36 about the rotational center axis A1. Accordingly, it is possible to improve the strength of the engagement between the spacer 36 and the sprocket body B2 in the circumferential direction D2.

Figure 18:
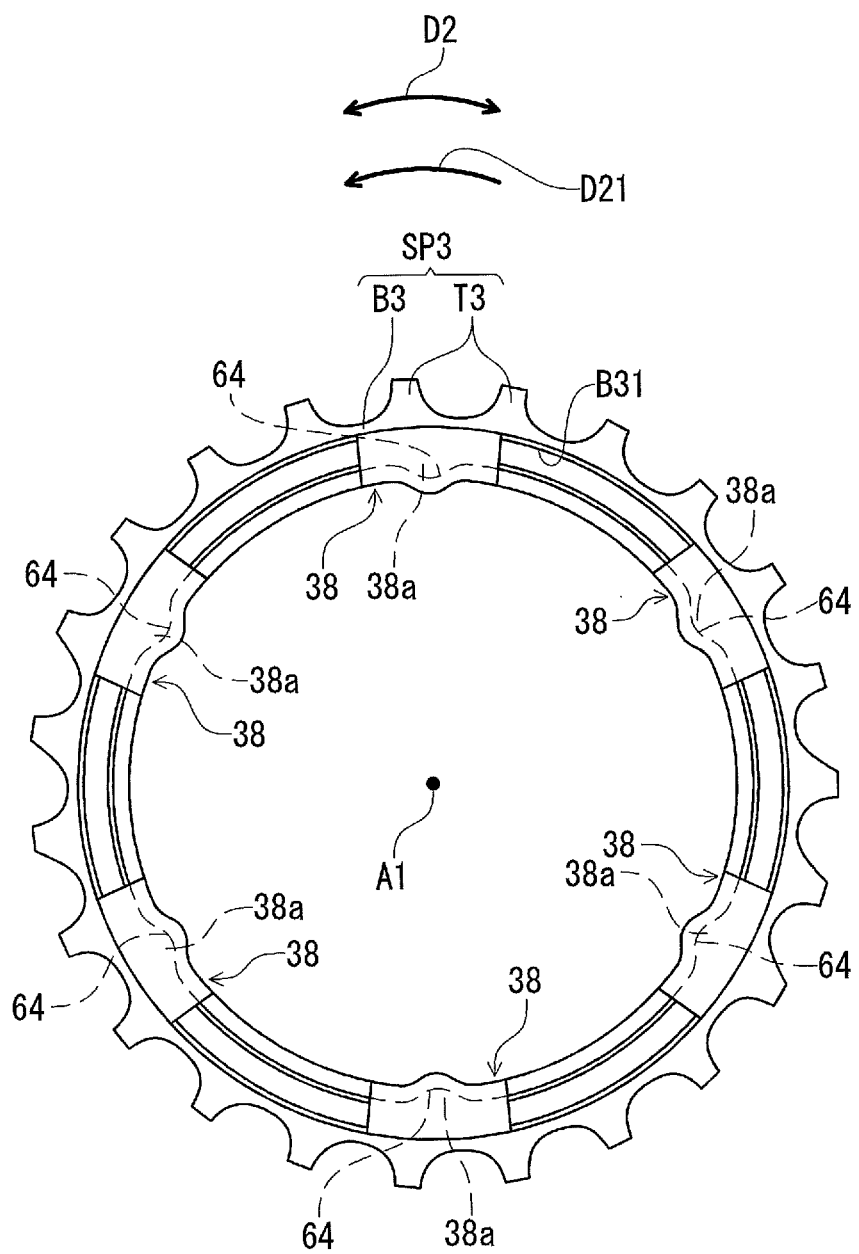
FIG. 18 is an elevational view of the sprocket illustrated in FIG. 14 with the spacers.

As seen in FIG. 18, the third restricting part 38a of the spacer 38 is configured to respectively engage with the fourth restricting part 64 of the sprocket body B3 to restrict the sprocket body B3 from rotating relative to the spacer 38 about the rotational center axis A1. Accordingly, it is possible to improve the strength of the engagement between the spacer 38 and the sprocket body B3 in the circumferential direction D2.

Figure 19:
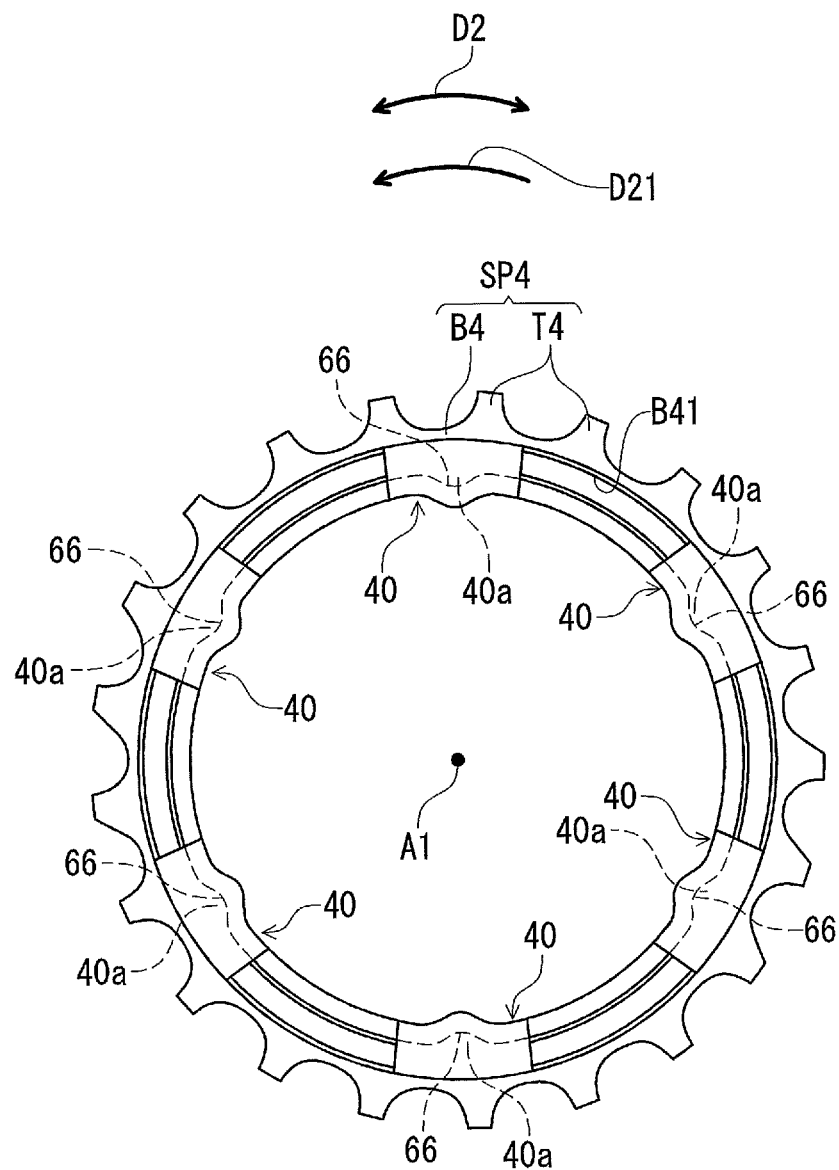
FIG. 19 is an elevational view of the sprocket illustrated in FIG. 15 with the spacers.

As seen in FIG. 19, the third restricting part 40a of the spacer 40 is configured to respectively engage with the fourth restricting part 66 of the sprocket body B4 to restrict the sprocket body B4 from rotating relative to the spacer 40 about the rotational center axis A1. Accordingly, it is possible to improve the strength of the engagement between the spacer 40 and the sprocket body B4 in the circumferential direction D2.

Figure 20:
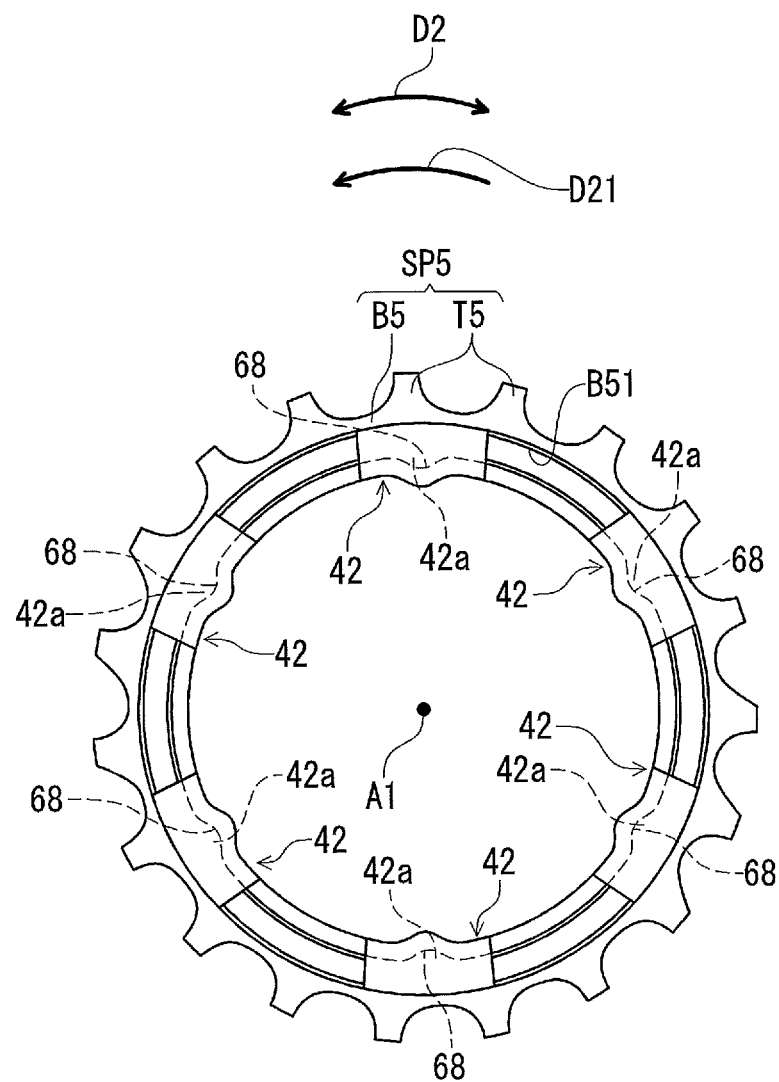
FIG. 20 is an elevational view of the sprocket illustrated in FIG. 16 with the spacers.

As seen in FIG. 20, the third restricting part 42a of the spacer 42 is configured to respectively engage with the fourth restricting part 68 of the sprocket body B5 to restrict the sprocket body B5 from rotating relative to the spacer 42 about the rotational center axis A1. Accordingly, it is possible to improve the strength of the engagement between the spacer 42 and the sprocket body B5 in the circumferential direction D2. Thus, the third restricting parts 36a, 38a, 40a and 42a and the fourth restricting parts 62, 64, 66 and 68 can improve the strength of the engagement between the spacers 36, 38, 40 and 42 and the sprocket members SP1 to SP5 in the circumferential direction D2. The third restricting parts and the fourth restricting parts may have a different shape from the illustrated embodiment as long as the third restricting parts are configured to respectively engage with the fourth restricting parts to restrict the sprocket bodies B1 to B5 from rotating relative to the plurality of spacers 36, 38, 40, and 42 about the rotational center axis A1.

Figure 21:
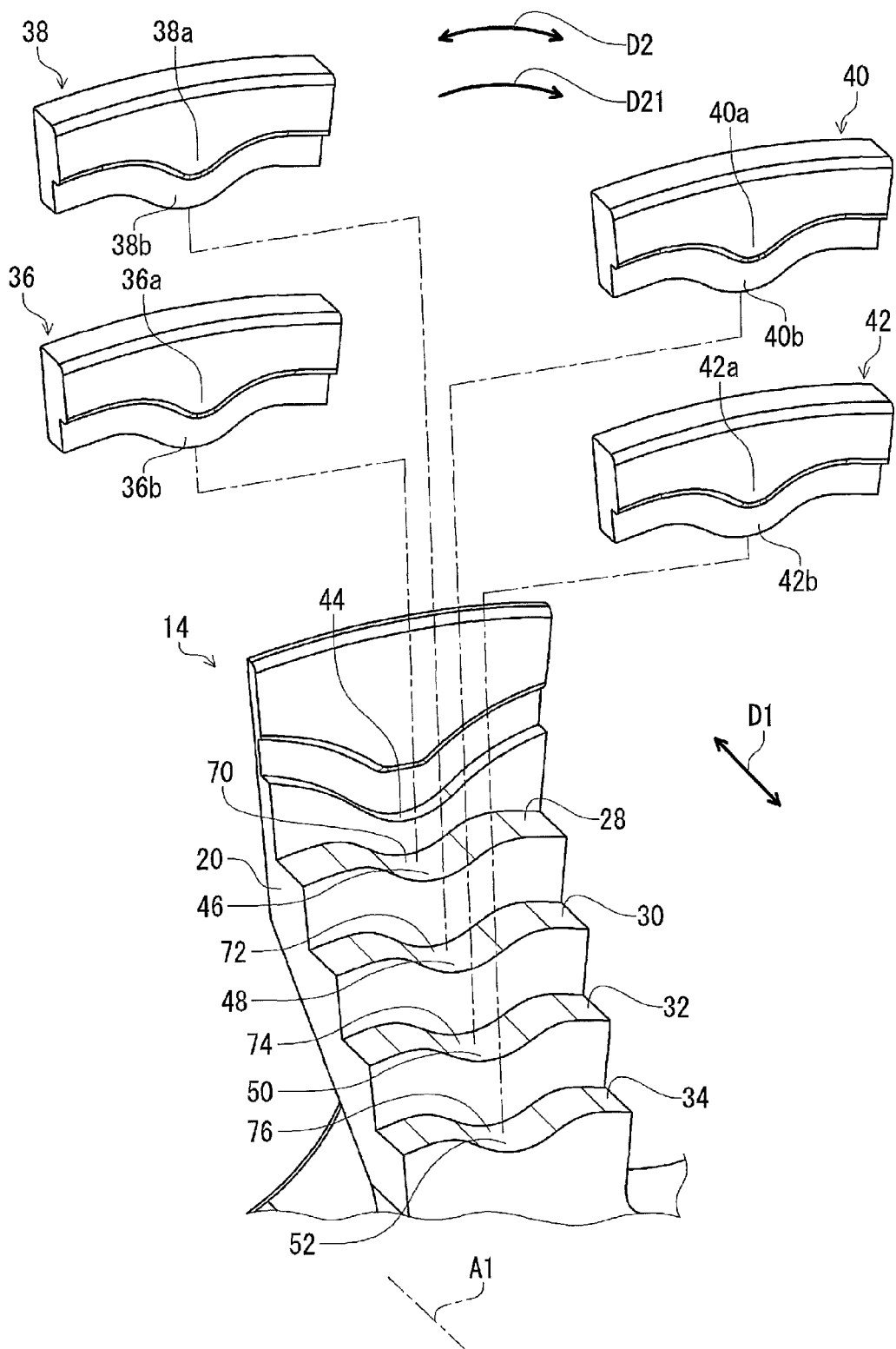
FIG. 21 is a partial perspective view of the supporting member and the spacers of the bicycle rear sprocket assembly illustrated in FIG. 1.

As seen in FIG. 21, the supporting portion 14 includes fifth restricting parts 70, 72, 74, and 76. The fifth restricting parts 70, 72, 74, and 76 are provided on the radially-supporting surfaces 28, 30, 32, and 34. In the illustrated embodiment, each of the fifth restricting parts 70, 72, 74, and 76 has a concave shape which is radially inwardly recessed. The fifth restricting parts 70, 72, 74, and 76 have substantially the same shape as each other. The fifth restricting part 70 is continuously provided with the first restricting part 46 in the axial direction D1 and has substantially the same shape as the shape of the first restricting part 46. The fifth restricting part 72 is continuously provided with the first restricting part 48 in the axial direction D1 and has substantially the same shape as the shape of the first restricting part 48. The fifth restricting part 74 is continuously provided with the first restricting part 50 in the axial direction D1 and has substantially the same shape as the shape of the first restricting part 50. The fifth restricting part 76 is continuously provided with the first restricting part 52 in the axial direction D1 and has substantially the same shape as the shape of the first restricting part 52.

As seen in FIG. 21, each of the plurality of spacers 36, 38, 40, and 42 includes a sixth restricting part. In the illustrated embodiment, each of the spacers 36 includes a sixth restricting part 36b. Each of the spacers 38 includes a sixth restricting part 38b. Each of the spacers 40 includes a sixth restricting part 40b. Each of the spacers 42 includes a sixth restricting part 42b. While each of the sixth restricting parts 36b, 38b, 40b, and 42b has a convex shape radially inwardly extending in the illustrated embodiment, the sixth restricting parts 36b, 38b, 40b, and 42b can have other shapes if needed and/or desired.

The fifth restricting parts 70, 72, 74, and 76 are configured to respectively engage with the sixth restricting parts 36b, 38b, 40b, and 42b of the plurality of spacers 36, 38, 40, and 42 to restrict the plurality of spacers 36, 38, 40, and 42 from rotating relative to the radially-supporting surfaces 28, 30, 32, and 34 about the rotational center axis A1. Accordingly, it is possible to improve the strength of the engagement between the supporting portion 14 and the spacers 36, 38, 40, and 42 in the circumferential direction D2.

In the illustrated embodiment, the fifth restricting part 70 is configured to respectively engage with the sixth restricting part 36b to restrict the spacer 36 from rotating relative to the radially-supporting surface 28 about the rotational center axis A1. The fifth restricting part 72 is configured to respectively engage with the sixth restricting part 38b to restrict the spacer 38 from rotating relative to the radially-supporting surface 30 about the rotational center axis A1. The fifth restricting part 74 is configured to respectively engage with the sixth restricting part 40b to restrict the spacer 40 from rotating relative to the radially-supporting surface 32 about the rotational center axis A1. The fifth restricting part 76 is configured to respectively engage with the sixth restricting part 42b to restrict the spacer 42 from rotating relative to the radially-supporting surface 34 about the rotational center axis A1. The fifth restricting parts and the sixth restricting parts may have a different shape from the illustrated embodiment as long as the fifth restricting parts are configured to respectively engage with the sixth restricting parts to restrict the spacers 36, 38, 40, and 42 from rotating relative to the radially-supporting surfaces 28, 30, 32, and 34 about the rotational center axis A1.

As seen in FIG. 5, the supporting portion 14 includes first axial end parts 78 provided on the supporting parts 20. The first axial end parts 78 respectively extend radially outwardly from the supporting parts 20. The first axial end parts 78 are integrally provided with the supporting parts 20. Each of the first axial end parts 78 includes a seventh restricting part 80. Each of the seventh restricting parts 80 has a convex shape radially inwardly extending.

Figure 22:
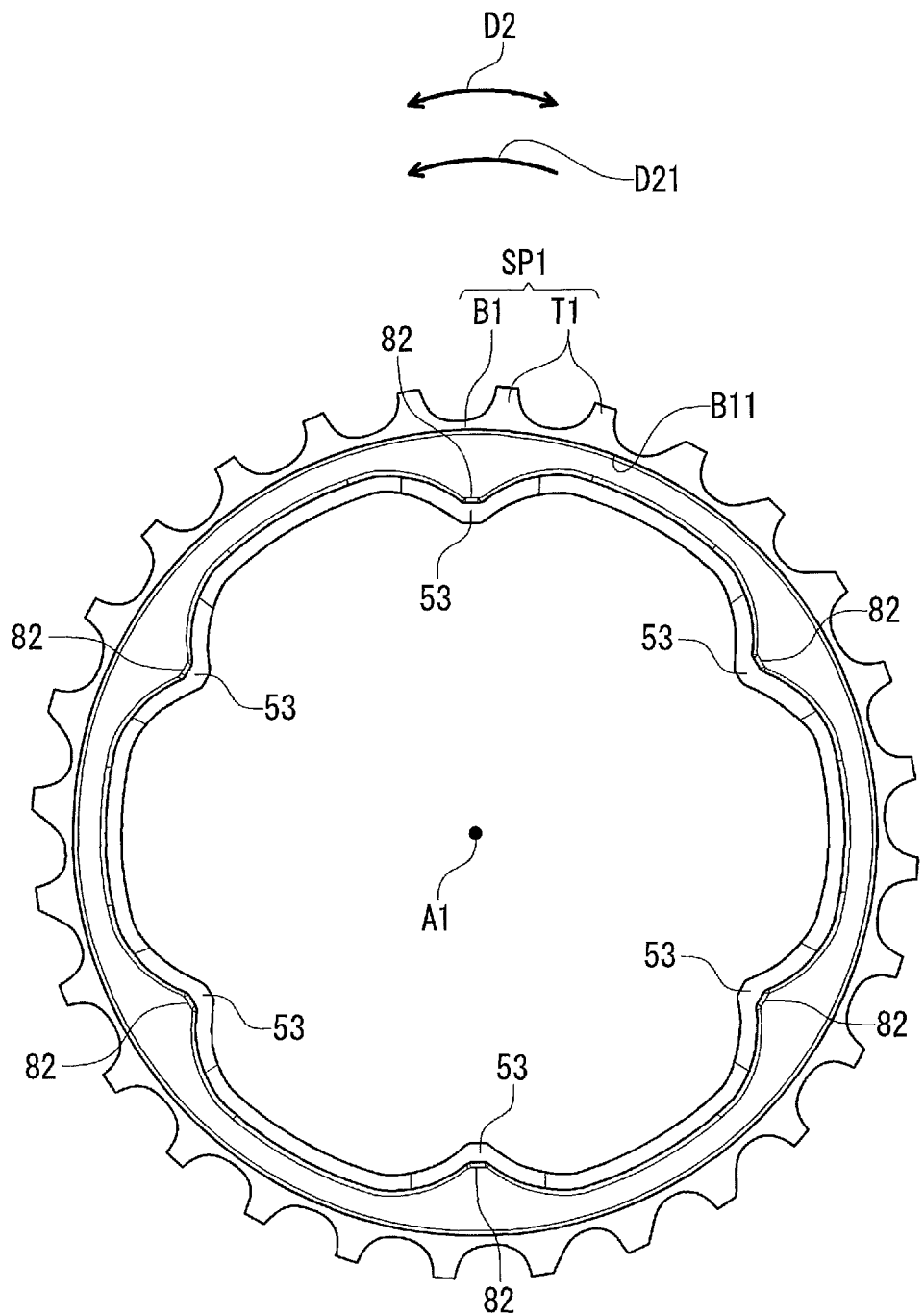
FIG. 22 is an elevational view of a sprocket of the bicycle rear sprocket assembly illustrated in FIG. 1.

As seen in FIG. 22, the sprocket body B1 of the sprocket member SP1 includes eighth restricting parts 82. Each of the eighth restricting parts 82 has a concave shape which is radially inwardly recessed. In the illustrated embodiment, the sprocket body B1 includes an annular groove B11. The annular groove B11 includes the eighth restricting parts 82. The eighth restricting parts 82 are provided at circumferential positions respectively corresponding to circumferential positions of the second restricting parts 53 in the circumferential direction D2. The eighth restricting parts 82 are respectively provided radially outward of the second restricting parts 53.

As seen in FIG. 3, the seventh restricting parts 80 are configured to respectively engage with the eighth restricting parts 82 to restrict the sprocket member SP1 from rotating relative to the supporting member 12 about the rotational center axis A1. The sprocket member SP1 is attached to the first axial end part 78 via at least one of adhesive and diffusion bonding. The seventh restricting parts and the eighth restricting parts may have a different shape from the illustrated embodiment as long as the seventh restricting parts are configured to respectively engage with the eighth restricting parts to restrict the sprocket member SP1 from rotating relative to the supporting member 12 about the rotational center axis A1.

As seen in FIG. 1, the supporting portion 14 includes second axial end parts 84 spaced apart from each other in the circumferential direction D2. As seen in FIG. 2, the second axial end part 84 is attached to the supporting part 20. The hub engagement portion 16 includes an annular surface 16a. The second axial end part 84 is mounted on the annular surface 16a. The sprocket members SP1 to SP5 are provided between the first axial end part 78 and the second axial end part 84 in the axial direction D1. The second axial end parts 84 are made of a metallic material including at least one of an iron alloy, a titanium alloy and an aluminum alloy. The second axial end parts 84 may also be made of a non-metallic material including a resin material. The non-metallic material can be a fiber reinforced plastic.

With the bicycle rear sprocket assembly 10, the sprocket body of each of the plurality of sprocket members SP1 to SP5 is attached to the supporting portion 14 of the supporting member 12 without using a separate metallic fastening member. Accordingly, it is possible to save weight of the bicycle rear sprocket assembly 10 with maintaining the necessary strength of the bicycle rear sprocket assembly 10.

Second Embodiment

A bicycle rear sprocket assembly 210 in accordance with a second embodiment will be described below referring to FIG. 23. The bicycle rear sprocket assembly 210 has the same construction as the bicycle rear sprocket assembly 10 except for the supporting parts 20. Thus, elements having substantially the same function as those in the first embodiment will be numbered the same here, and will not be described and/or illustrated again in detail here for the sake of brevity.

Figure 23:
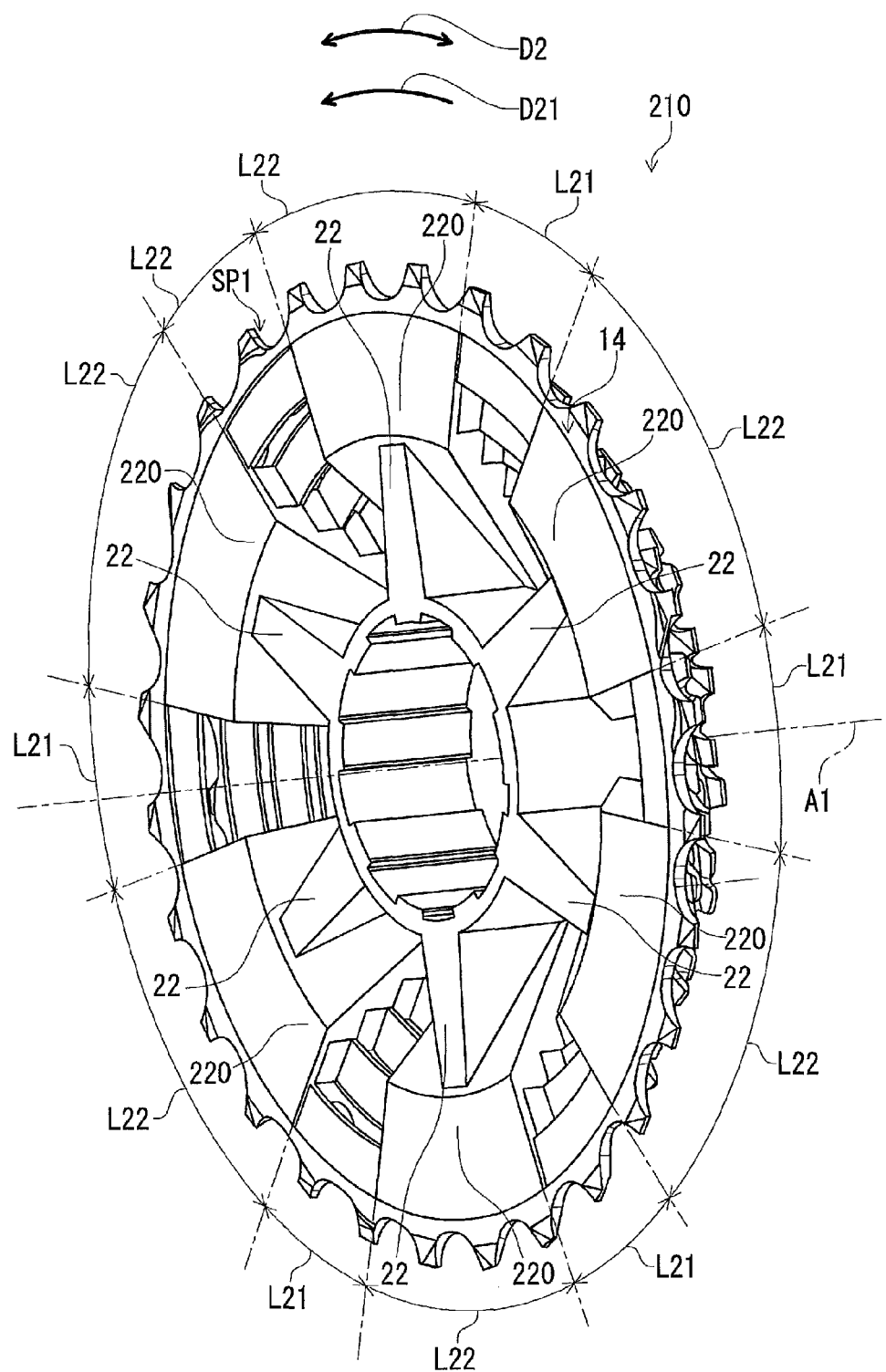
FIG. 23 is a perspective view of a bicycle rear sprocket assembly in accordance with a second embodiment.

As seen in FIG. 23, in the bicycle rear sprocket assembly 210, the supporting portion 14 includes a plurality of supporting parts 220 spaced apart from each other at circumferential intervals L21 in the circumferential direction D2 with respect to the rotational center axis A1. The plurality of supporting parts 220 have maximum circumferential lengths L22 defined in the circumferential direction D2. In the illustrated embodiment, each of the maximum circumferential lengths L22 of the plurality of supporting parts 20 is longer than the circumferential intervals L21. The supporting parts 220 have substantially the same structure as the structure of the supporting parts 20 in accordance with the first embodiment.

With the bicycle rear sprocket assembly 210, it is possible to obtain substantially the same advantageous effect as that of the bicycle rear sprocket assembly 10 in accordance with the first embodiment.

Third Embodiment

A bicycle rear sprocket assembly 310 in accordance with a third embodiment will be described below referring to FIGS. 24 to 33. The bicycle rear sprocket assembly 310 has the same construction as the bicycle rear sprocket assembly 10 except for the supporting portion and the spacers. Thus, elements having substantially the same function as those in the first embodiment will be numbered the same here, and will not be described and/or illustrated again in detail here for the sake of brevity.

Figure 24:
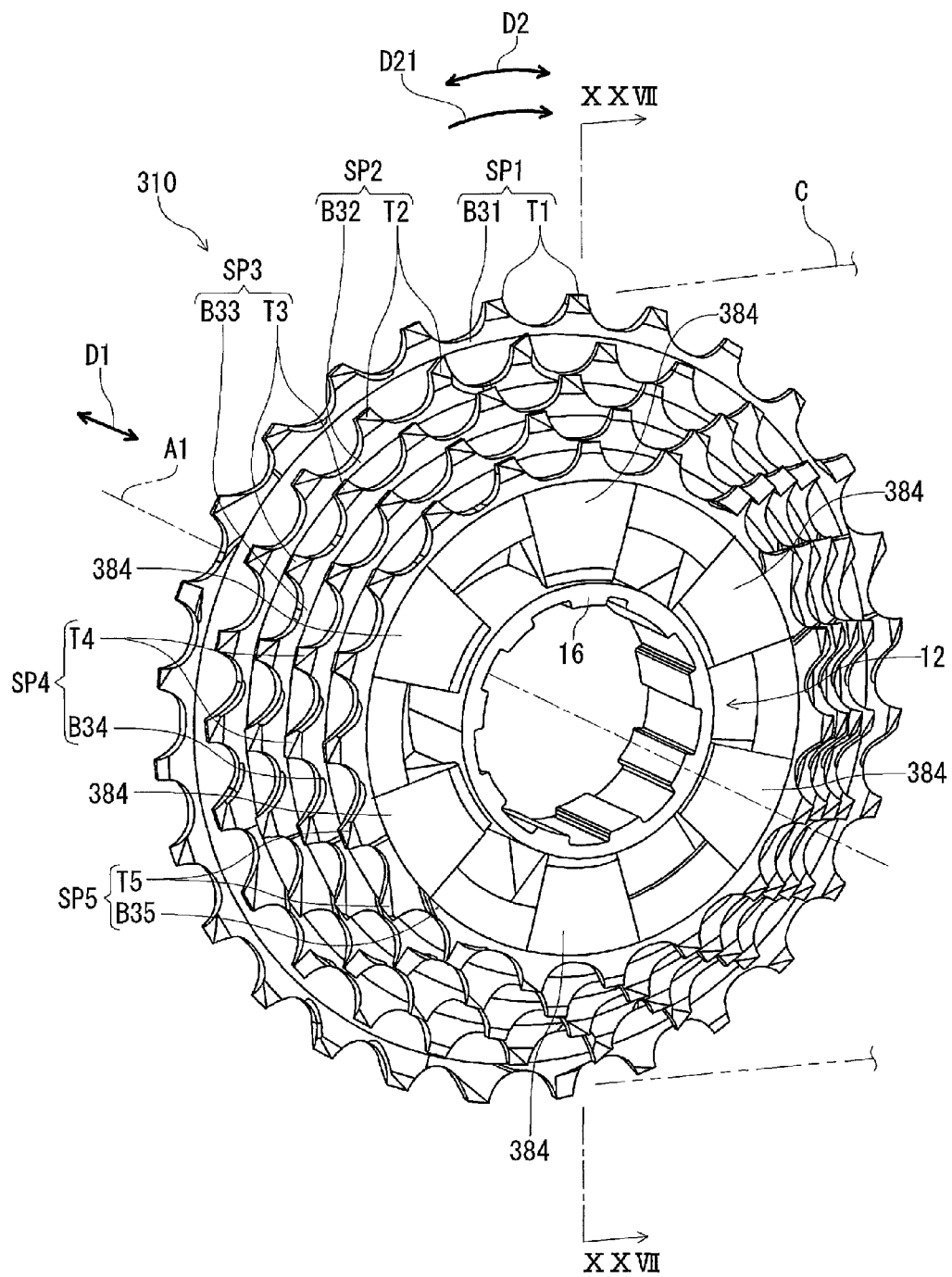
FIG. 24 is a perspective view of a bicycle rear sprocket assembly in accordance with a third embodiment.
Figure 25:
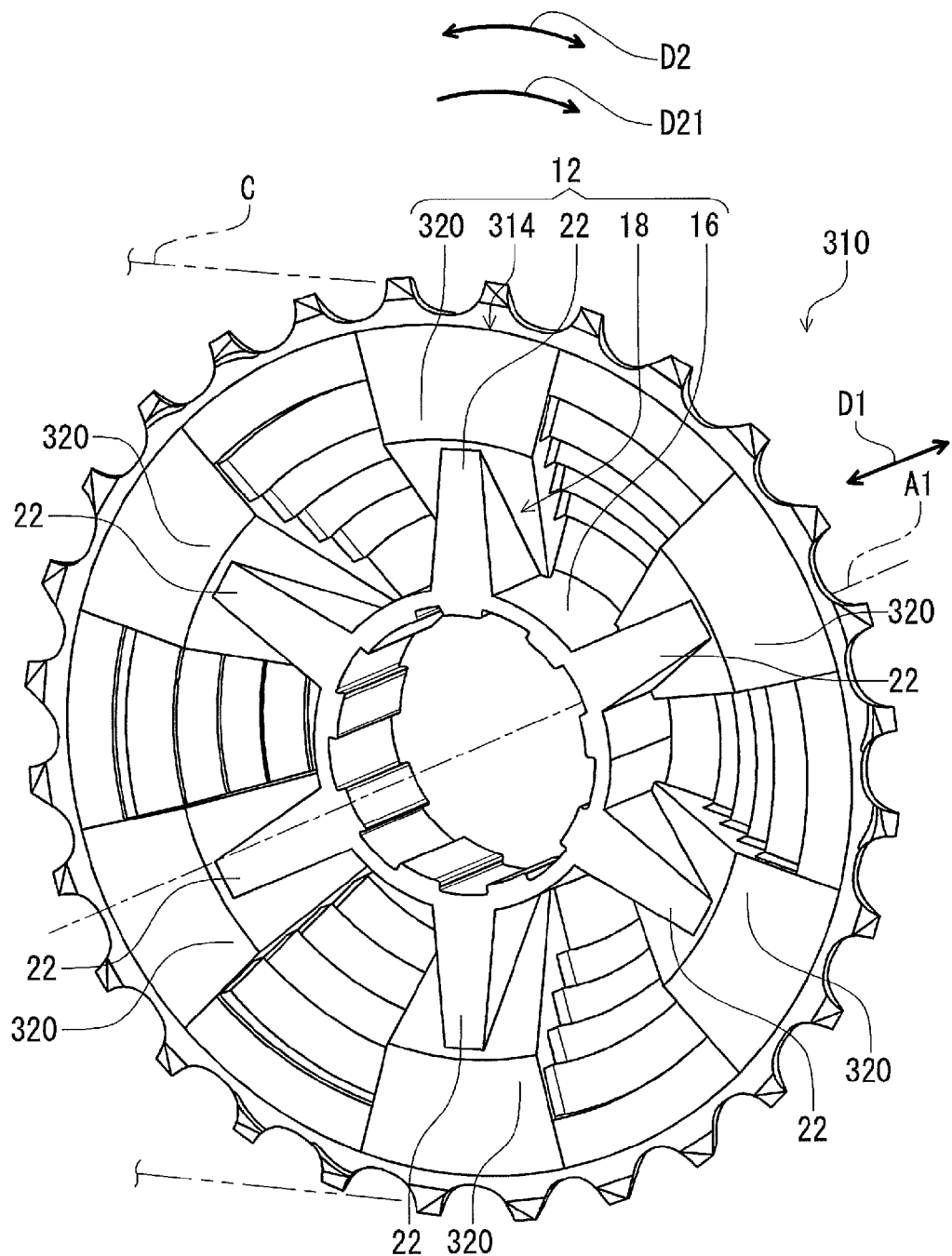
FIG. 25 is a perspective view of the bicycle rear sprocket assembly illustrated in FIG. 24.
Figure 26:
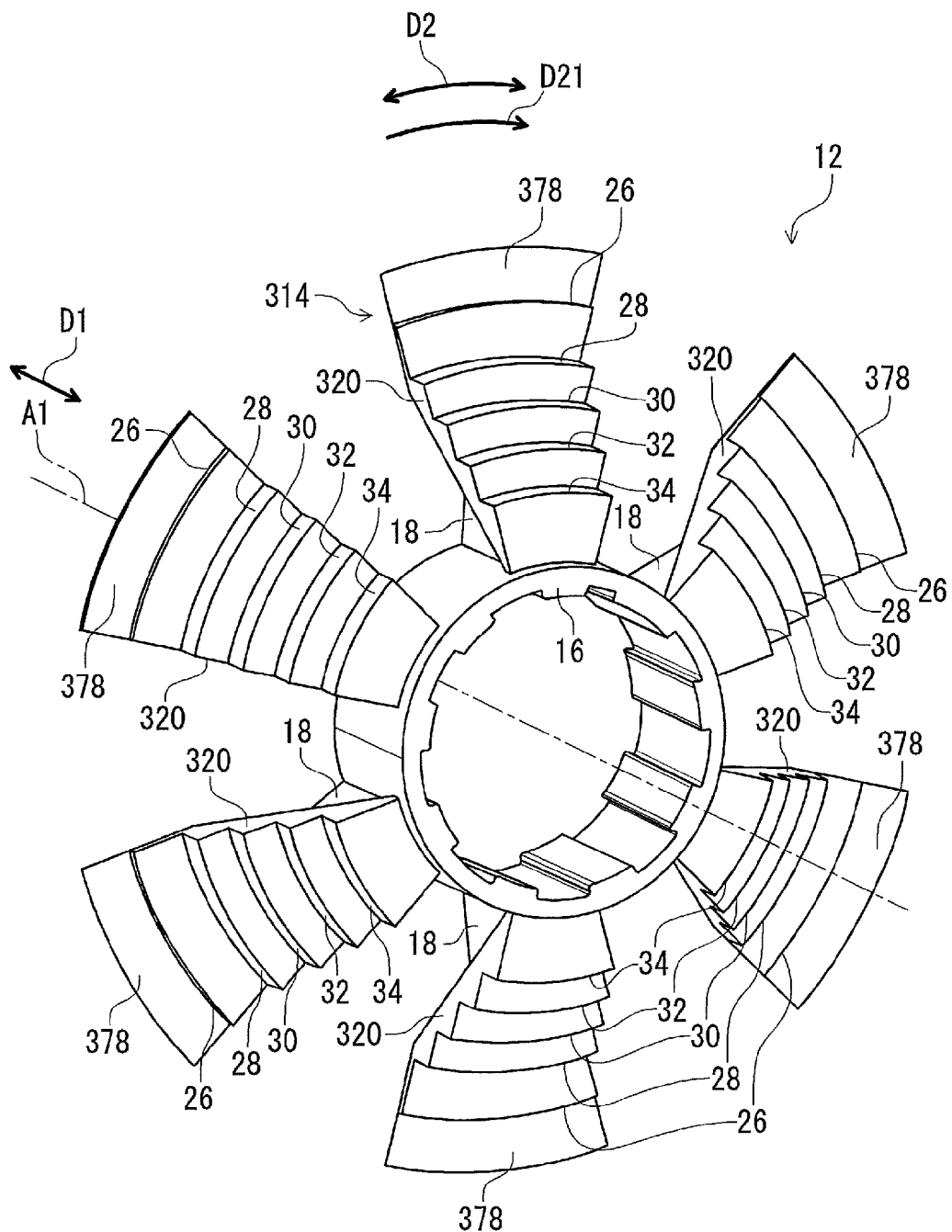
FIG. 26 is a perspective view of the supporting member of the bicycle rear sprocket assembly illustrated in FIG. 24.

As seen in FIGS. 24 and 25, in the bicycle rear sprocket assembly 310, the supporting member 12 includes a supporting portion 314 and the hub engagement portion 16. The supporting portion 314 has substantially the same construction as that of the supporting portion 14 in the first embodiment. As seen in FIG. 26, however, the supporting portion 314 does not include the first restricting parts 44, 46, 48, 50, and 52 in the first embodiment. Specifically, the supporting portion 314 includes a plurality of supporting parts 320 spaced apart from each other. The supporting parts 320 have substantially the same constructions as those of the supporting parts 20 in accordance with the first embodiment. Unlike the supporting parts 20, however, the supporting parts 320 do not include the first restricting parts 44, 46, 48, 50, and 52 in the first embodiment.

Figure 27:
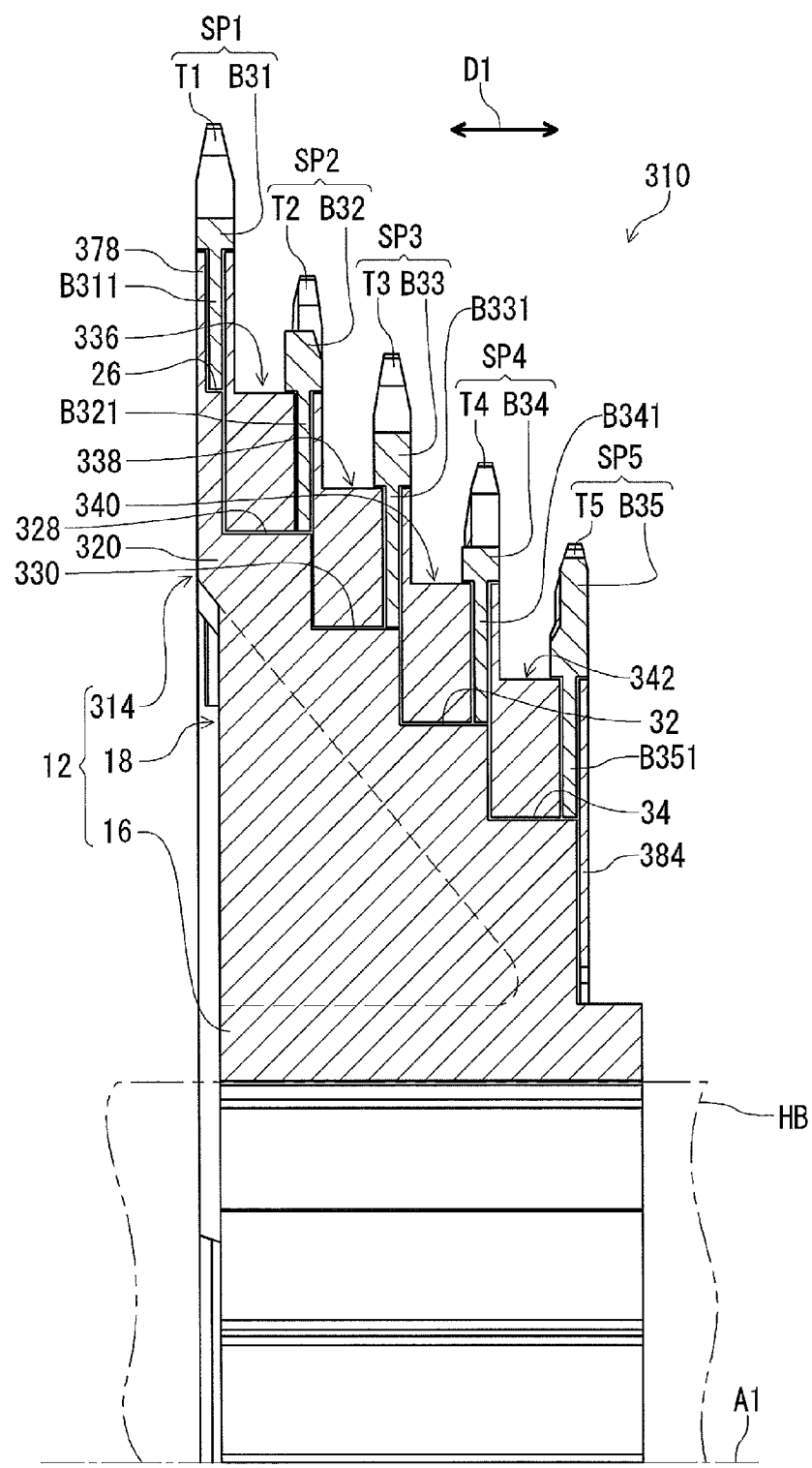
FIG. 27 is a partial cross-sectional view of the bicycle rear sprocket assembly taken along line XXVII-XXVII of FIG. 24.
Figure 28:
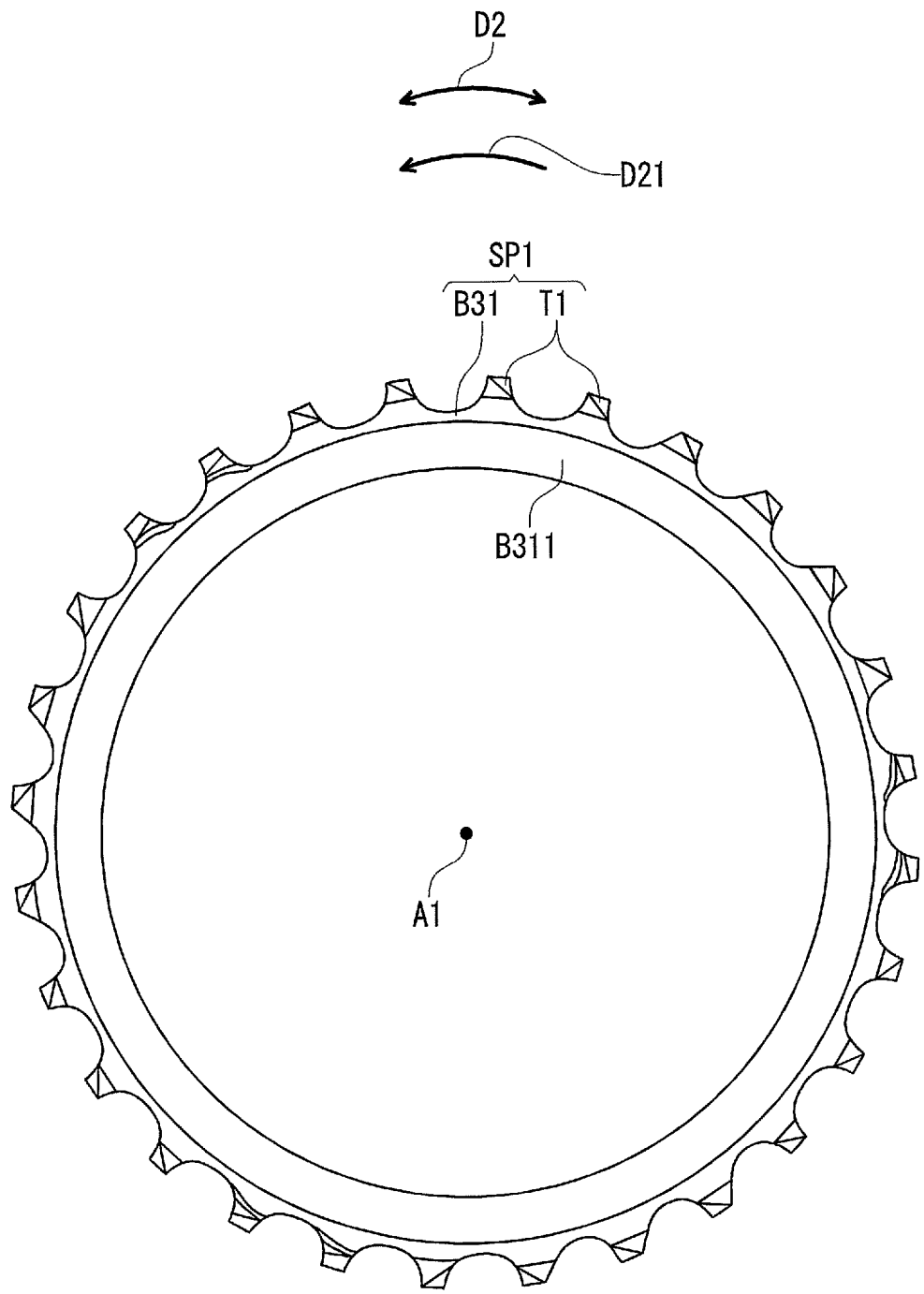
FIG. 28 is an elevational view of a sprocket of the bicycle rear sprocket assembly illustrated in FIG. 24.
Figure 29:
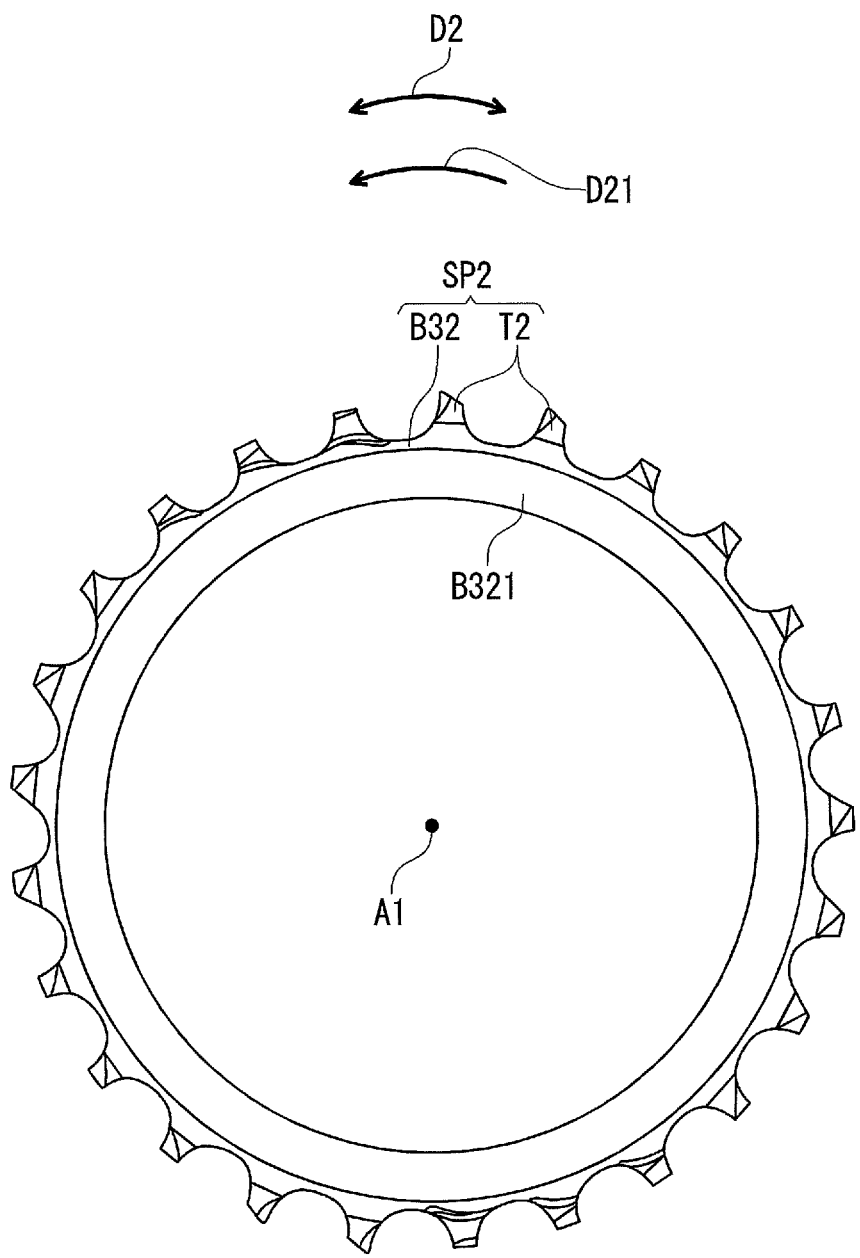
FIG. 29 is an elevational view of a sprocket of the bicycle rear sprocket assembly illustrated in FIG. 24.
Figure 30:
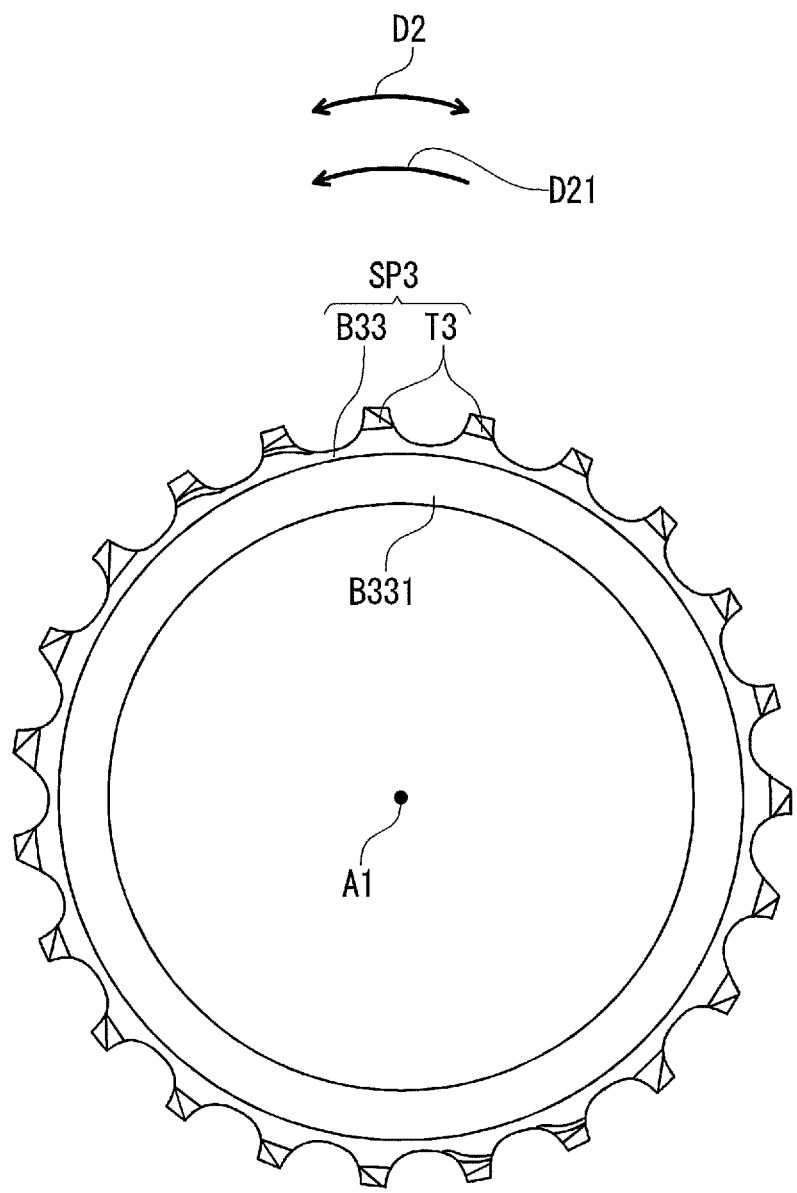
FIG. 30 is an elevational view of a sprocket of the bicycle rear sprocket assembly illustrated in FIG. 24.
Figure 31:
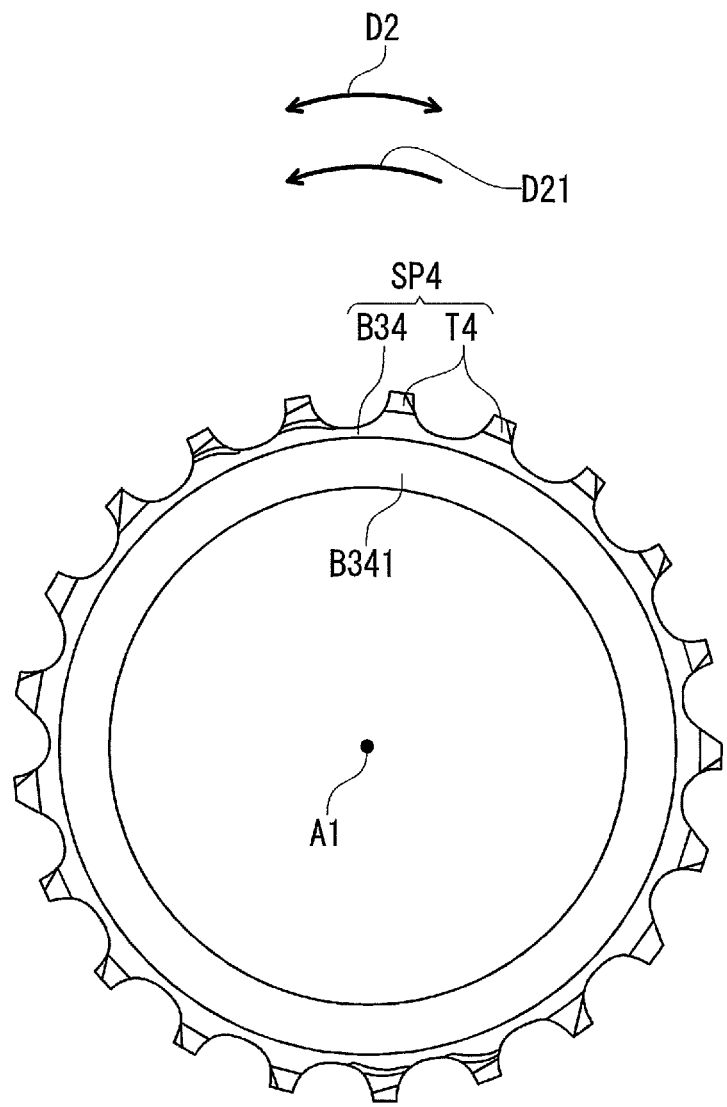
FIG. 31 is an elevational view of a sprocket of the bicycle rear sprocket assembly illustrated in FIG. 24.
Figure 32:
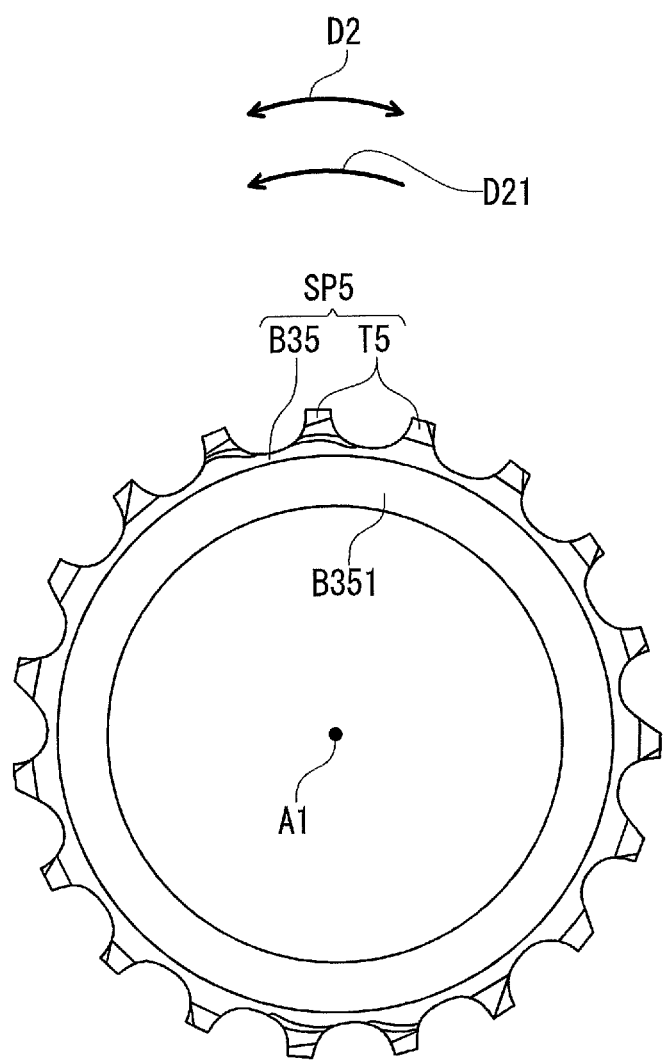
FIG. 32 is an elevational view of a sprocket of the bicycle rear sprocket assembly illustrated in FIG. 24.

As seen in FIG. 27, the plurality of sprocket members SP1 to SP5 include sprocket bodies B31, B32, B33, B34, and B35. Unlike the sprocket bodies B2 to B5 in the first embodiment, as seen in FIGS. 28 to 32, the sprocket bodies B31, B32, B33, B34, and B35 does not include the second restricting parts 53, 54, 56, 58, and 60 in the first embodiment. Instead, the sprocket bodies B31, B32, B33, B34, and B35 respectively include plate parts B311, B321, B331, B341, and B351 having an annular shape.

As seen in FIG. 27, the sprocket body B1, B32, B33, B34, or B35 of each of the plurality of sprocket members SP1 to SP5 is attached to the supporting portion 314 of the supporting member 12 without using a separate metallic fastening member such as a rivet and a bolt. Specifically, the sprocket body B31, B32, B33, B34, or B35 of each of the plurality of sprocket members SP1 to SP5 is attached to the supporting portion 14 without the first restricting parts 44, 46, 48, 50, and 52 and the second restricting parts 53, 54, 56, 58, and 60. Specifically, the sprocket bodies B31, B32, B33, B34, and B35 of the plurality of sprocket members SP1 to SP5 are respectively attached to the radially-supporting surfaces 26, 28, 30, 32, and 34 without the first restricting parts 44, 46, 48, 50, and 52 and the second restricting parts 53, 54, 56, 58, and 60.

Figure 33:
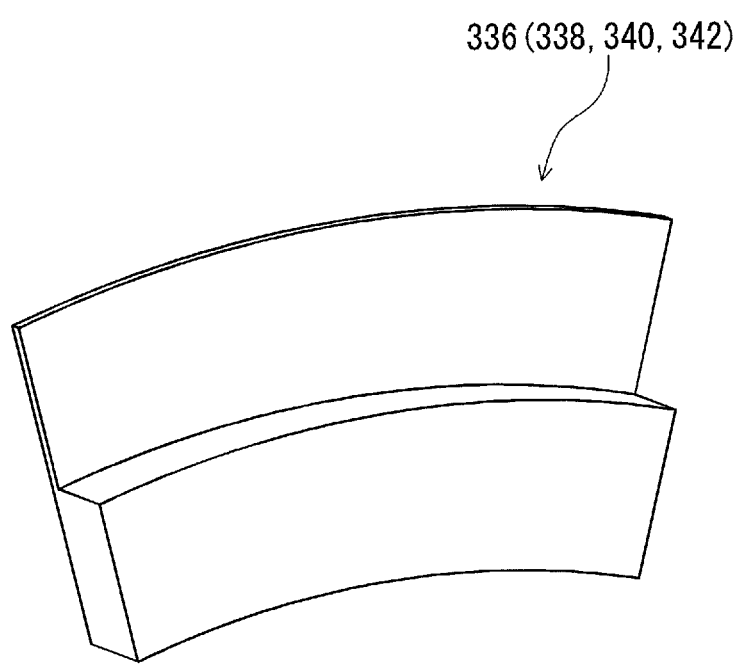
FIG. 33 is a perspective view of a spacer of the bicycle rear sprocket assembly illustrated in FIG. 24.

As seen in FIG. 27, the supporting portion 314 includes a plurality of spacers 336, 338, 340, and 342. The plurality of spacers 336, 338, 340, and 342 are respectively provided between adjacent two of the plurality of sprocket members SP1 to SP5 in the axial direction D1. The spacers 336, 338, 340, and 342 respectively have substantially the same constructions as those of the spacers 36, 38, 40, and 42 in the first embodiment. As seen in FIG. 33, however, the spacer 336 does not include the third restricting part 36a. The spacer 338 does not include the third restricting part 38a. The spacer 340 does not include the third restricting part 40a. The spacer 342 does not include the third restricting part 42a. The spacers 336, 338, 340, and 342 have substantially the same constructions as those of the spacers 36, 38, 40, and 42. Accordingly, the spacers 336, 338, 340, and 342 will not be described and/or illustrated in detail here for the sake of brevity.

As seen in FIGS. 29 to 32, the sprocket bodies B32 to B35 do not include the fourth restricting parts 62, 64, 66, and 68 in the first embodiment. The sprocket bodies B32 to B35 do not include the annular grooves B11, B21, B31, B41, and B51. In the illustrated embodiment, as seen in FIG. 27, the plurality of spacers 336, 338, 340, and 342 are respectively attached to the adjacent two of the sprocket bodies B31, B32, B33, B34, and B35 of the plurality of sprocket members SP1 to SP5 without the third restricting parts 36a, 38a, 40a, 42a, and 44a and the fourth restricting parts 62, 64, 66, and 68. Specifically, the plate part B321 of the sprocket body B32 is provided between the spacers 336 and 338. The plate part B331 of the sprocket body B33 is provided between the spacers 338 and 340. The plate part B341 of the sprocket body B34 is provided between the spacers 340 and 342.

As seen in FIG. 26, the supporting parts 320 of the supporting portion 314 do not include the fifth restricting parts 70, 72, 74, and 76 in the first embodiment. As seen in FIG. 33, each of the spacers 336 does not include the sixth restricting part 36b. Each of the spacers 338 does not include the sixth restricting part 38b. Each of the spacers 340 does not include the sixth restricting part 40b. Each of the spacers 342 does not include the sixth restricting part 42b.

As seen in FIG. 27, the spacers 336 are respectively attached to the radially-supporting surfaces 26 without the fifth restricting parts 70 and the sixth restricting parts 36b. The spacers 338 are respectively attached to the radially-supporting surfaces 28 without the fifth restricting parts 72 and the sixth restricting parts 38b. The spacers 340 are respectively attached to the radially-supporting surfaces 30 without the fifth restricting parts 74 and the sixth restricting parts 40b. The spacers 342 are respectively attached to the radially-supporting surfaces 32 without the fifth restricting parts 76 and the sixth restricting parts 42b.

As seen in FIG. 26, the supporting portion 314 includes first axial end parts 378 provided on the supporting parts 320. The first axial end parts 378 respectively extend radially outwardly from the supporting parts 320. The first axial end parts 378 have substantially the same constructions as those of the first axial end parts 78 in the first embodiment. However, each of the first axial end parts 378 does not include the seventh restricting part 80.

As seen in FIGS. 24 and 27, the supporting portion 314 includes second axial end parts 384 spaced apart from each other in the circumferential direction D2. As seen in FIG. 27, the second axial end part 384 is attached to the supporting part 320. The sprocket members SP1 to SP5 are provided between the first axial end part 378 and the second axial end part 384 in the axial direction D1.

With the bicycle rear sprocket assembly 310, it is possible to obtain substantially the same advantageous effect as that of the bicycle rear sprocket assembly 10 in accordance with the first embodiment.

Fourth Embodiment

A bicycle rear sprocket assembly 410 in accordance with a third embodiment will be described below referring to FIGS. 34 to 38. The bicycle rear sprocket assembly 410 has the same construction as the bicycle rear sprocket assembly 310 except for the supporting portion and the spacers. Thus, elements having substantially the same function as those in the first embodiment will be numbered the same here, and will not be described and/or illustrated again in detail here for the sake of brevity.

Figure 34:
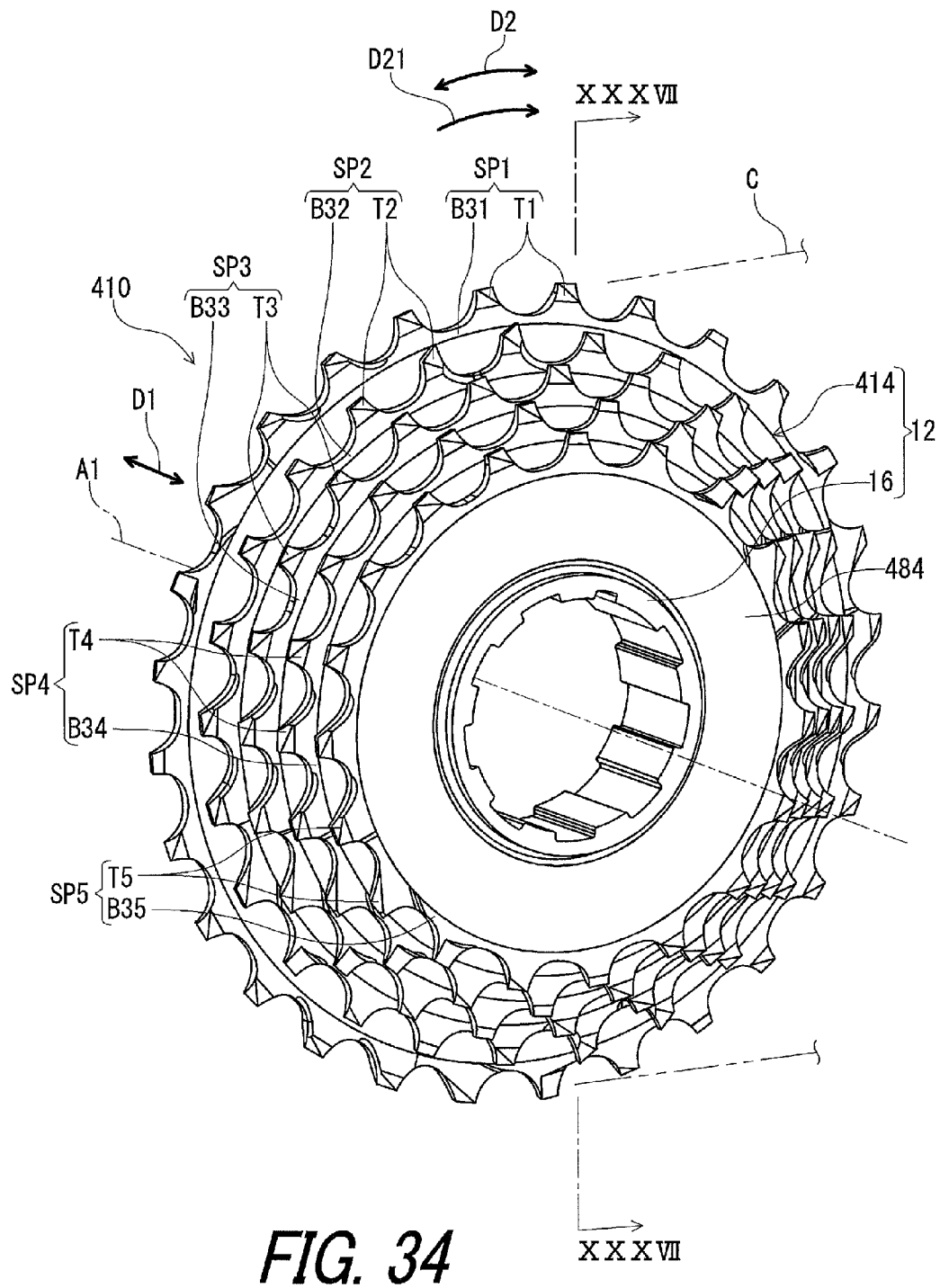
FIG. 34 is a perspective view of a bicycle rear sprocket assembly in accordance with a fourth embodiment.
Figure 35:
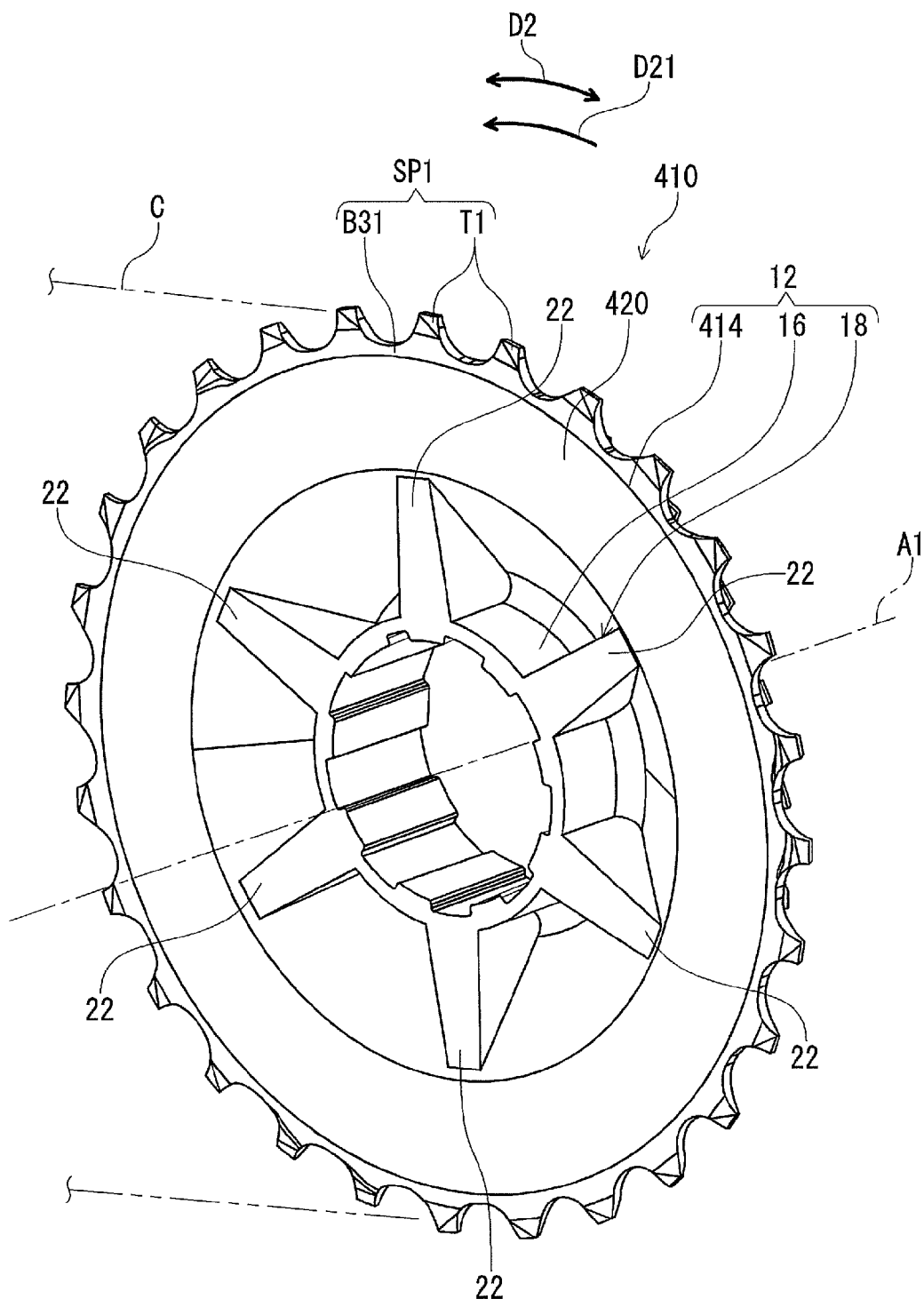
FIG. 35 is a perspective view of the bicycle rear sprocket assembly illustrated in FIG. 34.

As seen in FIGS. 34 and 35, in the bicycle rear sprocket assembly 410, the supporting member 12 includes a supporting portion 414 and the hub engagement portion 16. The supporting portion 414 has substantially the same construction as that of the supporting portion 314 in the third embodiment. As seen in FIG. 35, however, the supporting portion 414 includes a supporting part 420 having an annular shape.

Figure 36:
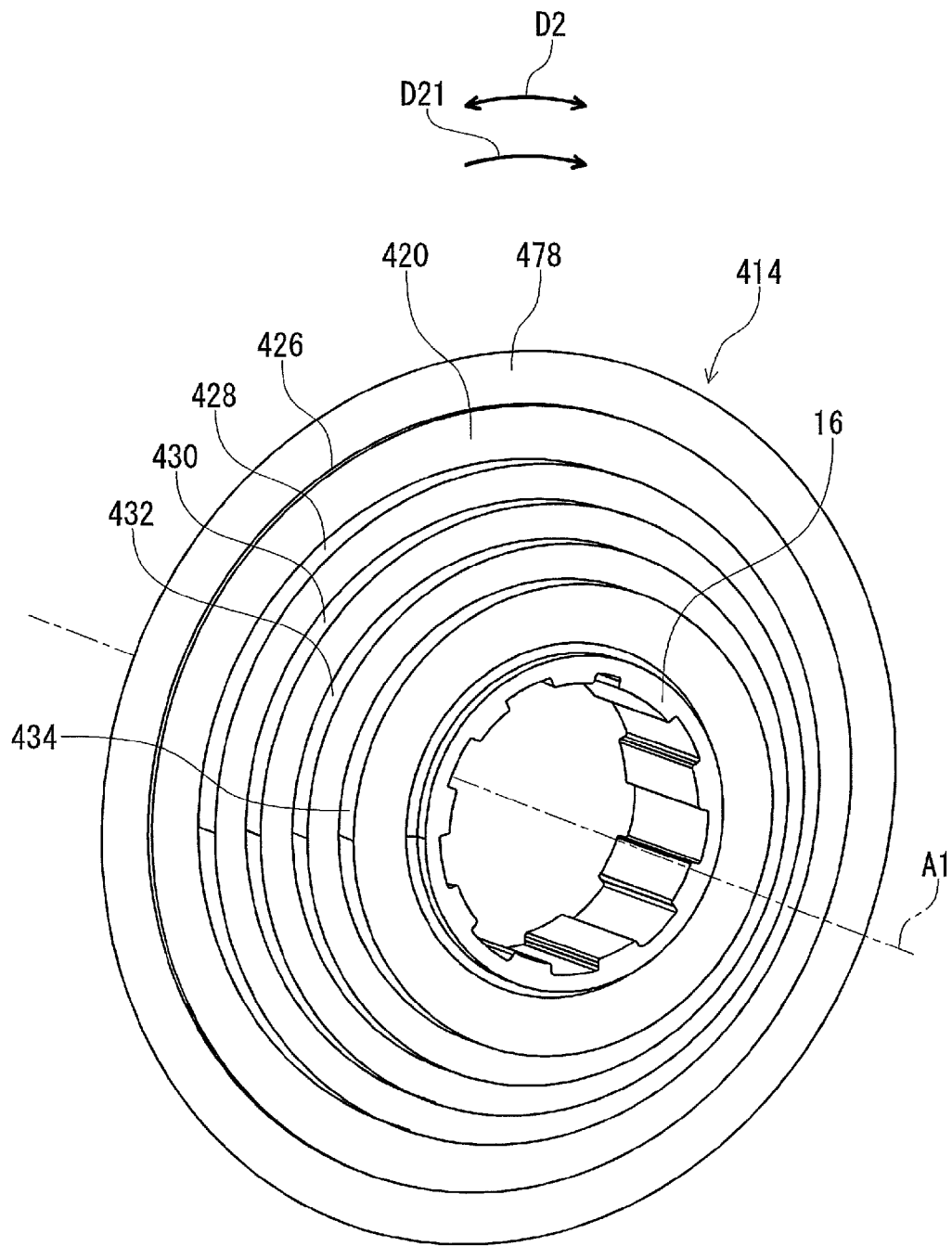
FIG. 36 is a perspective view of a supporting member of the bicycle rear sprocket assembly illustrated in FIG. 34.
Figure 37:
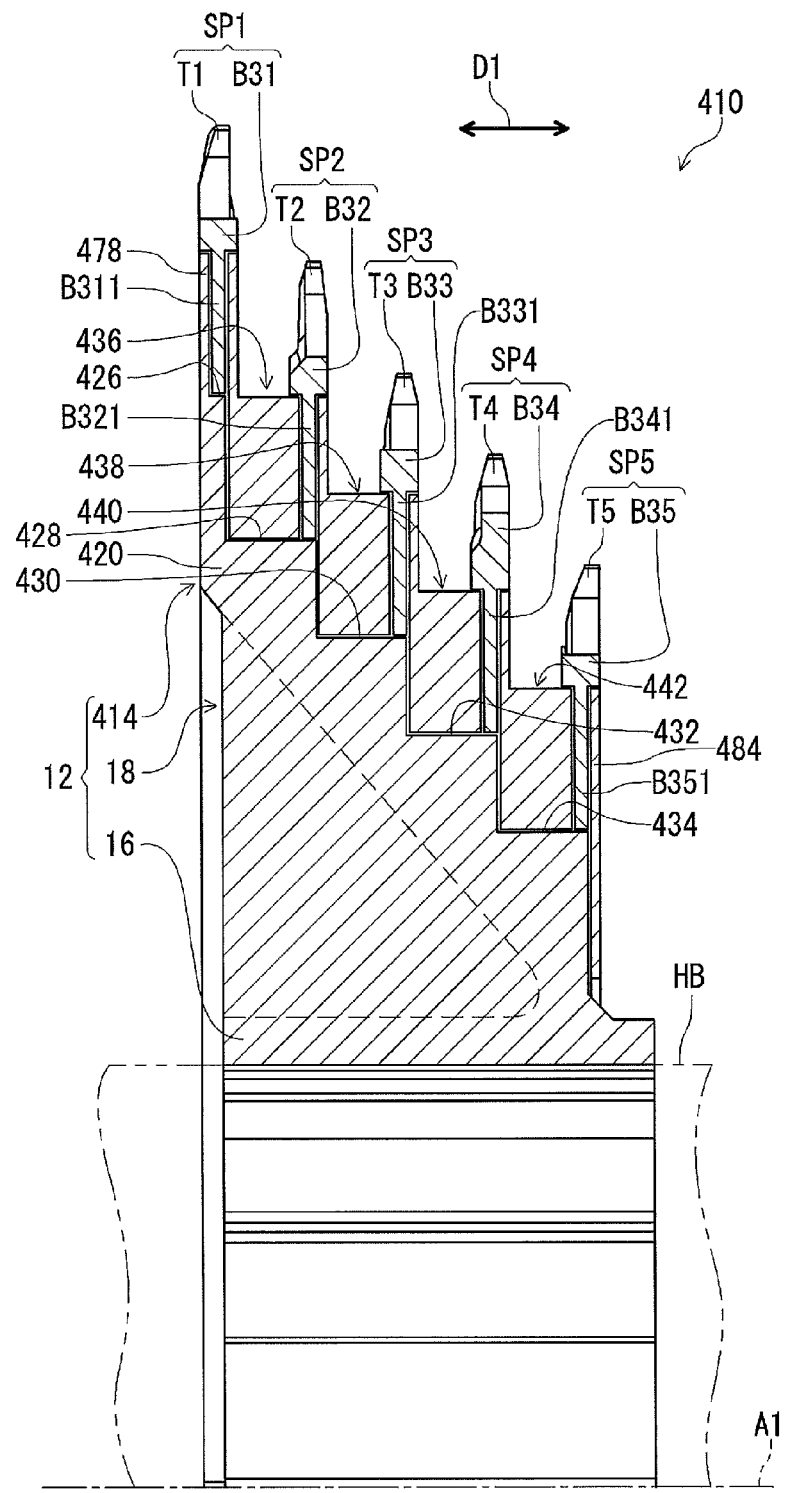
FIG. 37 is a partial cross-sectional view of the bicycle rear sprocket assembly taken along line XXXVII-XXXVII of FIG. 34.

As seen in FIG. 36, the supporting portion 414 includes radially-supporting surfaces 426, 428, 430, 432, and 434 facing radially outwardly with respect to the rotational center axis A1. As seen in FIG. 37, the sprocket bodies B1 to B5 of the plurality of sprocket members SP1 to SP5 are respectively provided on the radially-supporting surfaces 426, 428, 430, 432, and 434. The radially-supporting surfaces 426, 428, 430, 432, and 434 have substantially the same constructions as those of the radially-supporting surfaces 326, 328, 330, 332, and 334 in the third embodiment. As seen in FIG. 36, however, each of the radially-supporting surfaces 426, 428, 430, 432, and 434 has an annular shape.

Figure 38:
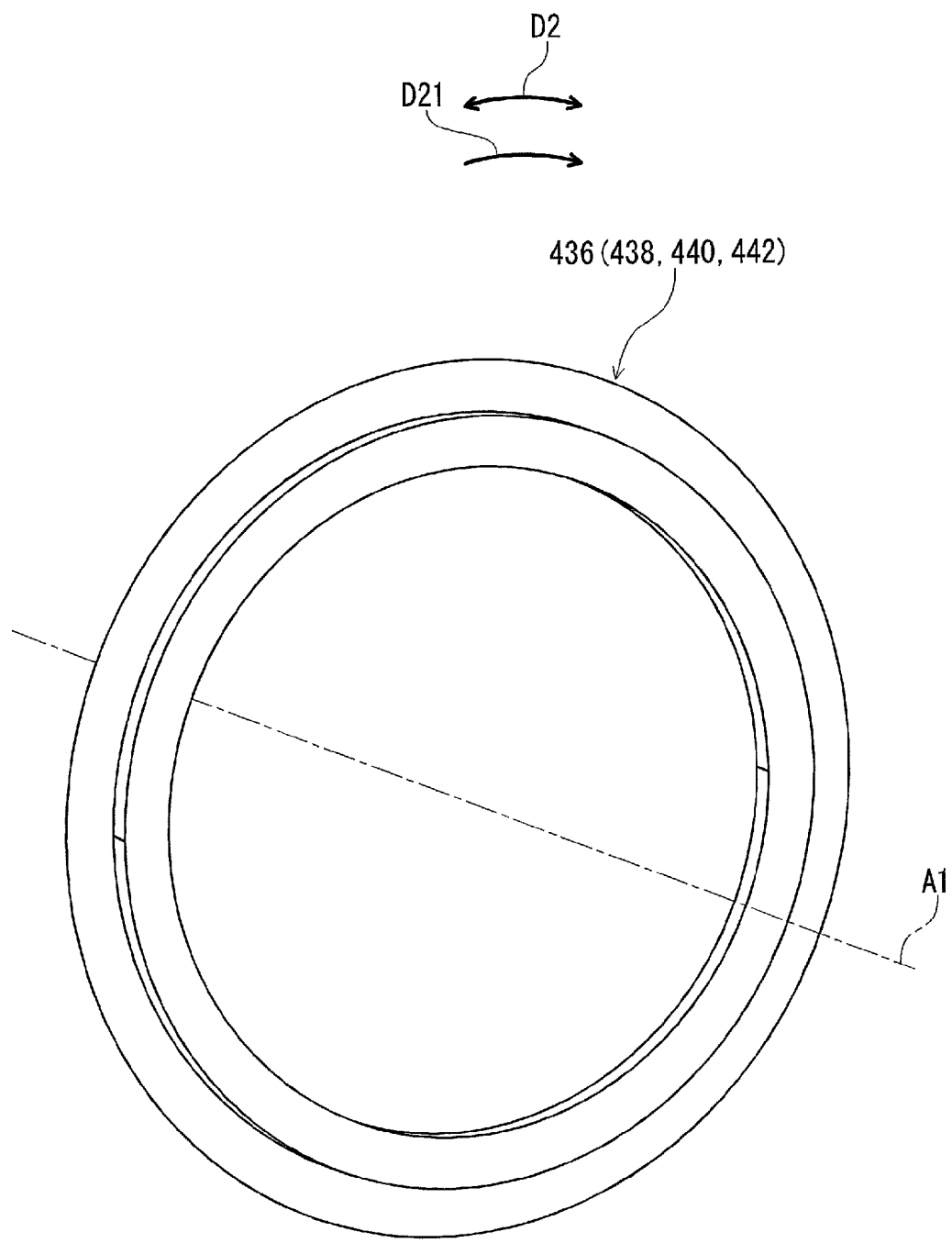
FIG. 38 is a perspective view of a spacer of the bicycle rear sprocket assembly illustrated in FIG. 34.

As seen in FIG. 37, the supporting portion 414 includes a plurality of spacers 436, 438, 440, and 442. The plurality of spacers 436, 438, 440, and 442 are respectively provided between adjacent two of the plurality of sprocket members SP1 to SP5 in the axial direction D1. In the illustrated embodiment, the plurality of spacers 436, 438, 440, and 442 are respectively provided on the radially-supporting surfaces 428, 430, 432, and 434. The spacers 436, 438, 440, and 442 have substantially the same constructions as those of the spacers 336, 338, 340, and 342 except for the annular shape. As seen in FIG. 38, however, each of the spacers 436, 438, 440, and 442 has an annular shape.

As seen in FIG. 36, the supporting portion 414 includes a first axial end part 478 provided on the supporting parts 420. The first axial end part 478 extends radially outwardly from the supporting part 420. The first axial end part 478 has substantially the same construction as that of the first axial end part 378 in the third embodiment. In the illustrated embodiment, however, the first axial end part 478 has an annular shape.

As seen in FIG. 34, the supporting portion 414 includes a second axial end part 484 spaced apart from each other in the circumferential direction D2. The second axial end part 484 has substantially the same construction as those of the second axial end parts 384 in the third embodiment. However, the second axial end part 484 has an annular shape. As seen in FIG. 37, the sprocket members SP1 to SP5 are provided between the first axial end part 478 and the second axial end part 484 in the axial direction D1.

With the bicycle rear sprocket assembly 410, it is possible to obtain substantially the same advantageous effect as that of the bicycle rear sprocket assembly 10 in accordance with the first embodiment.

Fifth Embodiment

A bicycle rear sprocket assembly 510 in accordance with a fifth embodiment will be described below referring to FIGS. 39 to 41. The bicycle rear sprocket assembly 510 has the same construction as the bicycle rear sprocket assembly 410 except for the supporting portion. Thus, elements having substantially the same function as those in the above embodiments will be numbered the same here, and will not be described and/or illustrated again in detail here for the sake of brevity.

Figure 39:
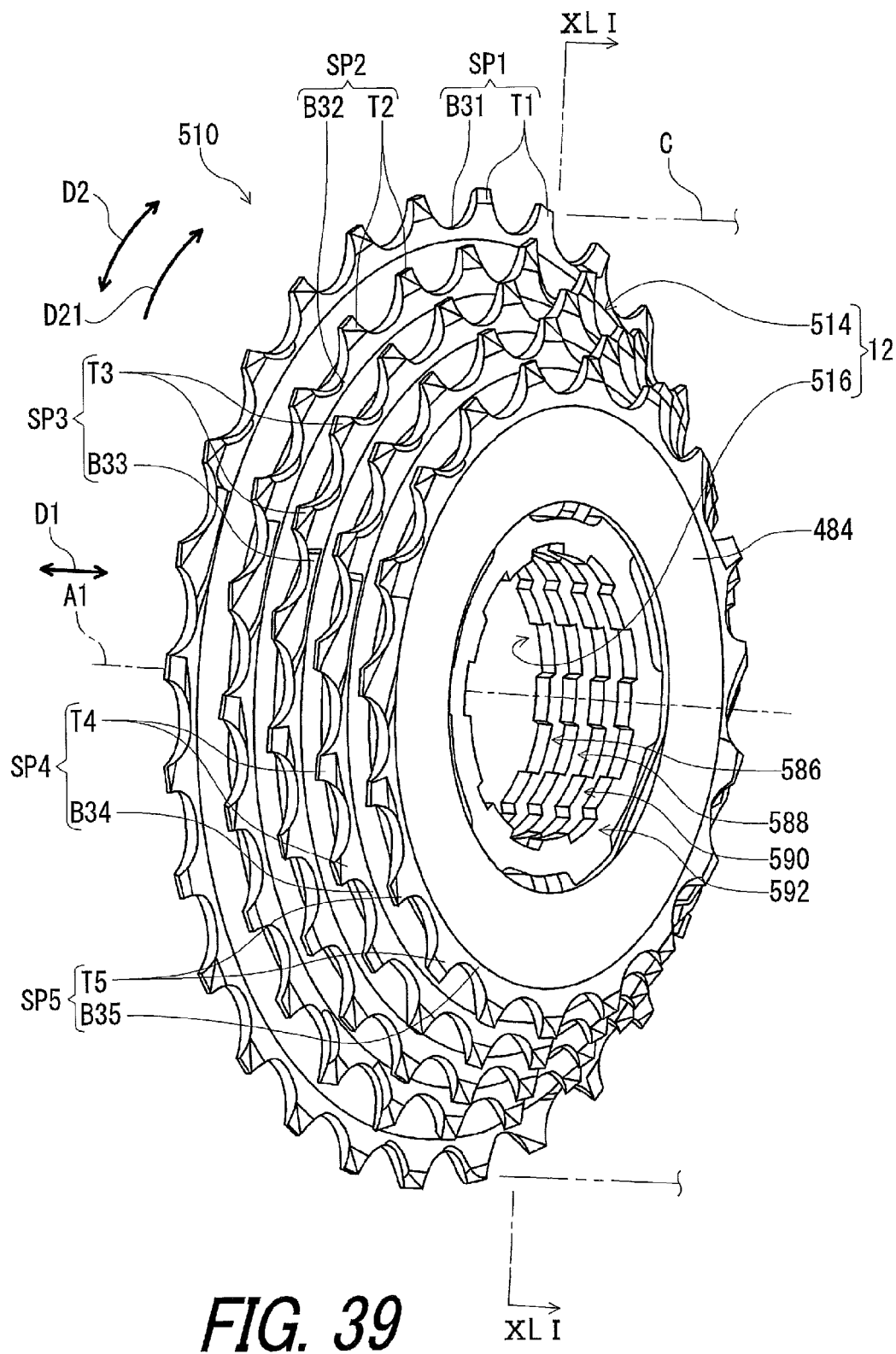
FIG. 39 is a perspective view of a bicycle rear sprocket assembly in accordance with a fifth embodiment.
Figure 40:
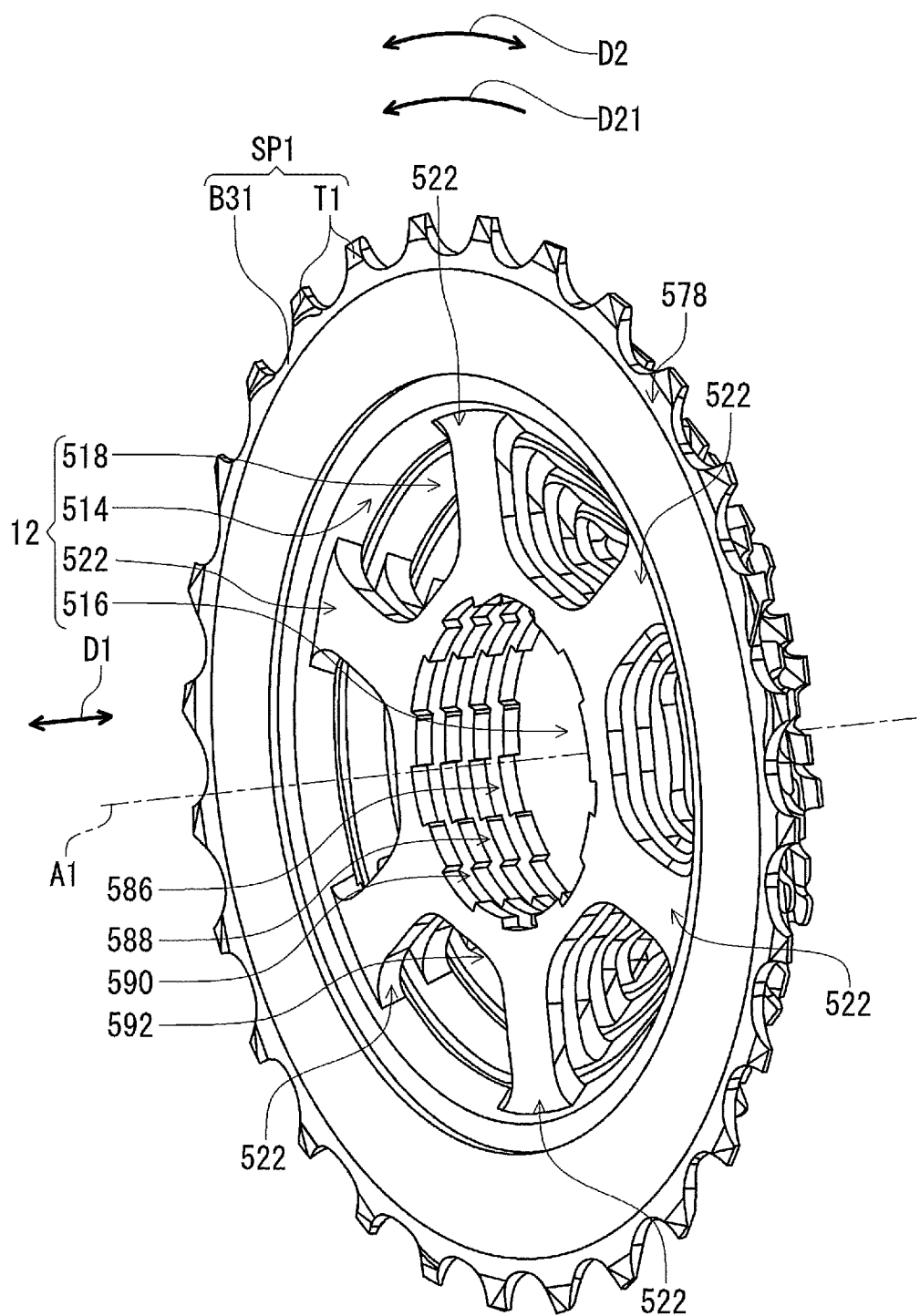
FIG. 40 is a perspective view of the bicycle rear sprocket assembly illustrated in FIG. 39.

As seen in FIGS. 39 and 40, in the bicycle rear sprocket assembly 510, the supporting member 12 includes a supporting portion 514 and a hub engagement portion 516. The supporting portion 514 has substantially the same construction as that of the supporting portion 414 in the fourth embodiment. The hub engagement portion 516 has substantially the same construction as that of the hub engagement portion 16 in the first embodiment. However, the supporting member 12 includes supporting plates 586, 588, 590, and 592 arranged in the axial direction D1. The supporting plates 586, 588, 590, and 592 constitute the supporting portion 514 and the hub engagement portion 516.

Figure 41:
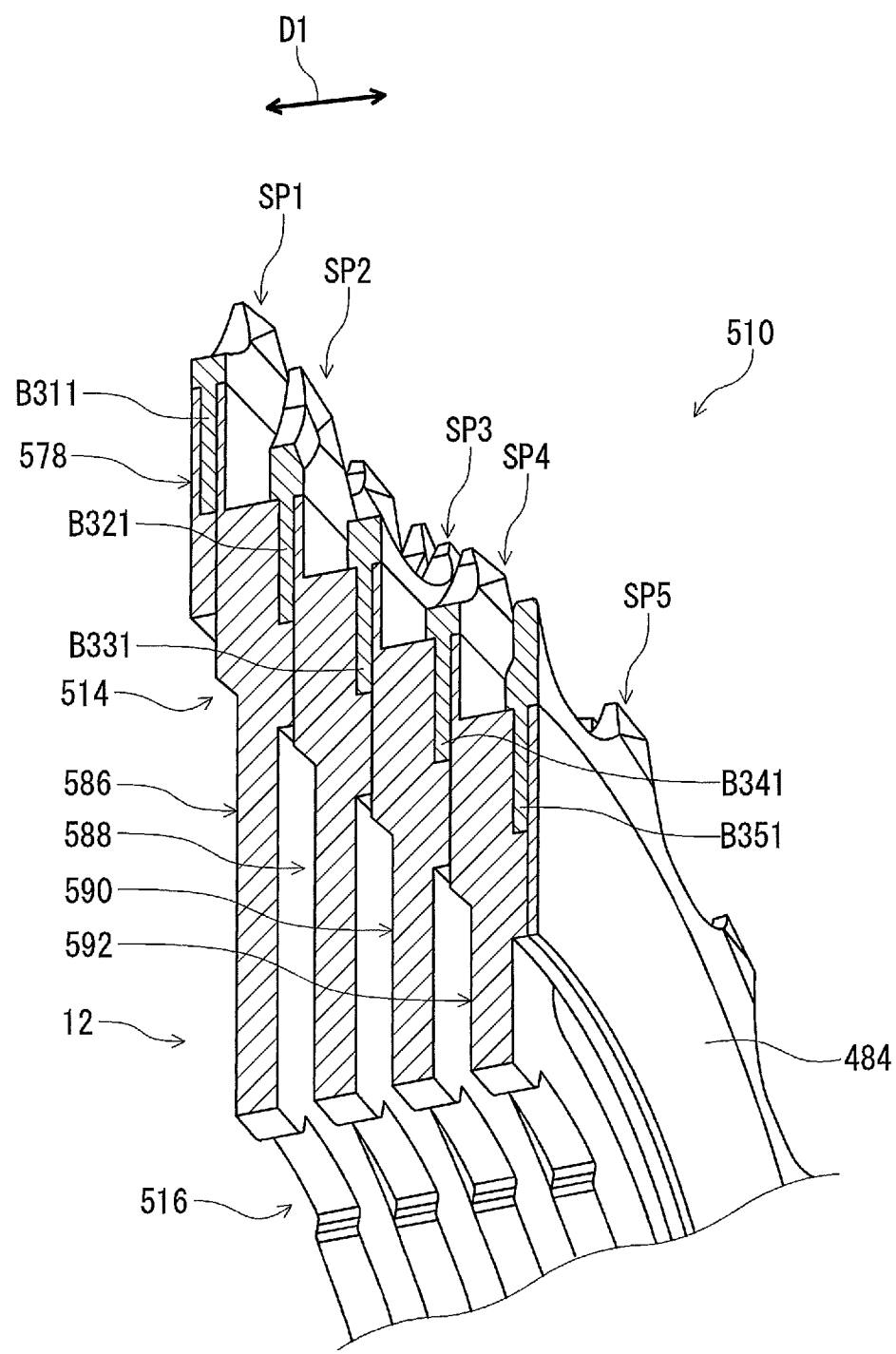
FIG. 41 is a partial cross-sectional view of the bicycle rear sprocket assembly taken along line XLI-XLI of FIG. 39.

As seen in FIG. 41, the spacers 336, 338, 340, and 342 in the third embodiment are omitted from the supporting portion 514. However, the supporting plates 586, 588, 590, and 592 have substantially the same functions as the functions of the spacers 336, 338, 340, and 342. Specifically, the plate part B321 of the sprocket body B32 is provided between the supporting plates 586 and 588 in the axial direction D1. The plate part B331 of the sprocket body B33 is provided between the supporting plates 588 and 590 in the axial direction D1. The plate part B341 of the sprocket body B34 is provided between the supporting plates 590 and 592 in the axial direction D1. The plate part B351 of the sprocket body B35 is provided between the supporting plate 592 and the second axial end part 484. The supporting portion 514 include a first axial end part 578 having an annular shape.

The plate part B311 of the sprocket body B31 is provided between the first axial end part 578 and the supporting plate 586.

The plate part B321 of the sprocket body B32 is attached to the supporting plates 586 and 588 via at least one of adhesive and diffusion bonding. The plate part B331 of the sprocket body B33 is attached to the supporting plates 588 and 590 via at least one of adhesive and diffusion bonding. The plate part B341 of the sprocket body B34 is attached to the supporting plates 590 and 592 via at least one of adhesive and diffusion bonding. The plate part B351 of the sprocket body B35 is attached to the supporting plate 592 and the second axial end part 484 via at least one of adhesive and diffusion bonding. The plate part B311 of the sprocket body B31 is attached to the first axial end part 578 and the supporting plate 586 via at least one of adhesive and diffusion bonding.

As seen in FIG. 41, the supporting plates 586, 588, 590, and 592 are attached to each other via at least one of adhesive and diffusion bonding. The first axial end part 578 and the second axial end part 484 are made of a metallic material. The first axial end part 578 is attached to the supporting plate 586 via at least one of adhesive and diffusion bonding. The second axial end part 384 is attached to the supporting plate 592 via at least one of adhesive and diffusion bonding.

As seen in FIG. 40, the supporting member 12 further includes an intermediate portion 518 extending between the supporting portion 514 and the hub engagement portion 516 in the radial direction with respect to the rotational center axis A1. The intermediate portion 518 has substantially the same construction as that of the intermediate portion 18 in the first embodiment. In the illustrated embodiment, however, the intermediate portion 518 includes reinforcing parts 522 extending between the supporting portion 514 and the hub engagement portion 516 in the radial direction with respect to the rotational center axis A1. The reinforcing parts 522 have substantially the same constructions as that of the reinforcing parts 22 in the first embodiment. In the illustrated embodiment, the supporting plates 586, 588, 590, and 592 constitute the reinforcing parts 522 of the intermediate portion 518.

With the bicycle rear sprocket assembly 510, it is possible to obtain substantially the same advantageous effect as that of the bicycle rear sprocket assembly 10 in accordance with the first embodiment.

Sixth Embodiment

A bicycle rear sprocket assembly 610 in accordance with a fifth embodiment will be described below referring to FIGS. 42 and 43. The bicycle rear sprocket assembly 610 has the same construction as the bicycle rear sprocket assembly 10 except for the supporting member. Thus, elements having substantially the same function as those in the above embodiments will be numbered the same here, and will not be described and/or illustrated again in detail here for the sake of brevity.

Figure 42:
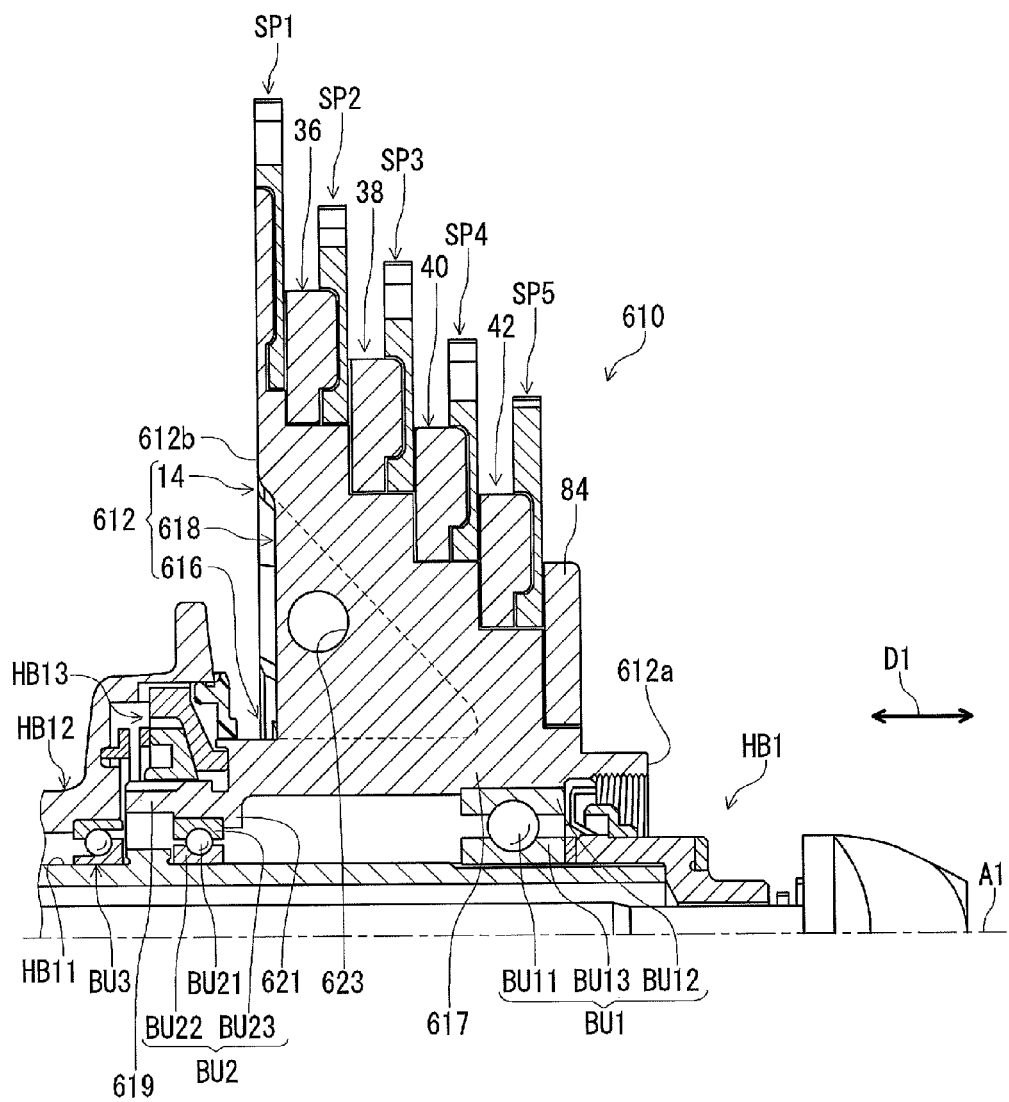
FIG. 42 is a partial cross-sectional view of a bicycle rear sprocket assembly in accordance with a sixth embodiment with being mounted to a bicycle hub assembly.

As seen in FIG. 42, the bicycle rear sprocket assembly 610 comprises the plurality of sprocket members SP1 to SP5 and a supporting member 612. The supporting member 612 has a small diameter end 612a and a large diameter end 612b opposite to the small diameter end 612a in the axial direction D1. The small diameter end 612a has an outer diameter smaller than an outer diameter of the large diameter end 612b. The supporting member 612 has substantially the same construction as that of the supporting member 12 in the first embodiment. However, the supporting member 612 includes the supporting portion 14 and a hub supported portion 616. The supporting portion 14 is provided radially outward of the hub supported portion 616 with respect to the rotational center axis A1 and is configured to support the plurality of sprocket members SP1 to SP5.

The hub supported portion 616 is configured to be supported on a bicycle hub assembly HB1. Unlike the hub engagement portion 16 in the first embodiment, the hub supported portion 616 is not splined to the bicycle hub assembly HB1. Specifically, the hub supported portion 616 includes a bearing supported section 617 and a torque transmission section 619. The bearing supported section 617 is closer to the small diameter end 612a than the large diameter end 612b in the axial direction D1. The bearing supported section 617 is configured to be supported by a bearing unit BU1. In the illustrated embodiment, the bicycle hub assembly HB1 includes the bearing unit BU1. The bearing unit BU1 includes rolling elements BU11, an outer race BU12 and an inner race BU13. Instead of the outer race BU12, the bearing supported section 617 may serve as an outer race of the bearing unit BU1. In such a case, the bearing supported section 617 includes a sliding surface 617a slidable with the rolling elements BU11 as seen in FIG. 43.

The torque transmission section 619 is closer to the large diameter end 612b than the small diameter end 612a in the axial direction D1. The torque transmission section 619 is configured to transmit a torque from the plurality of sprocket members SP1 to SP5 to the bicycle hub assembly HB1.

In the illustrated embodiment, the bicycle hub assembly HB1 includes a hub axle HB11, a hub shell HB12, and a ratchet structure HB13. The bearing unit BU1 is provided between the hub axle HB11 and the hub supported portion 616. The outer race BU12 of the bearing unit BU1 is attached to the bearing support section 617. The inner race BU13 of the bearing unit BU1 is attached to the hub axle HB11. The hub shell HB12 is rotatably mounted on the hub axle HB11 via a hub bearing unit BU3 to rotate about the rotational center axis A1. The ratchet structure HB13 is configured to prevent the supporting member 612 from rotating relative to the hub shell HB12 in the driving rotational direction D21 so that a pedaling force is transmitted from the supporting member 612 to the hub shell HB12 during pedaling. The ratchet structure HB13 is configured to allow the hub shell HB12 to rotate relative to the supporting member 612 in the driving rotational direction D21 so that a rotational force is not transmitted from the hub shell 14 to the supporting member 612 during coasting (also called freewheeling). Since the bicycle hub assembly HB1 includes structures known in the bicycle field, they will not be described and/or illustrated in detail here for the sake of brevity.

The hub supported portion 616 includes an additional bearing supported section 621 configured to be supported by an additional bearing unit BU2. The additional bearing supported section 621 makes the hub supported portion 616 more stable relative to the rotational center axis A1. In the illustrated embodiment, the bicycle hub assembly HB1 includes the additional bearing unit BU2. The additional bearing unit BU2 includes rolling elements BU21, an inner race BU22, and an outer race BU23. The outer race BU23 is attached to the additional bearing supported section 621. The additional bearing unit BU2 is provided between the hub axle HB11 and the additional bearing supported section 621. The inner race BU22 is attached to the hub axle HB11.

The additional bearing supported section 621 is positioned between the small diameter end 612a and the large diameter end 612b. Accordingly, it is possible to make a middle section of the hub supported portion 616 more stable relative to the rotational center axis A1. In the illustrated embodiment, the additional bearing supported section 621 is closer to the large diameter end 612b than the small diameter end 612a in the axial direction D1. The additional bearing supported section 621 makes the large diameter end 612b more stable relative to the rotational center axis A1. In the illustrated embodiment, the additional bearing supported section 621 is provided radially inward of the torque transmission section 619.

The supporting member 612 further includes an intermediate portion 618 extending between the supporting portion 14 and the hub supported portion 616 in the radial direction with respect to the rotational center axis A1. The intermediate portion 618 extends between the small diameter end 612a and the large diameter end 612b in the axial direction D1. Accordingly, it is possible to improve the strength of the supporting member 612 between the small diameter end 612a and the large diameter end 612b.

Figure 43:
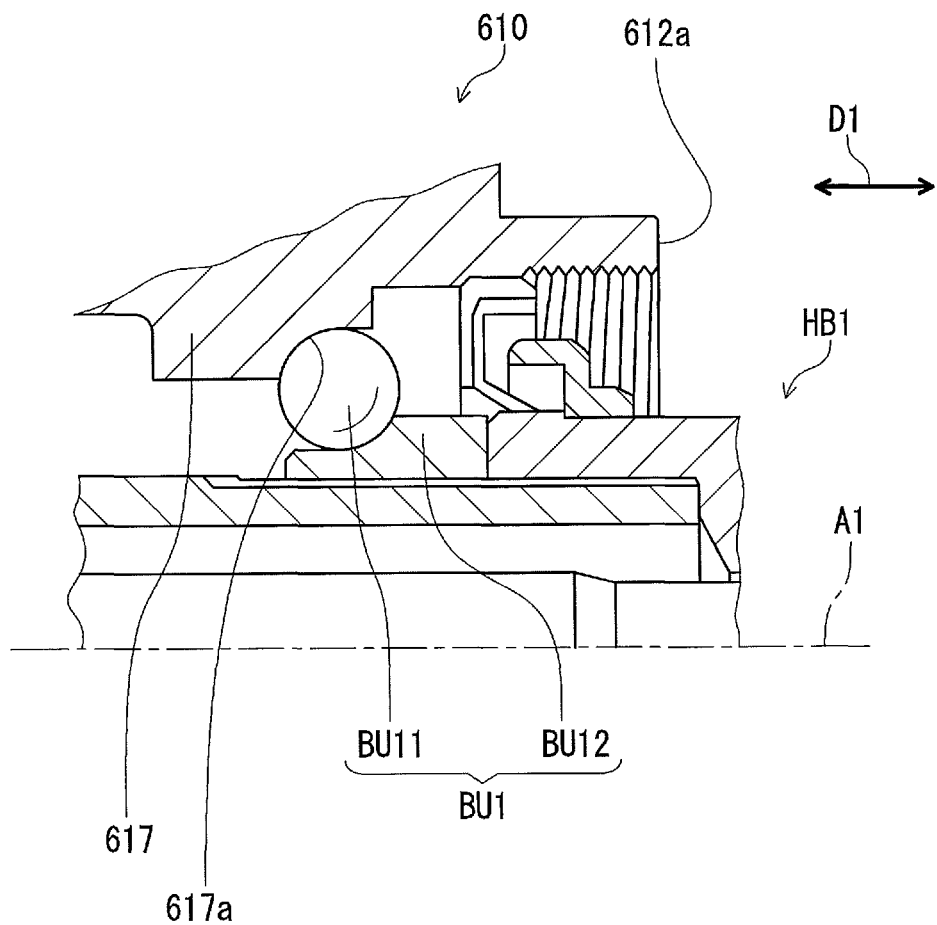
FIG. 43 is a partial enlarged cross-sectional view of a bicycle rear sprocket assembly in accordance with a modification of the sixth embodiment with being mounted to a bicycle hub assembly.

As seen in FIGS. 42 and 43, the intermediate portion 618 has substantially the same construction as that of the intermediate portion 18 in the first embodiment. In the illustrated embodiment, however, the intermediate portion 618 includes an opening. Specifically, the intermediate portion 618 includes reinforcing parts 622. The reinforcing parts 622 have substantially the same construction as that of the reinforcing parts 22 in the first embodiment. In the illustrated embodiment, however, at least one of the reinforcing parts 622 includes the opening. Specifically, each of the reinforcing parts 622 includes the opening 623. The opening 623 reduces the weight of the intermediate portion 618. Accordingly, it is possible to save the weight of the bicycle rear sprocket assembly 10. The opening 623 may have a different shape and different size from the illustrated embodiment. For example, the shape of the opening 623 may be oval, triangle, rectangle and so on, and the size of the opening 623 may be larger in the axial and/or radial direction than the illustrated embodiment.

Figure 44:
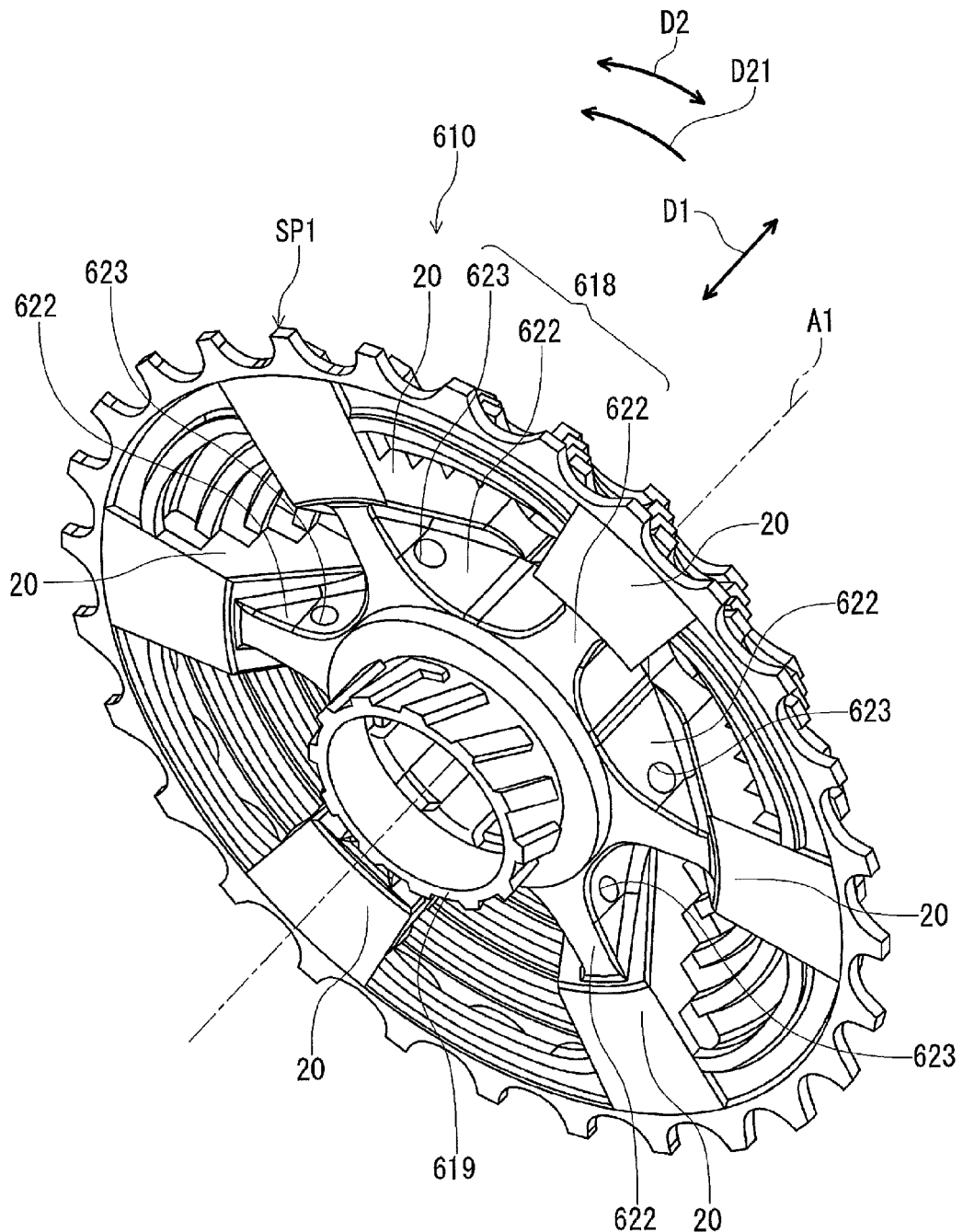
FIG. 44 is a perspective view of the bicycle rear sprocket assembly illustrated in FIG. 42.

As seen in FIG. 44, the reinforcing parts 622 extends between the supporting portion 14 and the hub engagement portion 616 in the radial direction with respect to the rotational center axis A1. The reinforcing parts 622 are spaced apart from each other in the circumferential direction D2 with respect to the rotational center axis A1. Accordingly, reinforcing parts 622 can improve the strength of the supporting member 612.

With the bicycle rear sprocket assembly 610, it is possible to obtain substantially the same advantageous effect as that of the bicycle rear sprocket assembly 10 in accordance with the first embodiment.

Furthermore, with the bicycle rear sprocket assembly 610, the hub supported portion 616 includes the bearing supported section 617 and the torque transmission section 619. The bearing supported section 617 is closer to the small diameter end 612a than the large diameter end 612b in the axial direction D1. The torque transmission section 619 is closer to the large diameter end 612b than the small diameter end 612a in the axial direction D1. Accordingly, it is possible to simplify the structure of the supporting member 612 of the bicycle rear sprocket assembly 610 and to save the weight of the bicycle rear sprocket assembly 10.

It will be apparent to those skilled in the bicycle field from the present disclosure that the constructions of the above embodiments can be at least partially combined with each other. For example, the construction of the sixth embodiment can be applied to each of the constructions of the second to fifth embodiments if needed and/or desired.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear sprocket assembly comprising:
a plurality of sprocket members having a rotational center axis, the plurality of sprocket members being arranged in an axial direction parallel to the rotational center axis, the plurality of sprocket members each including
a sprocket body, and
a plurality of sprocket teeth extending radially outwardly from the sprocket body with respect to the rotational center axis; and
a supporting member being a separate member from the plurality of sprocket members, the supporting member including
a supporting portion configured to support the plurality of sprocket members, the sprocket body of each of the plurality of sprocket members being attached to the supporting portion of the supporting member without using a separate metallic fastening member, the sprocket body of each of the plurality of sprocket members being attached to the supporting portion via at least one of adhesive and diffusion bonding, and
a hub engagement portion configured to engage with a bicycle hub assembly.

2. The bicycle rear sprocket assembly according to claim 1, wherein
the supporting member further includes an intermediate portion extending between the supporting portion and the hub engagement portion in a radial direction with respect to the rotational center axis.

3. The bicycle rear sprocket assembly according to claim 1, wherein
the supporting portion includes a plurality of spacers, and the plurality of spacers are respectively provided between adjacent two of the plurality of sprocket members in the axial direction.

4. The bicycle rear sprocket assembly according to claim 3, wherein
the plurality of spacers are respectively attached to the adjacent two of the sprocket bodies of the plurality of sprocket members.

5. The bicycle rear sprocket assembly according to claim 4, wherein
the plurality of spacers are respectively attached to the adjacent two of the sprocket bodies of the plurality of sprocket members via at least one of adhesive and diffusion bonding.

6. The bicycle rear sprocket assembly according to claim 3, wherein
the supporting portion includes radially-supporting surfaces facing radially outwardly with respect to the rotational center axis, and
the sprocket bodies of the plurality of sprocket members are respectively mounted on the radially-supporting surfaces.

7. The bicycle rear sprocket assembly according to claim 6, wherein
the sprocket bodies of the plurality of sprocket members are respectively attached to the radially-supporting surfaces.

8. The bicycle rear sprocket assembly according to claim 7, wherein
the supporting portion includes a plurality of spacers, and
the plurality of spacers are respectively provided between adjacent two of the plurality of sprocket members.

9. The bicycle rear sprocket assembly according to claim 8, wherein
the plurality of spacers are respectively attached to the adjacent two of the sprocket bodies of the plurality of sprocket members, and
the plurality of spacers are respectively attached to the radially-supporting surfaces.

10. The bicycle rear sprocket assembly according to claim 1, wherein
the supporting portion includes
radially-supporting surfaces facing radially outwardly with respect to the rotational center axis, and
first restricting parts provided on the radially-supporting surfaces,
the sprocket bodies of the plurality of sprocket members are respectively mounted on the radially-supporting surfaces,
each of the sprocket bodies of the plurality of sprocket members includes a second restricting part, and
the first restricting parts of the supporting portion are configured to respectively engage with the second restricting parts of the sprocket bodies to restrict the sprocket bodies from rotating relative to the supporting portion about the rotational center axis.

11. The bicycle rear sprocket assembly according to claim 1, wherein
the supporting portion includes a plurality of spacers,
the plurality of spacers are respectively provided between adjacent two of the sprocket bodies of the plurality of sprocket members,
at least one of the plurality of spacers includes a third restricting part,
at least one of the sprocket bodies of the plurality of sprocket members includes a fourth restricting part, and
the third restricting part of the at least one of the plurality of spacers is configured to respectively engage with the fourth restricting part of the at least one of the sprocket bodies to restrict the at least one of the sprocket bodies from rotating relative to the plurality of spacers about the rotational center axis.

12. The bicycle rear sprocket assembly according to claim 1, wherein
the supporting portion includes
radially-supporting surfaces facing radially outwardly with respect to the rotational center axis,
fifth restricting parts provided on the radially-supporting surfaces, and
a plurality of spacers mounted on the radially-supporting surfaces,
the plurality of spacers are respectively provided between adjacent two of the sprocket bodies of the plurality of sprocket members,
each of the plurality of spacers includes a sixth restricting part, and
the fifth restricting parts are configured to respectively engage with the sixth restricting parts of the plurality of spacers to restrict the plurality of spacers from rotating relative to the radially-supporting surfaces about the rotational center axis.

13. The bicycle rear sprocket assembly according to claim 1, wherein
the supporting portion includes a plurality of supporting parts spaced apart from each other at circumferential intervals in a circumferential direction with respect to the rotational center axis,
the plurality of supporting parts respectively have maximum circumferential lengths defined in the circumferential direction, and
each of the maximum circumferential lengths of the plurality of supporting parts is shorter than or equal to the circumferential intervals.

14. The bicycle rear sprocket assembly according to claim 1, wherein
the supporting portion includes a plurality of supporting parts spaced apart from each other at circumferential intervals in a circumferential direction with respect to the rotational center axis,
the plurality of supporting parts have maximum circumferential lengths defined in the circumferential direction, and
each of the maximum circumferential lengths of the plurality of supporting parts is longer than the circumferential intervals.

15. The bicycle rear sprocket assembly according to claim 2, wherein
the intermediate portion includes reinforcing parts extending between the supporting portion and the hub engagement portion in the radial direction with respect to the rotational center axis, and
the reinforcing parts are spaced apart from each other in a circumferential direction with respect to the rotational center axis.

16. The bicycle rear sprocket assembly according to claim 1, wherein
the plurality of sprocket members are made of a first material including at least one of an iron alloy, a titanium alloy and an aluminum alloy.

17. The bicycle rear sprocket assembly according to claim 1, wherein the supporting member is made of a second material including one of an aluminum alloy and a non-metallic material.

18. The bicycle rear sprocket assembly according to claim 17, wherein
the non-metallic material includes a fiber-reinforced plastic.

19. The bicycle rear sprocket assembly according to claim 1, wherein
the plurality of sprocket members are made of a first material, and
the supporting member is made of a second material different from the first material.

20. The bicycle rear sprocket assembly according to claim 19, wherein
the first material has a first relative density, and
the second material has a second relative density smaller than the first relative density.

21. A bicycle rear sprocket assembly comprising:
a plurality of sprocket members having a rotational center axis, the plurality of sprocket members being arranged in an axial direction parallel to the rotational center axis, the plurality of sprocket members each including a sprocket body, and
a plurality of sprocket teeth extending radially outwardly from the sprocket body with respect to the rotational center axis;
a supporting member having a small diameter end and a large diameter end opposite to the small diameter end in the axial direction, the supporting member including
a hub supported portion configured to be supported on a bicycle hub assembly and including
a bearing supported section closer to the small diameter end than the large diameter end in the axial direction and configured to be supported by a bearing unit, and
a torque transmission section closer to the large diameter end than the small diameter end in the axial direction, the torque transmission section being configured to transmit a torque from the plurality of sprocket members to the bicycle hub assembly, and
a supporting portion provided radially outward of the hub supported portion with respect to the rotational center axis and configured to support the plurality of sprocket members.

22. The bicycle rear sprocket assembly according to claim 21, wherein
the hub supported portion includes an additional bearing supported section configured to be supported by an additional bearing unit.

23. The bicycle rear sprocket assembly according to claim 22, wherein
the additional bearing supported section is positioned between the small diameter end and the large diameter end.

24. The bicycle rear sprocket assembly according to claim 23, wherein
the additional bearing supported section is closer to the large diameter end than the small diameter end in the axial direction.

25. The bicycle rear sprocket assembly according to claim 21, wherein
the supporting member further includes an intermediate portion extending between the supporting portion and the hub supported portion in a radial direction with respect to the rotational center axis, and
the intermediate portion includes an opening.

26. The bicycle rear sprocket assembly according to claim 25, wherein
the intermediate portion includes reinforcing parts extending between the supporting portion and the hub engagement portion in the radial direction with respect to the rotational center axis,
the reinforcing parts are spaced apart from each other in a circumferential direction with respect to the rotational center axis, and
at least one of the reinforcing parts includes the opening.

27. The bicycle rear sprocket assembly according to claim 21, wherein
the supporting member further includes an intermediate portion extending between the supporting portion and the hub supported portion in a radial direction with respect to the rotational center axis; and
the intermediate portion extends between the small diameter end and the large diameter end in the axial direction.

28. The bicycle rear sprocket assembly according to claim 3, wherein
the supporting portion includes radially-supporting surfaces facing radially outwardly with respect to the rotational center axis,
the sprocket bodies of the plurality of sprocket members are respectively mounted on the radially-supporting surfaces, and
the plurality of spacers are respectively provided on the radially-supporting surfaces and are respectively separate members from the radially-supporting surfaces.

29. The bicycle rear sprocket assembly according to claim 3, wherein the plurality of spacers are separate members from the hub engagement portion.

* * * * *